(12) United States Patent
Feng et al.

(10) Patent No.: US 12,491,557 B2
(45) Date of Patent: Dec. 9, 2025

(54) FORGING AND PRESSING PRODUCTION SYSTEM AND MANAGEMENT METHOD THEREFOR

(71) Applicant: Ningbo Texoon Brassworks Co., Ltd., Zhejiang (CN)

(72) Inventors: Zhenhua Feng, Ningbo (CN); Jian Ye, Ningbo (CN)

( * ) Notice: Subject to any disclaimer, the term of this patent is extended or adjusted under 35 U.S.C. 154(b) by 182 days.

(21) Appl. No.: 18/156,312

(22) Filed: Jan. 18, 2023

(65) Prior Publication Data
US 2023/0150013 A1    May 18, 2023

Related U.S. Application Data

(63) Continuation of application No. 16/961,923, filed as application No. PCT/CN2019/071500 on Jan. 12, 2019, now Pat. No. 11,571,734.

(30) Foreign Application Priority Data

Jan. 12, 2018 (CN) .......................... 201810031529.8
Jan. 12, 2019 (WO) ................. PCT/CN2019/071500

(51) Int. Cl.
| B21J 1/06 | (2006.01) |
| B21J 5/02 | (2006.01) |
| B21J 9/20 | (2006.01) |
| B21J 13/10 | (2006.01) |
| B21K 27/00 | (2006.01) |
| B21K 29/00 | (2006.01) |

(52) U.S. Cl.
CPC ................. *B21J 1/06* (2013.01); *B21J 5/025* (2013.01); *B21J 9/20* (2013.01); *B21J 13/10* (2013.01); *B21K 27/00* (2013.01); *B21K 29/00* (2013.01)

(58) Field of Classification Search
CPC ..... B21J 1/06; B21J 5/025; B21J 13/08; B21J 13/10; B21J 9/20; B21K 27/00; B21K 27/02; B21K 27/04; B21D 43/16
See application file for complete search history.

(56) References Cited

U.S. PATENT DOCUMENTS

| 5,205,390 A * | 4/1993 | Ikenaka | ................... B21J 13/08 |
| | | | 221/242 |
| 6,471,035 B1 * | 10/2002 | Ruchti | ..................... B21K 1/04 |
| | | | 198/339.1 |
| 2004/0244460 A1 * | 12/2004 | Xiong | ..................... B21J 13/08 |
| | | | 72/405.01 |

FOREIGN PATENT DOCUMENTS

CN    107282835 A  * 10/2017

* cited by examiner

*Primary Examiner* — Debra M Sullivan
(74) *Attorney, Agent, or Firm* — Tsz Lung Yeung

(57) ABSTRACT

A forging and pressing production systems enables at least one material to be formed by hot melt and forging and pressing by itself without human operation, thereby completing the mass production of the material. Operating factors such as the pressure, temperature and mold required for formation are taken into account, and the identification requirements for the material are reduced, thereby realizing large-scale production.

5 Claims, 22 Drawing Sheets

FORGING AND PRESSING PRODUCTION SYSTEM AND MANAGEMENT METHOD THEREFOR

CROSS REFERENCE OF RELATED APPLICATION

This is a Continuation Applications that claims the benefit of priority under 35 U.S.C. § 119 to a non-provisional application, application Ser. No. 16/961,923, filing date Aug. 25, 2020, which is a national stage entry under 35 USC 371 from international application number PCT/CN2019/071500, filing date Jan. 12, 2019, claiming foreign priority of application number 201810031529.8, filing date Jan. 12, 2018, country China, which is incorporated herewith by reference in its entity.

BACKGROUND OF THE PRESENT INVENTION

Field of Invention

The present invention relates to the field of automatic production and, in particular, to a production system and management method for achieving high efficient manufacturing through hot forging and pressing production.

Description of Related Arts

Forging of metals or alloys is the main production portion in the metallurgical industry. Hot forging and pressing, which is used to shape and process metal parts through hot melting and pressing, is mainly used to manufacture metal materials, such as plates, strips, tubes, profiles, and wires. Because its accuracy and stability both have higher requirements, it is correspondingly more difficult regarding its equipment and operation.

In traditional forging production, operations between multiple different devices are required, and workers are required to operate among the devices. In a common type of traditional forging and pressing production, one or more workers need to operate to complete a production. In order to achieve mass production, more equipment and manpower are needed.

Generally, metal or alloy raw materials are preliminarily processed into semifinished products or blanks. It is necessary to artificially put a plurality of the semifinished products into a heating furnace, in which the semifinished products are heated. The commonly used hot forging temperatures are: carbon steel 800-1250° C.; alloy structural steel 850-1150° C.; high speed steel 900-1100° C.; commonly used aluminum alloy 380-500° C.; titanium alloy 850-1000° C.; brass 650-750° C. In other words, different alloys need to be heated to different temperatures. Once the temperature fails to meet the standard, subsequent operations will fail as well. Currently, for mass operations, experienced workers are required to observe the state of the semifinished product being burnt and heated. After confirming that the temperature of the semifinished product is appropriate, it is necessary to manually select the appropriate one, and use a clamp to move the heated blank.

In the case of stamping, it is necessary to manually clamp the red-burned blank to a stamping machine tool. Then, the blank is compressed again through the operation of the stamping machine tool, so that the blank can be formed through forging and pressing. Normally, the blank is in a mold on a machine tool, and the mold is sunk in the plane of the stamping machine tool. After forging and forming, it is necessary to manually take out the formed blank and place it in the finished product area. Moreover, after such repeated operations in the production, it is necessary to perform an oil brushing operation on the mold and the stamping machine tool. Because both the mold and the stamping machine tool have undergone high temperature and high pressure, they need to be oil brushed for certain maintenance. Then this operation of oil brushing also requires to be carried out manually. Some of the conventional stamping machine tools can spray engine oil, but the timing of the engine oil spraying is not easy to control. Accidents may occur easily if the oil accidentally contacts a high-temperature blank or mold. Moreover, the engine oil is prone to spilling out, resulting in very dirty and very oily surroundings around the stamping machine tool. Nonetheless, the oil fume produced in the manual oiling process has bad influence to both human body and the equipment. It is not friendly to the human body and the environment. Based on the above, traditional forging and pressing production relies heavily on labor, and highly demands on the workers' experience. Besides, the coordination between the devices is not close, and they cannot be directly connected to each other. It is understandable that in the production process of the prior art, the judgment of the state of the blank can only be done manually. Unfortunately, the accuracy of human visual judgment is low, and judgment errors are more likely to occur, which may lead to manufacturing accidents.

After the material is heated, it is in a high temperature state, and there is a risk of falling and slipping of the material when it is clamped by the workers. Once the material slips and falls on the ground, it will be damaged, rendering waste. Meanwhile, when the worker clamps the high temperature material, there is also a certain risk. If s/he gets burned accidentally, the consequences will be severe. In addition, high temperature materials will also affect the service life of the clamp or shovel. Finally, the workers need to always stay by the equipment and maintain a high degree of attention, which demands higher labor cost, and further increases the production cost.

In addition, it is difficult to achieve unmanned operation of all the production devices. Especially, the current image identification technology has not developed to the industrial production level that the program algorithm is too complicated, and the cost is still high. For example, a camera capable of identifying in a high-temperature production environment is not only costly, but also highly expensive in maintenance. Nevertheless, the working hours of workers cannot keep up with the all-weather operation time of the equipment, and it is difficult to achieve a balance of interests.

At the moment of advancement in automated production, to meet the needs of manpower management and capacity, based on the needs of mass production, the production line of manufacturing operations between multiple devices/in forging production is highly required.

SUMMARY OF THE PRESENT INVENTION

An object of the present invention is to provide a forging and pressing production system and management method therefor, which utilizes a control platform to monitor and control each process of the forging and pressing production, so that the hot melt and forging and pressing processes are closely connected and coordinated, thereby forming an automated forging and pressing production line, which greatly improves the production efficiency.

Another object of the present invention is to provide a forging and pressing production system and management method therefor, which allows at least one material to be formed through hot melting and forging and pressing of itself without manual operation, thereby enabling and achieving mass production of the material.

Another object of the present invention is to provide a forging and pressing production system and management method therefor, which takes into account the pressure, temperature, mold, and other operational variables required for forming, and reduces the need for identification of the material, thereby achieving mass production.

Another object of the present invention is to provide a forging and pressing production system and management method therefor, which makes full use of the combination of experience and actual production to ensure that the parameters of the material in each process in the production are effective. Another object of the present invention is to provide a forging and pressing production system and management method therefor, which strictly controls operational variables such as pressure, temperature, and mold during the production process, so as to ensure the yield in mass production.

Another object of the present invention is to provide a forging and pressing production system and management method therefor, which can automatically perform corresponding processing according to the characteristics of the material, making it possible to process a large number of multiple types of products at the same time.

Another object of the present invention is to provide a forging and pressing production system and management method therefor, which avoids high temperature state of the material when it enters and leaves the production system, wherein the forging and pressing operations of the material in high temperature conditions are completely in the production system, which keeps production safety.

Another object of the present invention is to provide a forging and pressing production system and management method therefor, wherein the control platform further examines and controls an information collection and processing device, a hot melt device, a forging device, and a delivering device so as for the material to be processed through the forging and pressing production line.

Another object of the present invention is to provide a forging and pressing production system and management method therefor, through which the material is put into the hot melt device and formed in the forging device, thereby completing the manufacturing process of the material.

Another object of the present invention is to provide a forging and pressing production system and management method therefor, wherein based on the characteristics of the material, such as temperature characteristics, the hot melt device or the forging device is performed accordingly, so that the material can be processed under a reasonable temperature and pressure, which improves production efficiency.

Another object of the present invention is to provide a forging and pressing production system and management method therefor, wherein the delivering device transports materials between the hot melt device and the forging device, so that the materials can be transported between the hot melt device and the forging device easily and smoothly.

Another object of the present invention is to provide a forging and pressing production system and management method therefor, wherein the delivering device transports the forged and formed materials out of the forging device, so that the materials in high temperature conditions are all carried by the delivering device without requiring human contact and manual operation.

Another object of the present invention is to provide a forging and pressing production system and management method therefor, wherein the control platform further includes an arithmetic unit, a feedback unit, an actuator, and a monitor unit, wherein the feedback unit obtains the monitoring data of the hot melt device, the forging device, and the delivering device for the arithmetic unit to perform calculations, and then the actuator performs control on the hot melt device, the forging device, and the delivering device according to the calculation, which ensures the stability and robustness of the production system.

Another object of the present invention is to provide a forging and pressing production system and management method therefor, wherein the production system is controlled based on the feedback obtained by the feedback unit, and the control conditions and restrictions can also be added based on the needs and the requirements of the designs of the material.

Another object of the present invention is to provide a forging and pressing production system and management method therefor, wherein the material can be automatically circulated after being put into the hot melt device, and the material of high temperature state is completely kept in the production system until the forging manufacturing is complete.

Another object of the present invention is to provide a forging and pressing production system and management method therefor, wherein the delivering device handles and transports the material during the manufacturing process, and the delivering device makes the material move between the hot melt device and the forging device and from the forging device so as to enable and maintain the manufacturing process of the material.

Another object of the present invention is to provide a forging and pressing production system and management method therefor, wherein the delivering device further includes a feeding tool and a conveying tool, and the feeding tool transports the material between the hot melt device and the forging device so as to connect the hot melting stage and the forging stage of the material.

Another object of the present invention is to provide a forging and pressing production system and management method therefor, wherein the conveying tool transports the material away from the forging device, thereby completing the manufacturing and shaping of the material and having it to leave the production system.

Another object of the present invention is to provide a forging and pressing production system and management method therefor, which further includes an examining device when the material leaves the production system, so as for determining the qualification of the finished material.

Another object of the present invention is to provide a forging and pressing production system and management method therefor, wherein the delivering device further includes a material inputting tool and a discharging tool, wherein the material inputting tool conveys the material to the hot melt device to start the forging process of the material, while the discharging tool transports the material to leave the forging process and, preferably, transports the qualified material to leave the forging production line after it passes the examining device.

Another object of the present invention is to provide a forging and pressing production system and management method therefor, wherein the hot melt device or the forging device can be modified from traditional ones, and cooperate with the control platform and the delivering part to form the production system, so as to achieve the automated operation, which reduces costs and enhances production efficiency.

Another object of the present invention is to provide a forging and pressing production system and management method therefor, which further provides a maintenance device that maintains each process of the production system, preferably, the forging device, which enables the production system to maintain an effective working state, prolongs the service life, and maintains the production and surrounding environment of the production system.

Another object of the present invention is to provide a forging and pressing production system and management method therefor, wherein the maintenance device further includes an oiling tool, which is controlled by the control platform to oil and maintain the forging device according to the condition of the forging device.

Another object of the present invention is to provide a forging and pressing production system and management method therefor, which takes into account the procedures and worker experience, the actual production efficiency and the actual human management, so as to improve the overall production and management efficiency.

Another object of the present invention is to provide a forging and pressing production system and management method therefor, which by first acquiring the characteristics of the material, and then performing the corresponding hot melt device, forging device, and examining device, allows the blanks of different materials to be manufactured at the same time to produce and obtain different types of products. Another object of the present invention is to provide a forging and pressing production system and management method therefor, wherein the forging and pressing production system collects the characteristics of the material before forging and pressing the material, and screens the properly processed material to put into the forging and pressing mold, so as to prevent scrap material and waste materials from entering the forging and pressing mold, thereby increasing the qualification rate of the product.

Another object of the present invention is to provide a forging and pressing production system and management method therefor, wherein the waste material elimination mechanism of the forging and pressing production system eliminates waste and scrap materials that occur in the manufacturing process, which avoids the waste materials from being processed, thereby improving the production efficiency and the qualification rate of the product.

Another object of the present invention is to provide a forging and pressing production system and management method therefor, wherein the waste material elimination mechanism of the forging production system eliminates waste and scrap materials that occur in the manufacturing process, and avoids processing the scrap materials so as to avoid the mold of the forging and pressing production system from being damaged thereby.

Another object of the present invention is to provide a forging and pressing production system and management method therefor, wherein the forging and pressing production system determines whether the material can be processed by acquiring the characteristics of the material after it was heated. In other words, the forging and pressing production system collects the characteristics of the material, such as temperature characteristics, shape characteristics, size characteristics, position characteristics, weight characteristics, and etc., so as to determine whether the material is a waste material, and if it determines that the material is a waste or scrap material, the material will be eliminated by the waste material elimination mechanism.

Another object of the present invention is to provide a forging and pressing production system and management method therefor, wherein the waste material elimination mechanism and the transport mechanism of the forging and pressing production system are the same device, wherein the transport mechanism transport the material based on the judgment result of the material that the materials that meet the processing requirements will be transferred to the mold for processing, while the waste materials that do not meet the processing requirements are discharged and eliminated.

Another object of the present invention is to provide a forging and pressing production system and management method therefor, wherein the waste material elimination mechanism eliminates and discharges the waste material at the front end during the normal processing process of the forging and pressing production system, so as to avoid the material waiting behind from cooling down during the waiting process, which then avoids the vicious cycle of cooling of the blank caused by waiting during the processing.

Another object of the present invention is to provide a forging and pressing production system and management method therefor, wherein the waste material elimination mechanism reversely transports waste materials that do not suitable for the forging and pressing processing, especially blanks with insufficient temperature, to the vicinity of the hot melt device, so as for further heating the blank with insufficient temperature for reprocessing.

Another object of the present invention is to provide a forging and pressing production system and management method therefor, wherein the waste material elimination mechanism removes the waste material during transportation, reducing the subsequent waiting time of the blank in the process of processing, which enhances the processing efficiency and reduces the temperature drop of the blank in the waiting process for keeping the processing of the blank.

Another object of the present invention is to provide a forging and pressing production system and management method therefor, wherein the waste material elimination mechanism further includes a clamping device and an operating arm supporting the clamping device to perform a clamping action, wherein the clamping device clamps and picks up the waste materials during the transportation.

Another object of the present invention is to provide a forging and pressing production system and management method therefor, wherein the clamping device can be operated to adjust the clamping direction and gripping angle so as to grip the waste materials of different angles and sitting positions.

Another object of the present invention is to provide a forging and pressing production system and management method therefor, wherein the waste material elimination mechanism is arranged at the front end of the transport mechanism of the forging and pressing production system, wherein the waste material that does not meet the processing conditions is eliminated and discharged by the waste material elimination mechanism before the transport mechanism transports the material, which improves the production and processing efficiency.

Another advantage of the present invention is to provide a forging and pressing production system and management method therefor, wherein the forging and pressing production system includes a control platform, a feeding device, and a forging device, wherein the control platform controls the feeding device and the forging device, wherein the feeding device heats the material and then transports the material to the forging device, wherein the forging device forges the material to form and shape it.

Another advantage of the present invention is to provide a forging and pressing production system and management method therefor, wherein the forging and pressing production system includes a maintenance and delivering device, wherein the maintenance and delivering device receives the forged material and sprays oil to the forging and pressing device for maintenance, which shortens the time of receiving and maintenance and improves the production efficiency.

Another advantage of the present invention is to provide a forging and pressing production system and management method therefor, wherein the maintenance and delivering device includes a conveying mechanism and a maintenance mechanism, wherein the maintenance mechanism is disposed on the conveying mechanism, wherein the conveying mechanism is capable of moving reciprocally to receive the forged materials, and when the conveying mechanism is located at the forging device, the maintenance mechanism sprays oil up and down to the forging device.

Another advantage of the present invention is to provide a forging and pressing production system and management method therefor, wherein the maintenance mechanism sprays oil mist up and down to the pressing mechanism and the mold so as to maintain the forging device.

Another advantage of the present invention is to provide a forging and pressing production system and management method therefor, wherein the conveying mechanism is arranged on one side of the mold and moves to a forging space defined by the forging device to receive the mold that leaves from the pressing mechanism.

Another advantage of the present invention is to provide a forging and pressing production system and management method therefor, wherein the conveying mechanism is arranged on one side of the mold, which can protect the driving part of the conveying mechanism and reduce the high temperature influence from the forging device.

Another advantage of the present invention is to provide a forging and pressing production system and management method therefor, wherein the conveying mechanism is arranged on one side of the mold, and an end of the conveying mechanism is lifted so that the conveying mechanism can be obliquely moving to the forging space of the forging device to receive the material falling from the pressing mechanism without being hindered by the mold.

Another advantage of the present invention is to provide a forging and pressing production system and management method therefor, wherein the maintenance and delivering device achieves automatic oil spraying maintenance and avoids personal hazards caused by manual oiling work.

Another advantage of the present invention is to provide a forging and pressing production system and management method therefor, wherein the maintenance and delivering device receives the forged material and transports it to a storage area, substituting the labor of manual transportation, which makes the maintenance and delivering device more efficient and safer.

Another advantage of the present invention is to provide a forging and pressing production system and management method therefor, wherein the forging and pressing production system includes an examining device, wherein the examining device detects the operating status of the maintenance and delivering device and the location of the material in real time so as for detecting errors.

Another advantage of the present invention is to provide a forging and pressing production system and management method therefor, wherein the forging device includes a pressing mechanism and a mold, wherein after the material is transported to the mold, the pressing mechanism presses downwards on the material to form the material, wherein the examining device detects whether the pressing mechanism and the mold adhere to the material, and when the examining device detects the pressing mechanism or the mold is adhered or bonded on the material, the examining device will send a signal about the abnormal position of the material to the control platform, so that the control platform will then control the maintenance and delivering device to stop and not to spray oil.

Another advantage of the present invention is to provide a forging and pressing production system and management method therefor, wherein when the examining device detects that the pressing mechanism and the mold have no material, the examining device sends a no material signal to the control platform, and the control platform will control the maintenance and delivering device to continue to reciprocate, and simultaneously spray oil up and down when the maintenance and delivering device is located at the forging device.

Another advantage of the present invention is to provide a forging and pressing production system and management method therefor, wherein when the examining device detects that the forging device has an open flame, the examining device sends an emergency signal to the control platform, and the control platform will control the forging device, the feeding device, and the maintenance and delivering device to emergency stop and give an alarm. Another advantage of the present invention is to provide a forging and pressing production system and management method therefor, wherein when the examining device detects that the forging device has an open flame, the control platform sends an emergency signal to other forging and pressing production systems and other systems to prevent danger situations.

Another advantage of the present invention is to provide a forging and pressing production system and management method therefor, wherein the forging and pressing production system automatically processes at least one material without manual operation, which achieves high efficiency automated production.

Another advantage of the present invention is to provide a forging and pressing production system and management method therefor, wherein the forging and pressing production system detects and collects information of the material through at least one examining device, and automatically determines the production method of the material according to the collected data, so as to allow the forging and pressing production system to perform automatic production according to the characteristics of the material, adapt to different characteristics of the material, and produce different products.

Another advantage of the present invention is to provide a forging and pressing production system and management method therefor, wherein the forging and pressing production system includes a feeding device that selects the location where the material is input according to the characteristics of the material, wherein if the material is suitable for subsequent processing according to its characteristics, the conveying tool will put the material into the forging device.

Another advantage of the present invention is to provide a forging and pressing production system and management method therefor, wherein the feeding device clamps the material and adjusts the carriage to achieve the transfer of the material.

Another advantage of the present invention is to provide a forging and pressing production system and management method therefor, wherein when the material needs to be eliminated and discharged from the production according to its characteristics, the feeding device transfers the material out of the forging and pressing production system.

Another advantage of the present invention is to provide a forging and pressing production system and management method therefor, wherein the feeding device includes a transfer arm and a clamping tool, mounted on the transfer arm, wherein the transfer arm adjusts the direction and position, so that the orientation and position of the clamping tool can be adjusted and the feeding device can adjust the its carriage flexibly.

Another advantage of the present invention is to provide a forging and pressing production system and management method therefor, wherein the transfer arm includes at least two adjusting arms, wherein the adjusting arms are connected end to end and capable of rotating relatively to each other so as for adjusting the overall carriage of the transfer arms for adjusting the position of the clamping device and achieving the transfer of the material.

An object of the present invention is to provide a forging and pressing production system and management method therefor, wherein the guide rail device transports the material between a hot melt device and a forging device, so that the hot melting stage and the forging stage of the material can be connected.

Another object of the present invention is to provide a forging and pressing production system and management method therefor, wherein the guide rail device allows the material to slide from the top downward through a sliding surface, wherein at least one material is transported on a sliding track without manual operation, which avoids the adverse effects of high temperature materials on labor and saves labor costs.

Another object of the present invention is to provide a forging and pressing production system and management method therefor, wherein the guide rail device can achieve a meandering shape, so that the hot melt device and the forging device can be placed together compactly, which saves the space used.

Another object of the present invention is to provide a forging and pressing production system and management method therefor, wherein the guide rail device is kept within a certain predetermined distance from the forging device through a providing end, which shortens the path for a clamping end to clamp and take the material from the providing end to the forging device.

Another object of the present invention is to provide a forging and pressing production system and management method therefor, wherein the guide rail device intercepts the material through an intercepting member, and the material is intercepted by the intercepting member, so that the material can be held at a fixed position for clamping.

Another object of the present invention is to provide a forging and pressing production system and management method therefor, wherein the guide rail device ensures the accuracy of the final conveyed position of the material through a gradually narrowing sliding channel, so as to facilitate the clamping at a fixed position.

Another object of the present invention is to provide a forging and pressing production system and management method therefor, wherein the sliding guide rail can present a curvy shape, which facilitates the assembly of the guide rail device and other devices and saves space used.

Another object of the present invention is to provide a forging and pressing production system and management method therefor, which can have the material be formed through hot melting and forging without manual operation, which facilitates mass production of the material.

According to an aspect of the present invention, the present invention further provides a forging and pressing production system, including:

a control platform;

a hot melt device, heating at least a material so that the material is heated to a certain temperature;

a forging device, adapted for pressing the heated material based on the control of the control platform so as for forming the material through forging and pressing; and a delivering device, adapted for delivering the material between the hot melt device and the forging device based on the control of the control platform.

According to an embodiment of the present invention, the control platform acquires at least one characteristic from the material, wherein the examining device is connected with the control platform, wherein the control platform determines if the material satisfies the requirement for the forging and pressing device subsequently.

According to an embodiment of the present invention, if the control platform determines the material meets the requirement, the processing of the material will be continued, while if the control platform determines the material fails to meet the requirement, the material will be eliminated.

According to an embodiment of the present invention, the control platform selects corresponding parameters of the forging and pressing device based on the characteristic of the material.

According to an embodiment of the present invention, the forging and pressing production system further comprises an examining device, adapted for acquiring the characteristic of the material.

According to an embodiment of the present invention, the examining device determines if the material is qualifiedly formed, wherein if the material is determined to be qualified, the material will be further processed, while if the material is determined to be unqualified, the material will be eliminated from the production.

According to an embodiment of the present invention, the characteristic of the material further comprises: an external physical characteristic and a temperature characteristic, wherein the external physical characteristic numerically reflects the shape of the material, wherein the temperature characteristic numerically reflects the temperature of the material.

According to an embodiment of the present invention, the delivering device transports the material according to the result selected by the control platform.

According to an embodiment of the present invention, the delivering device further comprises a material inputting tool and a discharging tool, wherein the material inputting tool inputs the material into the forging and pressing production system, wherein the discharging tool discharges the material as a product from the forging and pressing production system so as to allow the material to perform the steps of itself and obtain the equipment.

According to an embodiment of the present invention, the material inputting tool input the material, as a blank, into the forging and pressing production system, wherein the discharging tool discharges the material, as a formed blank, from the forging and pressing production system.

According to an embodiment of the present invention, the hot melt device heats the material, so as to heat the material to a certain temperature for corresponding to the forging and pressing device.

According to an embodiment of the present invention, the hot melt device further comprises a heating chamber and a heater, wherein the heater is controlled by the control platform, wherein the time of the material to be detained in the heating chamber is controlled by the control platform.

According to an embodiment of the present invention, the hot melt device has a heating space provided therein, wherein the material is delivered through the material inputting tool of the delivering device to the heating space for being further heated.

According to an embodiment of the present invention, before the transportation to the heating space, the control platform determines if the heating space is vacant and available. If the heating space is vacant and available, the transportation of the material to the heating device will be continued.

According to an embodiment of the present invention, after the material is heated up through the hot melt device, the material is pressed for forming through the forging device.

According to an embodiment of the present invention, the forging and pressing device further comprises a mold and a pressing mechanism, wherein the delivering device places the material into the mold, wherein the pressing mechanism presses the material in the mold for molding and forming.

According to an embodiment of the present invention, the pressing mode of the pressing mechanism is controllably adjusted according to the forging and pressing requirements of the material.

According to an embodiment of the present invention, the pressing mode adjustment comprises the adjustment of the pressure exertion of the pressing mechanism.

According to an embodiment of the present invention, the pressing mode adjustment comprises the adjustment of the pressing angle of the pressing mechanism.

According to an embodiment of the present invention, the forging and pressing device further has a forging space provided therein, wherein the forging space is formed and defined between the mold and the pressing mechanism.

According to an embodiment of the present invention, before the feeding tool of the delivering device delivers the material to the pressing mechanism, the control platform judges and determines if the forging space vacant and available, wherein if the forging space is vacant and available, the material will continue to be sent to the pressing mechanism.

According to an embodiment of the present invention, the delivering device further comprises a feeding tool and a conveying tool, wherein when the material is automatically conveyed between the hot melt device and the forging device, the feeding tool delivers the material from the hot melt device to the forging device, while the conveying tool sends the material from the forging device to the discharge tool.

According to an embodiment of the present invention, the external physical characteristic is selected from the group consisting of distance sensor, weight sensor, pressure sensor, and combinations thereof.

According to an embodiment of the present invention, the temperature characteristic is acquired from means selected from the group consisting of temperature sensor, infrared sensor, and combinations thereof.

According to an aspect of the present invention, the present invention further provides a forging and pressing production management method, comprising the steps of:

A. acquiring at least one characteristic of a fed material;

B. correspondingly selecting, according to the characteristic of the material, at least one of the temperature, the pressure or a mold from among operating factors of the forging and pressing process;

C. transporting the material according to the selection result; and

D. processing the material until a finished product is produced.

According to an embodiment of the present invention, in the step A the input material has been adapted for the forging and pressing operational variables of the end product.

According to an embodiment of the present invention, in the step A the material is corresponding to at least two end products.

According to an embodiment of the present invention, the method further comprising the following step before the step A: matching the forging and pressing operational variables with the end product.

According to an embodiment of the present invention, the step D further comprises the following step: examining if the processed material has become an end product.

According to an embodiment of the present invention, the step D further comprises the step of: determining if the material is qualifiedly formed, wherein if the material is determined to be qualified, further processing the material, while if the material is determined to be unqualified, eliminating the material, and returning.

According to an embodiment of the present invention, the step B further comprises the following step: controlling the corresponding parameters of the forging and pressing process based on the characteristic of the material.

According to an embodiment of the present invention, the characteristic of the material further comprises: an external physical characteristic and a temperature characteristic, wherein the external physical characteristic numerically reflects the shape of the material, wherein the temperature characteristic numerically reflects the temperature of the material.

According to an embodiment of the present invention, the external physical characteristic is selected from the group consisting of distance sensor, weight sensor, pressure sensor, and combinations thereof.

According to an embodiment of the present invention, the temperature characteristic is acquired from means selected from the group consisting of temperature sensor, infrared sensor, and combinations thereof.

According to an embodiment of the present invention, the step D further involving a hot melt process for heating up the material to a certain temperature for being suitable for the forging and pressing process.

According to an embodiment of the present invention, the step D further comprises a forging process that after the material is heated up through the hot melt process, the material is pressed for forming through the forging process.

According to an embodiment of the present invention, the step C further comprises a delivering process that the material is transferred between the hot melt process and the forging process through the delivering process so as to be processed of itself.

According to another aspect of the present invention, the present invention further provides a waste material elimination method for forging and pressing production system, comprising the steps of:

(a) acquiring at least a characteristic of at least a blank
(b) determining if the blank is a waste material based on the acquired characteristic; and
(c) if the blank is determined to be a waste material or scrap material, eliminating the waste material or scrap material through at least a waste material elimination device; if the blank is determined to be suitable for processing, returning to execute the step (a).

According to another aspect of the present invention, the present invention further provides a maintenance and delivering device for a forging device, comprising:
a maintenance mechanism, adapted for spraying oil up and down onto the forging device; and
a conveying mechanism, wherein the conveying mechanism reciprocates from a starting position to a receiving position to receive the forged material at the receiving position, and to carry the material away from the forging device, wherein the material is forged by the forging device, wherein the starting position is located on one side of the forging device, wherein the receiving position is located on the forging device, wherein after the conveying mechanism receives the material dropping at the receiving position, the conveying mechanism carries the material back to the starting position.

According to another aspect of the present invention, the present invention further provides a forging production method, comprising the steps of:
(a) forging at least a heated material in a forging space; and
(b) conveying the material to leave the forging space after the forged and formed material is received from the forging space, so as to allow the forging space be oil sprayed for executing the step (a) again after the forging space is cleared.

According to another aspect of the present invention, the present invention further provides a forging and pressing production method, comprising the steps of:
(A) inputting at least a material;
(B) acquiring the characteristic of the material; and
(C) according to the characteristics of the material, placing the material to a corresponding position, wherein if the material can be forged, placing the material into a forging device, while if the material cannot be forged, discarding the material.

According to another aspect of the present invention, the present invention further provides a guide rail device, adapted for transporting at least a material, comprising:
a collection end, located at a front end of the guide rail device so as for receiving the material when the material is delivered by the guide rail device;
a providing end, located at a tail end of the guide rail device so as for restricting the material stopping by and turning the material into a waiting for clamping state; and
a sliding channel, obliquely arranged and extending the front end and tail end thereof respectively to the collection end and the providing end, wherein the collection end and the providing end are correspondingly arranged at the upstream and the downstream of the sliding channel respectively.

According to another aspect of the present invention, the present invention further provides a guide rail device, adapted for transporting at least a material, comprising:
a collection end, located at a front end of the guide rail device so as for receiving the material when the material is delivered by the guide rail device;
a providing end, located at a tail end of the guide rail device so as for restricting the material stopping by and turning the material into a waiting for clamping state;
a sliding channel, horizontally arranged and extending the front end and tail end thereof respectively to the collection end and the providing end, wherein the collection end and the providing end are correspondingly arranged; and
a conveyer belt, arranged on the bottom of the sliding channel, wherein the two ends of the conveyer belt are respectively extended to the collection end and the providing end, so as for delivering the material input into the sliding channel.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. just indicate relations of direction or position are based on the relations of direction or position shown in the appended drawings, which is only to facilitate descriptions of the present invention and to simplify the descriptions, rather than to indicate or imply that the referred device or element must apply specific direction or to be operated or configured in specific direction. Therefore, the above-mentioned terminologies shall not be interpreted as confine to the present invention.

It is understandable that the term "a" should be understood as "at least one" or "one or more". In other words, in one embodiment, the number of an element can be one and in other embodiment the number of the element can be greater than one. The term "a" is not construed as a limitation of quantity.

Figure 1:
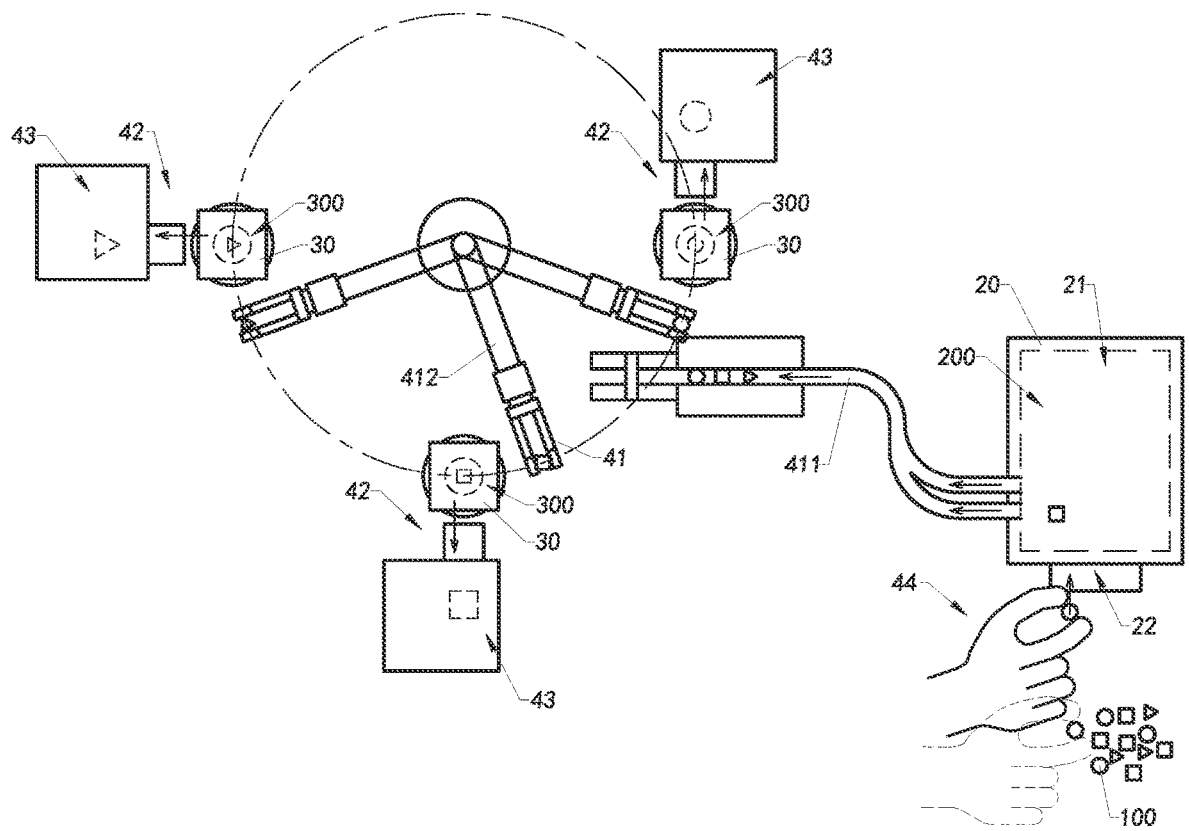
FIG. 1 is an overall perspective view of a forging and pressing production system according to a first preferred embodiment of the present invention.
Figure 2:
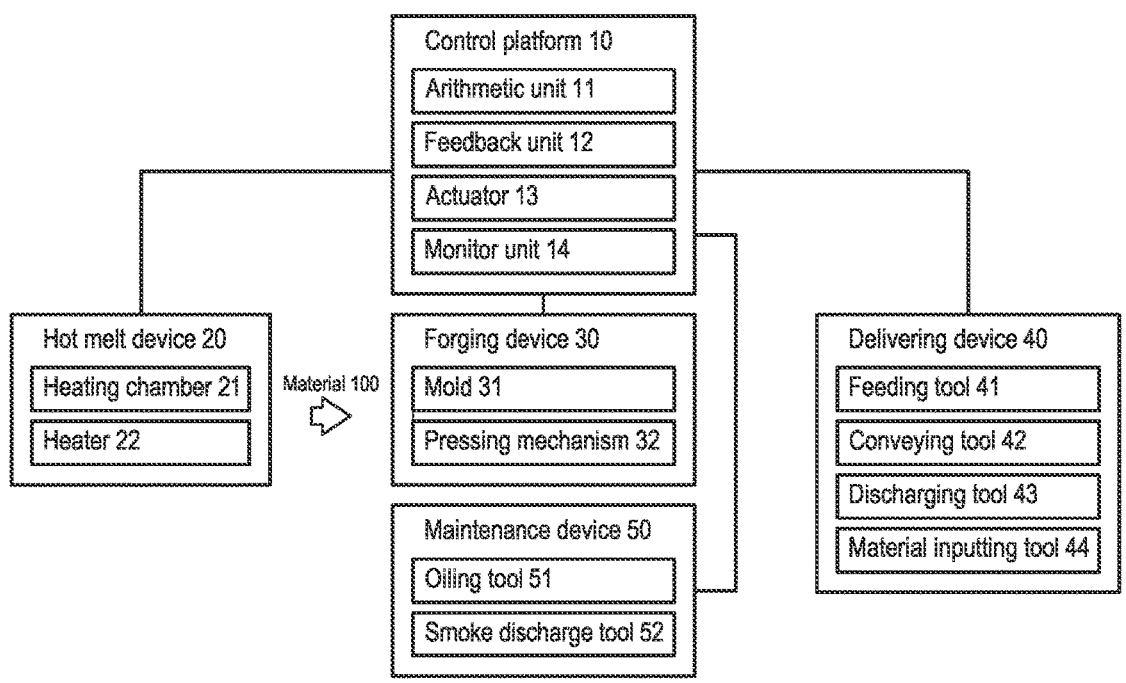
FIG. 2 is a block diagram of the forging and pressing production system according to the above first preferred embodiment of the present invention.
Figure 3:
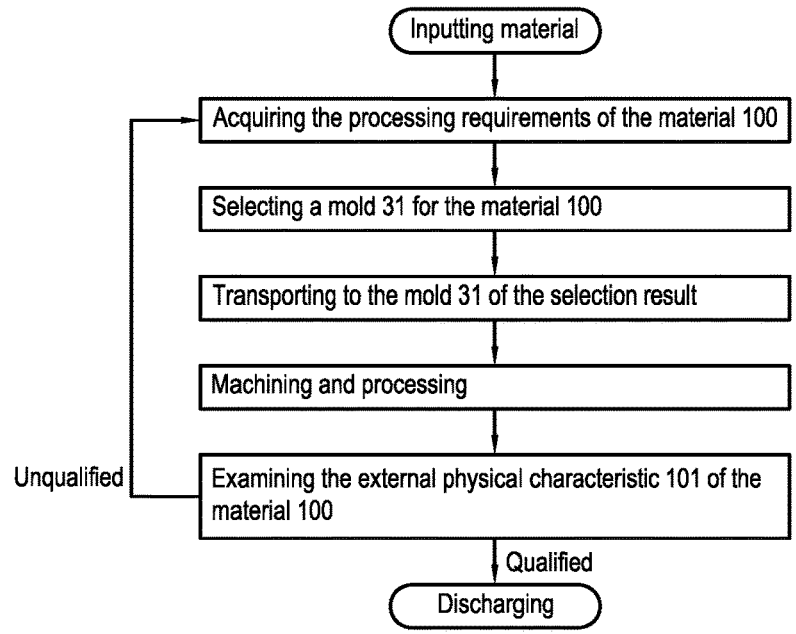
FIG. 3 is a flow diagram of the forging and pressing production system according to the above first preferred embodiment of the present invention.

The present invention provides a forging and pressing production system, referring to FIGS. 1-3, wherein the forging and pressing production system further comprises a hot melt device 20 and a forging device 30. The hot melt device 20 heats at least a material 100 so that the material is heated to a proper temperature for subsequent forging and pressing operation. The hot melt device 20 further comprises a heating chamber 21 and a heater 22. The forging and pressing production system further comprises a delivering device 40. The delivering device 40 delivers the material 100 for the circulation so as to allow the material 100 to go through the processes of itself. The delivering device 40 further comprises a material inputting tool 44 and a discharging tool 43. The material inputting tool 44 inputs the material 100 into the forging and pressing production system. The discharging tool 43 discharges the material 100 as a product from the forging and pressing production system. It is worth mentioning that the material inputting tool 44 and the discharging tool 43 automatically add the material into the forging and pressing process. Starting from the material inputting tool 44, the material 100 begins to be processed in the forging and pressing production system. The discharging tool 43 brings the material 100 from the forging and pressing production system, so as to end the processing of the material 100 in the forging and pressing production system. In other words, it does not require manual operation for the material in the forging and pressing production system, which not only reduces labor costs, but also guarantees production safety.

Moreover, according to different demands and requirements of the end product, there are various types of the material 100 as well. Especially, the original blank shape of the material 100 is directly related to the demands and requirements of the end product. According to the present preferred embodiment, the selection of the material 100 is based on the demands and requirements of the end product. According to another embodiment, suitable material 100 is selected from the raw material based on a different need of the end product so as to be added into the forging and pressing production system. In other words, according to the present preferred embodiment, the raw material of the material 100 decides the production process it will go through and the hot melt device 20 and the forging device 30 will respectively act corresponding to the raw material.

Specifically, the material 100 is delivered to the hot melt device 20 through the delivering device 40 and then mainly heated in the heating chamber 21. It is worth mentioning that the heating temperature of the heating chamber 21 is controllably set. According to the needs of the material 100, the heating chamber 21 is correspondingly heated by the heater 22 to heat the material 100 to the predetermined temperature. Furthermore, the hot melt device 20 has a heating space 200 provided therein. The material 100 is delivered through the material inputting tool 44 of the delivering device 40 to the heating space 200 for being further heated.

Referring to FIG. 3, a feasible production management of the forging and pressing production system provided by the preferred embodiment of the present invention comprising the steps of:

601: inputting at least a material 100;
602: acquiring at least one characteristic of the material 100;
603: selecting the forging and pressing processing mode for the material 100 according to the acquired characteristic of the material 100;
604: transporting the material 100 according to the selection result;
605: processing the material 100 according to the selected processing mode;
606: outputting the manufacture and pressed material 100.

More specifically, the material 100 is a metal or alloy material that needs to be manufactured through forging and pressing so as to be formed and shaped. Person skilled in the art should be able to understand that for the forging and pressing process of the material 100, it has to comprehensively consider the conditions of the material 100 so as to have the material 100 be reshaped and formed into the product under a certain temperature and pressure. Usually, the material 100 is a blank when being input and then through the production system the material becomes a product. It is worth mentioning that in the production phase of the material 100, the operational variables, such as pressure, temperature, molding, and etc., which have to be controlled, are matched, coordinated, and related, so as to enhance the automation of the production process for the end product of the material 100. Besides, for the mass production, the stable corresponding relationships of the operational variables corresponding to the material 100 ensure the uniformity of the end product and high production efficiency.

In addition, the material 100 has at least a characteristic, wherein the characteristic can be acquired, sensed, and collected for determining and selecting the processing mode of the material. In other words, the material 100 has certain qualities that can be detected and sensed. Then, the subsequent processing modes vary in dealing with various materials 100. Furthermore, specific parameters of the forging and pressing process are different as well, which not only allows the material 100 to be manufactured into various types of products, but also enable corresponding processes based on the conditions of the materials 100, so as to correspondingly provide appropriate forging and pressing processes to the materials 100. Especially for metal or alloy, suitable temperature and pressure of the forging and pressing process exert significant influences to the metallic performance. Hence, the production system is suitable for processing different materials 100 into corresponding products through utilizing customization-like means to acquire, sense, and process the materials 100.

It is worth mentioning that the production system does not require manual operation. Rather, it automatically performs forging and pressing processes for the materials 100. Moreover, the material 100 transported in the step 604 relies on mechanized operation, which avoids the material 100 in the high temperature stage from contacting the labor, so as to safeguard the production safety and reliability. Referring to FIG. 3, a processing flow of the forging and pressing production system is illustrated. First, the material 100 is input into the production system. This is the step of inputting material in the production system as illustrated in the figure. After the material 100 enters the production system, the processing of each of the material 100 has to be acquired and sensed. The operational variables are determined according to the needs of the end products of the material 100. Preferably, the characteristics of the material 100 are acquired through sensing, so as for ensuring the characteristics of each of the materials 100 are learned by the production system. Then, because the characteristics of each of the materials 100 vary and the required forging and pressing processes are therefore different as well, hence selections are needed. In other words, it determines and selects the types of the process of the later period for the materials 100 based on the different characteristics and conditions of the materials 100. Next, the materials 100 will be transported to the selection result according to the acquired characteristics of the materials 100, so as to have the materials 100 to be correspondingly processed. It should be noticed that because the material 100 has to go through a high temperature condition during the forging and pressing process, the step of transporting the material 100 does not require manual operation and contact, which ensures the production safety. Further, the material 100 is processed according to the processing mode of the selection result, such that the processing and handling means of the material 100 are decided by the conditions of the material 100. Finally the material 100 will be produced, so as to complete the discharging and finish the forging and pressing processing for the material 100.

The forging and pressing production system further provides and performs the following step between the step 605 and the step 606:

6051: examining the material 100.

After the material 100 is processed and finished, it has to determine if the material 100 is qualifiedly manufactured and formed through examining the forging and pressing condition of the material 100. The qualified material 100 will further be produced and output. The unqualified material 100 will be eliminated and discharged and then it will return to the step 602. In other words, the material 100 will further be returned to the beginning of the forging and pressing production system to restart the production and manufacturing process of the material 100.

After the examination of the step 6051, the material 100 is formed in the manner that conforms to requirements, so as to complete the forging and pressing process. It is worth mentioning that the executed examination criteria are different for different types of the materials 100. All in all, the blanks of various materials 100 are input into the forging and pressing production system, sensed and acquired, processed, and eventually manufactured and formed into various types of the products of the materials 100. Then, it will execute different examination criteria for these products so as to guarantee that the materials 100 being produced meet the corresponding production standards.

Person skilled in the art should be able to understand that the material 100 has at least a characteristic defining the material 100 from a different perspective. The characteristics of the material 100 further comprises an external physical characteristic 101, a temperature characteristic 102, and a position characteristic 103. The external physical characteristic 101 represents the numeric value of the shape of the material 100, wherein the shape of the material 100 can be identified through the external physical characteristic 101. Preferably, the shape information of the material 100 is obtained through the corresponding coordination between the distance sensor, the weight sensor or multiple sensors. The temperature characteristic 102 represents the numeric value of the temperature of the material 100, wherein the surface temperature of the material 100 may be identified through the temperature characteristic 102. Preferably, the information of the surface temperature of the material 100 is obtained through the corresponding coordination between the temperature sensor, the infrared sensor or multiple sensors. The position characteristic 103 represents the numeric value of the relative position of the material 100, wherein the position of the material 100 may be identified through the position characteristic 103. Preferably, the information of the relative position of the material 100 is obtained through the corresponding coordination between the distance sensor, the pressure sensor or multiple sensors. The forging and pressing mode required by or corresponding to the material 100 is obtained according to the external physical characteristic 101, the temperature characteristic 102, and the position characteristic 103. For example, if the external physical characteristic 101 is the $\phi$ 6 copper alloy, it can be predetermined that the material has to be heated to 700° C. and be stamped to form through an A type mold, so that the processing mode of heating, pressing, and mold for the material 100 will be selected accordingly and the selection result will be executed of itself so as to produce a predetermined product.

Figure 4:
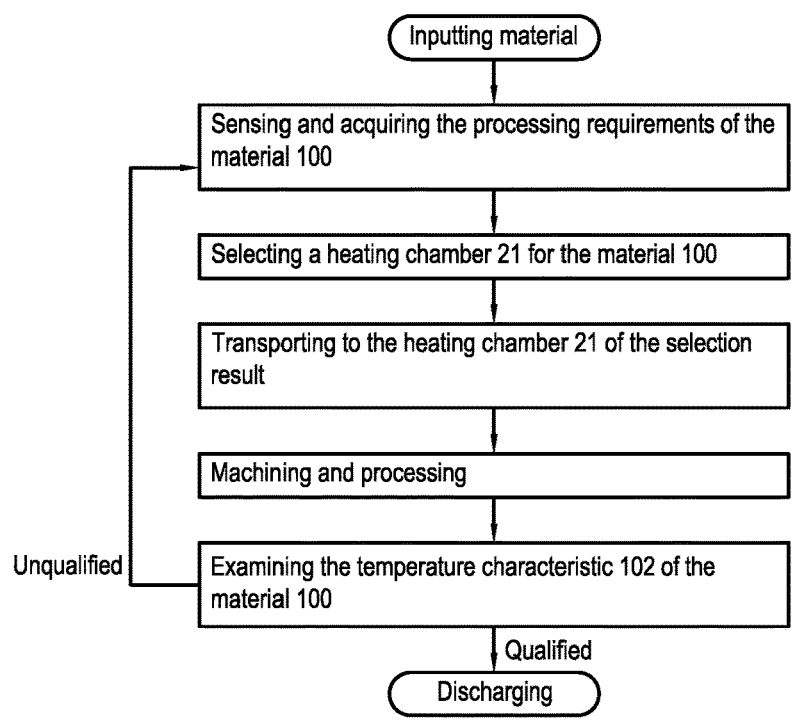
FIG. 4 is a flow diagram of a potential mode of the forging and pressing production management method according to the above first preferred embodiment of the present invention.

Referring to FIG. 4, a specific processing flow of the forging and pressing production system is illustrated. For easier describing and understanding, the figure just focuses on describing the progress of one of the materials of the preferred embodiment. It is understandable that as for a plurality of the material 100, modes of parallel execution or cycle interruption can both achieve the process. First, the material 100 is input and the manufacturing of the material 100 in the forging and pressing production system starts. That is the step 601. The sensors are utilized for acquiring characteristics of the material 100 so as to correspondingly obtain the processing requirements of the material 100 and control the matched operational variables. According to the present preferred embodiment, the external physical characteristic 101 of the material 100 are collected so as to obtain the data regarding the shape of the material 100. That is the step 602. Then the blank shape of the material 100 is determined according to the data of the external physical characteristic 101 thereof. According to the present preferred embodiment, the blank type is acquired from the shape of the material 100. In other words, when different types of the materials 100 are input into the forging and pressing production system, the material 100 of are determined and processed based different sensed information of the different material 100. According to a feasible situation, the material 100 of the predetermined shape and type will enter the next step, while those fail to meet the predetermined conditions will be eliminated and discharged. According to another feasible situation, there are two demands for the shape suitable for manufacturing, which means that there are two types of the materials 100 suitable for being further formed and shaped. According to different needs, the materials 100 are to be sorted in the step 603. Preferably, suitable mold for the material 100 will be decided depending on the external physical characteristic 101 of the material 100. Then, the material 100 is transported and delivered to the selection result, which refers to the step 604. Then, correspondingly, the material 100 will be pressed and formed in the mold. That is the step 605. After the processing is completed, the external physical characteristic 101 of the material 100 is changed. Then the external physical characteristic 101 of the material 100 is examined, so as to understand if the material 100 is a qualified product, which is the step 6051. For the qualified product, the forging and pressing production method will be ended and the material 100 will be produced and output, which refers to the discharging of the step 606. The unqualified material 100 will be returned to the start to be further processed or eliminated depending on the condition of the material 100.

It is worth mentioning that, it will utilize the step 603 to decide the heating mode for the material 100 in the heating chamber 21 based on the characteristic of the material 100 sensed and acquired in the step 602. Furthermore, the heating chamber 21 may have different processing mode for different materials 100. Namely, the heating mode is correspondingly decided based on different sensing and acquiring result of the material 100. Furthermore, there may be at least two of the heating spaces 200 for providing heating modes for at least two of the materials 100. Further, besides of the control to the heating space 200, the time and position that the material 100 stays in the heating space 200 may also be controlled, so as to achieve processing of different heating modes.

The forging device 30 presses to form and shape the material 100 that has been heated, so as for forming the material 100. The forging device 30 further provides a mold 31 and a pressing mechanism 32. The delivering device 40 inputs the material 100 into the mold, wherein the pressing mechanism 32 exerts pressure on the material 100 in the mold 31 so as to form and shape the material 100. The forging device 30 further provides a forging space 300, formed and defined between the mold 31 and the pressing mechanism 32. The material 100 is stamped and pressed by the pressing mechanism 32 in the forging space 300, such that the material 100 under high temperature can be formed and shaped. Based on the sensing and acquiring result of the step 602 and the selection result of the step 603, the material 100 will be transported by the delivering device 40 to the forging space 300 corresponding to the corresponding mold 31, which refers to the step 604. It is worth mentioning that the pressing mechanism 32 can controllably adjust its pressing mode based on the production needs of the material 100. For instance, the exerting pressure or pressing angle of the pressing mechanism 32 can be adjusted based on the sensing and acquiring result of the step 602. According to a feasible implementation, the forging device 30 comprises at least two of the pressing mechanisms 32, which pressing modes are different to each other. The materials 100 of different requirements are transported by the delivering device 40 to different of the pressing mechanisms 32, such that the materials 100 of different requirements can be processed or pressed differently. In other words, the forging device 30 is customized correspondingly to the characteristics of the material 100. Preferably, the mold 31 is corresponding to the external physical characteristic 101 of the material 100 and the pressing mechanism is corresponding to the temperature characteristic 102, so as for different alloy blanks to receive suitable forging and pressing processes.

It is worth mentioning that the heating space 200 and the forging space 300 may be in a saturated state. When the heating space 200 and the forging space 300 are saturated, which means that there is no hot melt device 20 and the forging device 30 for the subsequent material 100, the delivering device 40 will have the material 100 wait or adjust the transportation to the unsaturated heating space 200 and forging space 300. Hence, due to the limits of the heating space 200 and the forging space 300, the delivering device 40 will adjust the mode of transporting the material 100 so as to ensure the circulation efficiency of the material 100 before, between, and after the hot melt device 20 and the forging device 30.

Figure 5:
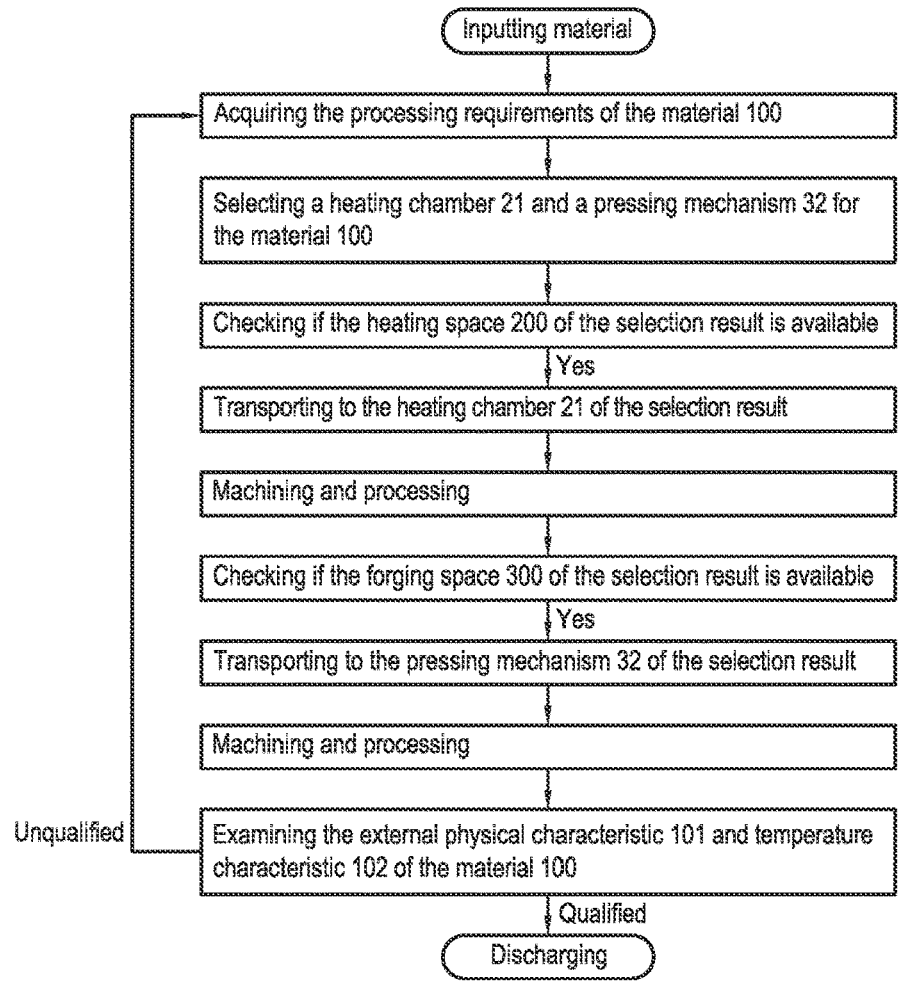
FIG. 5 is a flow diagram of the temperature control of the forging and pressing production management method according to the above first preferred embodiment of the present invention.
Figure 7:
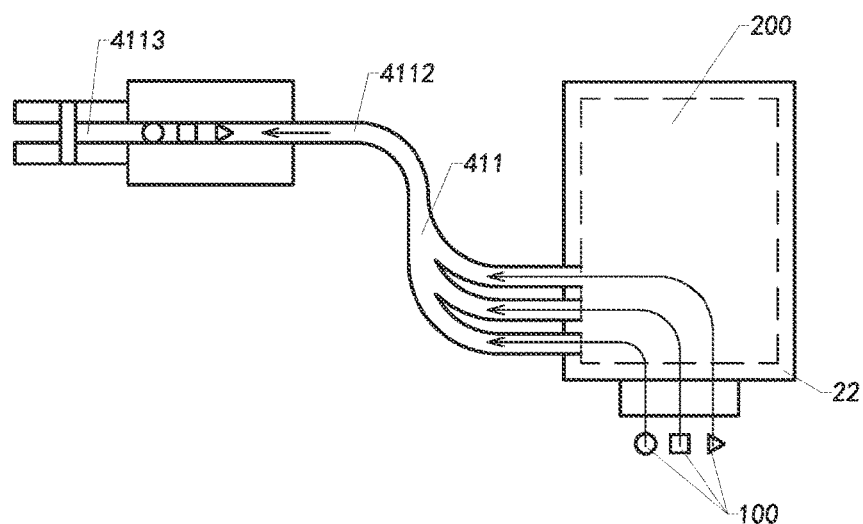
FIG. 7 is a perspective view illustrating part of the flow of the above mode of the forging and pressing production system according to the above first preferred embodiment of the present invention.

Referring to FIGS. 5 and 7, a specific processing flow of a production management method based on the above mentioned forging and pressing production system is illustrated. Usually, the material 100 is a blank when being input and then the material becomes a high temperature blank after passing through the heating chamber 21 of the forging and pressing production system. The material becomes a billet or formed blank after passing through the pressing mechanism 32 of the forging and pressing production system. For easier describing and understanding, the figure just focuses on describing the progress of one of the materials of the preferred embodiment. It is understandable that as for a plurality of the material 100, modes of parallel execution or cycle interruption can both achieve the process. First, the material 100 is input and the manufacturing of the material 100 in the forging and pressing production system starts. That is the step 601. Then, sensors are utilized to acquire the characteristics of the material 100. According to the present preferred embodiment, the temperature characteristic 102 of the material 100 are collected so as to obtain the data regarding the surface temperature of the material 100. That is the step 602. Then the blank type of the material 100 is determined according to the data of the temperature characteristic 102 thereof. According to the present preferred embodiment, the blank type and temperature required for the subsequent process of the material 100 are acquired from the temperature of the material 100. In other words, when different types of the materials 100 are input into the forging and pressing production system, the material 100 of are determined and processed based different sensed information of the different material 100. According to different needs, the materials 100 are to be sorted in the step 603. Preferably, suitable heating chamber 21 for the material 100 will be decided depending on the temperature characteristic 102 of the material 100. Next, the material 100 becomes the high temperature blank and is transported and delivered to the selection result, which refers to the step 604. Then, correspondingly, the material 100 will be heated to a predetermined temperature in the heating chamber 21. That is the step 605. After the processing is completed, the temperature characteristic 102 of the material 100 is changed. Then the temperature characteristic 102 of the material 100 is examined, so as to understand if the material 100 is a qualified product, which is the step 6051. For the qualified product, the forging and pressing production method will be ended and the material 100 will be produced and output, which refers to the discharging of the step 606. The unqualified material 100 will be returned to the start to be further processed or finally eliminated depending on the condition of the material 100.

Moreover, according to another feasible mode, first, the material 100 is input and the manufacturing of the material 100 in the forging and pressing production system starts. That is the step 601. Then, sensors are utilized to acquire the characteristics of the material 100. According to the present preferred embodiment, the external physical characteristic 101 and the temperature characteristic 102 of the material 100 are collected so as to obtain the data regarding the shape and the surface temperature of the material 100. That is the step 602. Then the blank type of the material 100 is determined according to the data of the external physical characteristic 101 and the temperature characteristic 102 thereof. According to the present preferred embodiment, the blank type and temperature required for the subsequent process of the material 100 are acquired from the external physical characteristic 101 of the material 100. In other words, when different types of the materials 100 are input into the forging and pressing production system, the material 100 of are determined and processed based different sensed information of the different type of the material 100. According to different needs, the materials 100 are to be sorted in the step 603. Preferably, suitable pressing mechanism 32 for the material 100 will be decided depending on the type of the material 100. Next, the material 100 becomes the billet and is transported and delivered to the forging space 300 of the selection result, which refers to the step 604. Then, correspondingly, the material 100 will be pressed and formed in the pressing mechanism 32. That is the step 605. After the processing is completed, the external physical characteristic 101 of the material 100 is changed, which means it has become the billet. Then the external physical characteristic 101 of the material 100 is examined, so as to understand if the material 100 is a qualified product, which is the step 6051. For the qualified product, the forging and pressing production method will be ended and the material 100 will be produced and output, which refers to the discharging of the step 606. The unqualified material 100 will be returned to the start to be further processed or finally eliminated depending on the condition of the material 100.

The delivering device 40 of the forging and pressing production system, according to the present preferred embodiment, further comprises a feeding tool 41 and a conveying tool 42. When the material 100 needs to be automatically conveyed between the hot melt device 20 and the forging device 30, the feeding tool 41 delivers the material 100 from the hot melt device 20 to the forging device 30, while the conveying tool 42 sends the material 100 from the forging device 300 to the discharge tool 43. This is the stage that the feeding tool 42 is utilized to operate the high temperature blank of the material 100 and the stage that the conveying tool 42 is utilized to operate the billet of the material 100. It is worth mentioning that in the flow of the processes, the material 100 does not require extra man-power transportation, so as to keep the material 100 of high temperature condition away from the labors and ensure the safety in the production of the material 100.

Figure 8:
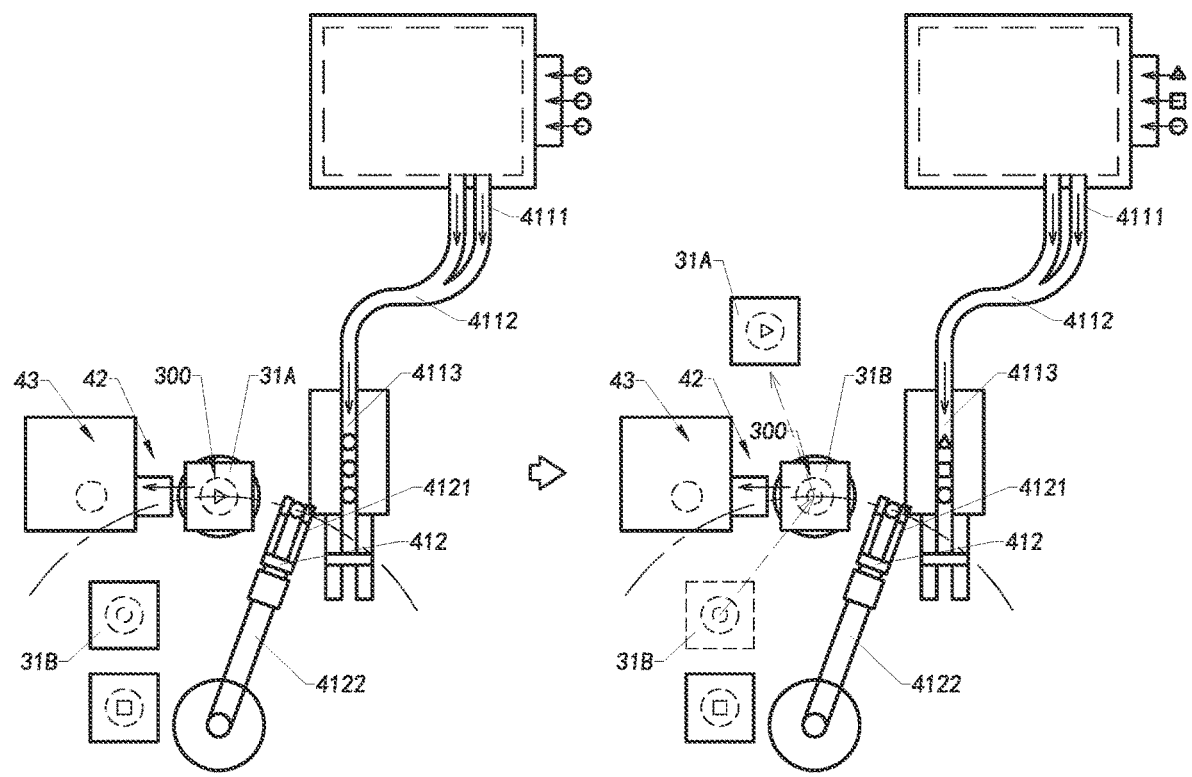
FIG. 8 is a perspective view of the mold control of the forging and pressing production management method according to a second preferred embodiment of the present invention.
Figure 9:
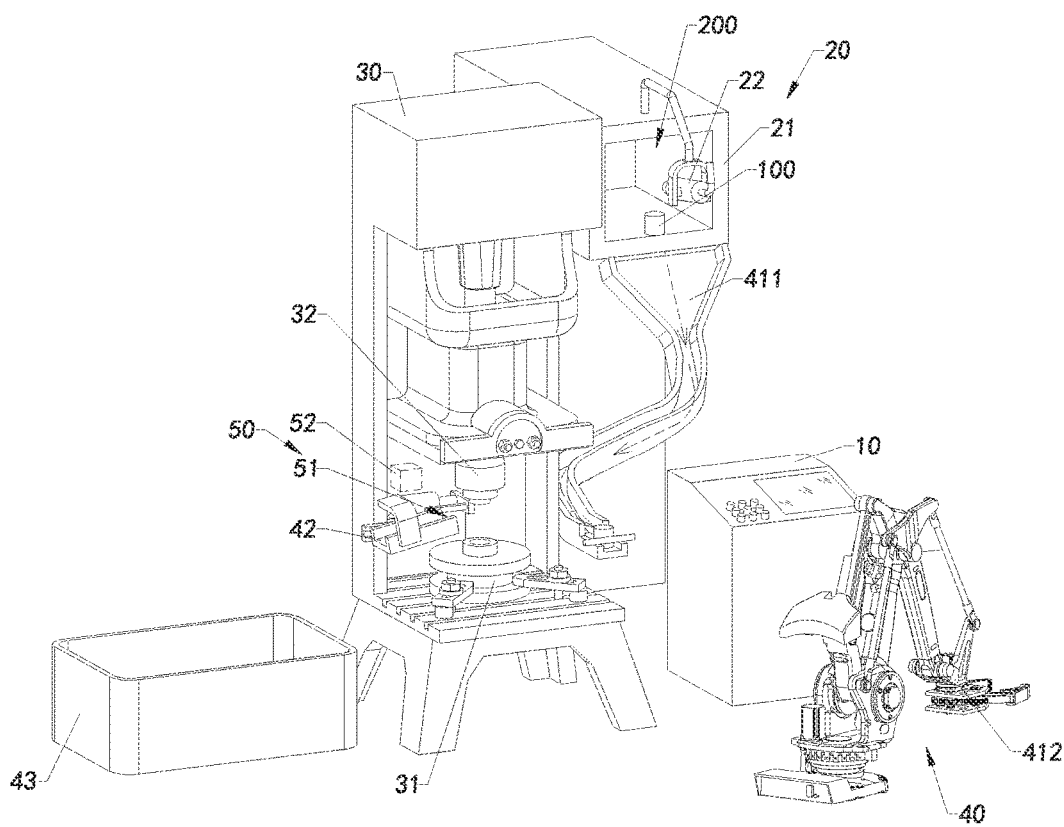
FIG. 9 is an overall perspective view of the forging and pressing production system according to the above second preferred embodiment of the present invention.

Furthermore, referring to FIGS. 8-9, according to another preferred embodiment, the feeding tool 41 of the delivering device 40 further comprises a slide rail mechanism 411 and a transport mechanism 412, wherein the slide rail mechanism 411 is connected with the heating chamber 21, so as to allow the material 100 left the heating chamber 21 fall down to the slide rail mechanism 411, wherein the transport mechanism 412 transports the material 100 from the slide rail mechanism 411 to the forging device 40. The slide rail mechanism 411 has at least a collection end 4111, a sliding channel 4112, and a providing end 4113. The collection end 4111 obtains the heated material 100 from the heating chamber 21 and the material 100 eventually reaches the providing end 4113 through the sliding channel 4112. In other words, the transport mechanism 412 starts the transportation from the position of the providing end 4113. Then for the transport mechanism 412, the starting point and the end point of the transportation are very easy to locate. Preferably, the transport mechanism 412 comprises a clamping end 4121 and a transfer arm 4122, wherein the clamping end 4121 is adapted for operating the material 100 and be position shifted through the transfer arm 4122.

Figure 6:
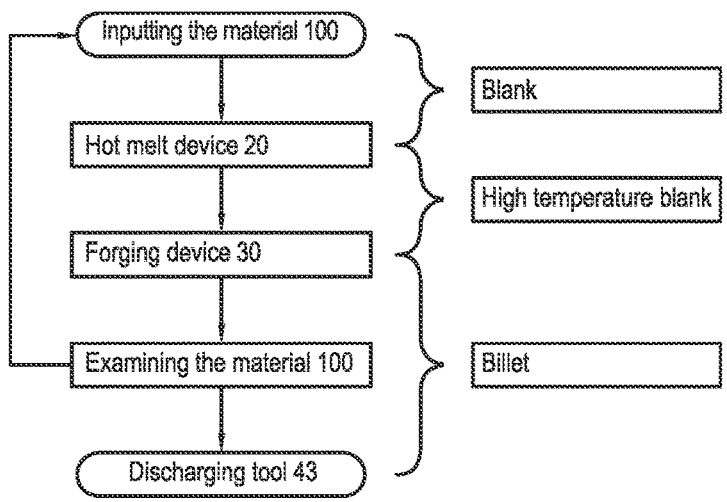
FIG. 6 is a flow diagram of a potential mode of the forging and pressing production management method according to the above first preferred embodiment of the present invention.

Referring to FIGS. 5 and 6, the steps and flow that the material 100 processed through the hot melt device 20 and the forging device 30 are illustrated.

For easier describing and understanding, the description just focuses on the progress of one of the materials according to the preferred embodiment. It is understandable that as for a plurality of the material 100, modes of parallel execution or cycle interruption can both achieve the process. First, the material 100 is input and the manufacturing of the material 100 in the forging and pressing production system starts. performing the material inputting tool 44. Then, sensors are utilized to acquire the characteristics of the material 100. According to the present preferred embodiment, the external physical characteristic 101 and the temperature characteristic 102 of the material 100 are collected so as to obtain the proper processing mode of the material 100. That is the step 602. Then the blank type of the material 100 is determined according to the data sensed and acquired. According to the present preferred embodiment, the blank type and temperature required for the subsequent process of the material 100 are acquired from the temperature of the material 100. In other words, when different types of the materials 100 are input into the forging and pressing production system, the material 100 of are determined and processed based different sensed information of the different material 100. According to different needs, the materials 100 are to be sorted in the step 603. Preferably, suitable heating chamber 21 and pressing mechanism 32 for the material 100 will be decided depending on the type of the material 100. Then, the material 100 is transported and delivered to the selection result, which refers to the step 604. It is worth mentioning that it has to determine if the heating space 200 is in a vacant state so as for heating the material 100 before it is sent to the heating space 200. When the heating space 200 is vacant, the material 100 will continue to be transported to the heating chamber 21. Then, correspondingly, the material 100 will be heated to a predetermined temperature in the heating chamber 21. That is the step 605. After the processing is completed, the temperature characteristic 102 of the material 100 is changed. Then the temperature characteristic 102 of the material 100 is examined, so as to understand if the material 100 is a qualified product, which is the step 6051. For the qualified product, the forging and pressing production method will be ended and the material 100 will be produced and output, which refers to the feeding process 41. The unqualified material 100 will be returned to the start to be further processed or finally eliminated depending on the condition of the material 100. It should be noticed here that inputting the material 100 for the feeding process 41 for the forging device 30 is the step 601 of the forging device 30. Then, sensors are utilized to acquire the characteristics of the material 100. According to the present preferred embodiment, the external physical characteristic 101 and the temperature characteristic 102 of the material 100 are collected so as to obtain the data regarding the shape and the surface temperature of the material 100. That is the step 602 for the forging device 30. Then the type of the material 100 is determined according to the data of the external physical characteristic 101 and the temperature characteristic 102 thereof. According to the present preferred embodiment, the blank type and the arrangement of the mold 31 and the pressing mechanism 32 required for the subsequent process of the material 100 are acquired from the external physical characteristic 101 of the material 100. In other words, when different types of the materials 100 are input into the forging and pressing production system, the material 100 of are determined and processed based different sensed information of the different type of the material 100. Then, the material 100 is transported to the forging space 300 of the selection result, which refers to the step 604. It is worth mentioning that the vacancy and availability of the forging space 300 is further determined before the feeding tool 41 of the delivering device 40 delivers and transfers the material 100 to the pressing mechanism 32. The material 100 will continue to be transported to the pressing mechanism 32 in dealing with the vacancy of the forging space 300. Then, correspondingly, the material 100 will be pressed and formed in the pressing mechanism 32. That is the step 605. After the processing is completed, the external physical characteristic 101 of the material 100 is changed and is sent out from the pressing mechanism 32 by the conveying tool 42. Then the external physical characteristic 101 and the temperature characteristic 102 of the material 100 is examined, so as to understand if the material 100 is a qualified product, which is the step 6051. For the qualified product, the forging and pressing production method will be ended and the material 100 will be produced and output, which refers to the discharging tool 43 corresponding to the step 606. The unqualified material 100 will be returned to the start to be further processed or finally eliminated depending on the condition of the material 100.

It should be noticed that the elimination and discharging here is different from it of the discharging tool. The elimination and discharging of the material 100 represents that the material 100 is eliminated and discharged from the forging and pressing production system to wait for further recycling. The discharging tool 43 is made for allowing the material 100 to be normally processed and produced to either become a product or wait for next process and leave the forging and pressing production system. In other words, the discharging tool 43 manipulates the billet, the formed blank, of the material 100 and eliminates and discharges the waste material of the material 100.

According to the present preferred embodiment, the forging and pressing production system provides a control platform 10, wherein the control platform 10 further comprises an arithmetic unit 11, a feedback unit 12, an actuator 13, and a monitor unit 14. Referring to FIG. 2, the arithmetic unit 11, the feedback unit 12, the actuator 13, and the monitor unit 14 are communicatively connected with one another. The arithmetic unit 11 calculates the feedback data obtained by the feedback unit 12 from the hot melt device 20 and the forging device 30 from controlling, so that the actuator 13 can control the heating chamber 21, the pressing mechanism 32, and the delivering device 40. The monitor unit 14 can load predetermined relative controlling parameters into the arithmetic unit 11 and display the feedback information of the feedback unit 12, so as to achieve interactive controlling.

For the step 605, the forging and pressing production system further comprises a maintenance device 50. The maintenance device 50 is controlled by the control platform 10 and further maintenance is conducted according to the needs of the hot melt device 20 or the forging device 30, so as to maintain the production capacity of the hot melt device 20 or the forging device 30 and to supply the overall efficiency of the forging and pressing production system. Furthermore, the maintenance device 50 further comprises an oiling tool 51 and a smoke discharge tool 52, as illustrated in FIG. 9. The oiling tool 51 is arranged on the pressing mechanism 32 so as for oiling and maintaining the pressing mechanism 32 and the mold 31. The smoke discharge tool 52 is arranged on the oiling tool 52 so as for recycling the high temperature oil fume, which ensures the cleaning of the work environment of the pressing mechanism 32.

Referring to FIGS. 5 and 6 the circulation and flow between the heating chamber 21 and the pressing mechanism 32 is illustrated. First, the material 100 is heated to a predetermined temperature in the heating chamber 21, so as to make the material 100 in a high temperature state. The material 100 is sent to the feeding tool 41. Because the temperature characteristic 102 of the processed material 100 has been changed, it is necessary to examine the temperature characteristic 102 of the material 100 so as to understand that if the material 100 is suitable for the process of the forging device 30. The product of suitable temperature will be for the feeding process 41. The unqualified material 100 will eventually be eliminated and discharged. It should be noticed here that inputting the material 100 for the feeding process 41 for the forging device 30 is the step 601 of the forging device 30. Then, sensors are utilized to acquire the characteristics of the material 100. According to the present preferred embodiment, the external physical characteristic 101 and the temperature characteristic 102 of the material 100 have been collected so as to obtain the data of the shape and surface temperature of the material 100 to determine the type of the material 100. In other words, different material 100 are input into the forging and pressing production system, the material 100 are determined and processed based on the sensed blank types. Then, the vacancy and availability of the forging space 300 is judged and determined. The feeding tool 41 will continue transporting the material 100 to the pressing mechanism 32 in dealing with the vacancy of the forging space 300. It will wait when the forging space 300 is unavailable. It should be noticed that the temperature of the material 100 in wait is examined as well, so as to ensure the high temperature condition of the material 100. In other words, only when the temperature of the material 100 is suitable and the forging space 300 is available, the feeding tool 41 of the delivering device 40 will deliver and transport the material 100 to the pressing mechanism 32. Then, the material 100 will be pressed and formed in the corresponding pressing mechanism 32. Eventually, it is sent out from the forging device 30 through the conveying tool 42. When the material 100 leaves the forging device 30, the oiling tool 51 of the maintenance device 50 starts to perform on the forging device 30. In other words, the pressing mechanism 32 has operation of the oiling tool 51 correspondingly each time. It should be noticed that the feeding tool 41 and the conveying tool 42 both help to deliver the material 100 of a high temperature state, so that the material 100 can keep its high temperature and be circulated and processed of itself.

Referring to FIG. 1, the present preferred embodiment illustrates various types of the materials 100 and provides three types of the materials 100, as examples, needed to be processed. In advance, specific manufacturing modes are set up and arranged through the control platform 10. For example, the material 100 of square shape is arranged to be formed through pressing with the mold 31B with a certain pressure; the material 100 of circular shape is arranged to be formed through pressing with the mold 31A with a certain pressure; and the material 100 of triangle shape is arranged to be formed through pressing with the mold 31C with a certain pressure. First, the material 100 is input and the manufacturing of the material 100 in the forging and pressing production system starts. The material inputting tool 44 is performed. Then, sensors are utilized to acquire the characteristics of the material 100. The external physical characteristic 101 and the temperature characteristic 102 of the material 100 are collected so as to obtain the proper processing mode of the material 100. That is the step 602. The blank type of the material 100 is determined according to the data sensed and acquired. According to the present preferred embodiment, the blank type and temperature required for the subsequent process of the material 100 are acquired from the temperature of the material 100. In other words, when three types of the materials 100 are input into the forging and pressing production system, the material 100 are correspondingly determined and processed based on the sensed information of the material 100. According to different needs, the materials 100 are to be sorted in the step 603. Preferably, suitable heating chamber 21 and pressing mechanism 32 and corresponding processing mode for the material 100 will be decided depending on the type of the material 100. Then, the material 100 is transported and delivered to the selection result, which refers to the step 604. It is worth mentioning that it has to determine if the heating space 200 is in a vacant state so as for heating the material 100 before it is sent to the heating space 200. When the heating space 200 is vacant, the material 100 will continue to be transported to the heating chamber 21. Then, correspondingly, the material 100 will be heated to a predetermined temperature in the heating chamber 21. In the current procedure, the time that the material 100 stays in the heating space 200 is controlled in order for different heating result.

After the processing is completed, the temperature characteristic 102 of the material 100 is changed. Then the temperature characteristic 102 of the material 100 is examined, so as to understand if the material 100 is a qualified product, which is the step 6051. Qualified product outputs the material 100 for the feeding process 41. Preferably, the feeding process 41 is completed by means of the coordination of the slide rail and robot arm. The unqualified material 100 will be returned to the start to be further processed or finally eliminated depending on the condition of the material 100. Then, sensors are utilized to acquire the characteristics of the material 100. The type of the material 100 is determined according to the acquired data of the shape of the material 100 based on the external physical characteristic 101 of the material 100. According to the present preferred embodiment, the blank type and the arrangements of the mold 31 and the pressing mechanism 32, which are specifically the mold 31A, 31B or 31C and the corresponding pressure and angle, required for the subsequent process of the material 100 are acquired from the external physical characteristic 101 of the material 100. In other words, when different types of the materials 100 are input into the forging and pressing production system, the material 100 of are determined and processed based on the different sensed information of the different type of the material 100. Then, the material 100 is transported to the forging space 300 corresponding to the mold 31 of the selection result, which refers to the step 604. It is worth mentioning that the vacancy and availability of the forging space 300 is further determined before the feeding tool 41 of the delivering device 40 delivers and transfers the material 100 to the pressing mechanism 32. The material 100 will continue to be transported to the pressing mechanism 32 in dealing with the vacancy of the forging space 300. Then, correspondingly, the material 100 will be pressed and formed in the pressing mechanism 32. That is the step 605. After the processing is completed, the external physical characteristic 101 of the material 100 is changed and is sent out from the pressing mechanism 32 by the conveying tool 42. Then the external physical characteristic 101 and the temperature characteristic 102 of the material 100 is examined, so as to understand if the material 100 is a qualified product. For the qualified product, the forging and pressing production method will be ended and the material 100 will be produced and output, which refers to the discharging tool 43 corresponding to the step 606. The unqualified material 100 will be returned to the start to be further processed or finally eliminated depending on the condition of the material 100.

According to another embodiment, the production management method comprises the steps of:
A. acquiring at least one characteristic of a fed material;
B. correspondingly selecting, according to the characteristic of the material, at least one of the temperature, the pressure or a mold from among operating factors of the forging and pressing process;
C. transporting the material according to the selection result; and
D. processing the material until a finished product is produced.

Specifically, based on the needs, the material 100 as a raw material is selected for the processed end product of the material 100 and the operational variables of the forging and pressing production system are set up for the production.

In other words, referring to FIG. 8, for the material 100 of the same type, the forging and pressing production device is adjusted in the temperature, pressure, and mold, so as for producing the end product corresponding to the material 100. The operational variables corresponding to the material 100 are set up in advance through the corresponding allocated relation setting on the control platform 10. For instance, the previous operation utilizes the triangular mold 31A for the forging and pressing production. Next, the material 100 is input and the manufacturing of the material 100 in the forging and pressing production system starts. Enters the material inputting tool 44. Then, sensors are utilized to acquire the characteristics of the material 100. The external physical characteristic 101 and the temperature characteristic 102 of the material 100 are collected so as to obtain the proper processing mode of the material 100. Therefore, it determines to utilize the mold 31B based on the circular characteristic of the material 100 in this case. That is the step 602. The blank type of the material 100 is determined according to the data sensed and acquired. According to the present preferred embodiment, the blank type and temperature required for the subsequent process of the material 100 are acquired from the temperature of the material 100. In other words, when three types of the materials 100 are input into the forging and pressing production system, the material 100 are correspondingly determined and processed based on the sensed information of the material 100. According to different needs, the materials 100 are to be sorted in the step 603. Preferably, suitable heating chamber 21 and pressing mechanism 32 and corresponding processing mode for the material 100 will be decided depending on the type of the material 100. That is to say, it replaces the triangular mold 31A with the circular mold 31B. Then, the material 100 is transported and delivered to the selection result, which refers to the step 604. It is worth mentioning that it has to determine if the heating space 200 is in a vacant state so as for heating the material 100 before it is sent to the heating space 200. When the heating space 200 is vacant, the material 100 will continue to be transported to the heating chamber 21. Then, correspondingly, the material 100 will be heated to a predetermined temperature in the heating chamber 21. In the current procedure, the time that the material 100 stays in the heating space 200 is controlled in order for different heating result. After the processing is completed, the temperature characteristic 102 of the material 100 is changed. Then the temperature characteristic 102 of the material 100 is examined, so as to understand if the material 100 is a qualified product, which is the step 6051. Qualified product outputs the material 100 for the feeding process 41. Preferably, the feeding process 41 is completed by means of the coordination of the slide rail and robot arm. The unqualified material 100 will be returned to the start to be further processed or finally eliminated depending on the condition of the material 100. Then, sensors are utilized to acquire the characteristics of the material 100. The type of the material 100 is determined according to the acquired data of the shape of the material 100 based on the external physical characteristic 101 of the material 100. According to the present preferred embodiment, the material 100 of circular shape is input based on the production demands, wherein the arrangements of the mold 31 and the pressing mechanism 32, which are specifically the mold 31A, 31B or 31C and the corresponding pressure and angle, required for the subsequent process are determined based on the external physical characteristic 101 of the material 100. This is different from the above preferred embodiment. In other words, when the demanded type of the material 100 is input into the forging and pressing production system, the material 100 is determined based on the difference of the type of the material 100. Then, the material 100 is transported to the forging space 300 corresponding to the mold 31B of the selection result, which refers to the step 604. It is worth mentioning that the vacancy and availability of the forging space 300 is further determined before the feeding tool 41 of the delivering device 40 delivers and transfers the material 100 to the pressing mechanism 32. The material 100 will continue to be transported to the pressing mechanism 32 in dealing with the vacancy of the forging space 300. Then, correspondingly, the material 100 will be pressed and formed in the pressing mechanism 32. That is the step 605. After the processing is completed, the external physical characteristic 101 of the material 100 is changed and is sent out from the pressing mechanism 32 by the conveying tool 42. Then the external physical characteristic 101 and the temperature characteristic 102 of the material 100 is examined, so as to understand if the material 100 is a qualified product. For the qualified product, the forging and pressing production method will be ended and the material 100 will be produced and output, which refers to the discharging tool 43 corresponding to the step 606. The unqualified material 100 will be returned to the start to be further processed or finally eliminated depending on the condition of the material 100.

Figure 10:
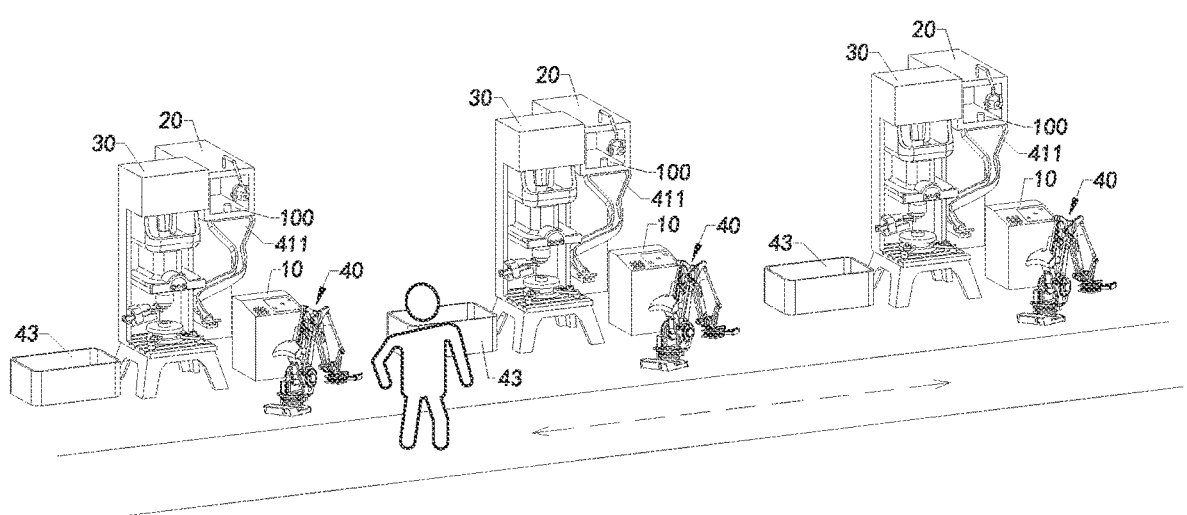
FIG. 10 is a perspective view of the production of the forging and pressing production system according to the above second preferred embodiment of the present invention.

Furthermore, FIGS. 9 and 10 illustrated the overall perspective views of the forging and pressing production system. The control platform 10 proceeds the specific setting of the production operational variables according to the input material 100. In other words, it does not completely rely on the identification and examination of the material 100, so as to reduce the operation loading of the control platform 10. The moving direction of the delivering device 40 is unidirectional, so as to facilitate production speed promotion. Preferably, the hot melt device 20 is arranged at a side of the forging device 30, so as to have the heating chambers 21 of the hot melt device 20 all face the same side. When a plurality of the forging and pressing production systems are set up and arranged, the worker can monitor the working states of the heating chambers 21 easily. Particularly, experienced staff may be invited to participate in the step 603 of the forging and pressing production management method. In other words, in order to prevent massive unemployment and experience loss, the forging and pressing production management method can give consideration to both realities of the production efficiency and the manpower management as well as enhance the overall production managerial effectiveness.

Referring to FIGS. 11-17, a forging and pressing production system according to a third preferred embodiment of the present invention will be illustrated below. The forging and pressing production system comprises a control system 910, a hot melt device 920, a forging device 930, a delivering device 940, and at least a waste material elimination device 950, wherein the control system 910 is communicatively coupled to the hot melt device 920, the forging device 930, the delivering device 940, and the waste material elimination device 950 so as for controlling the processing and transporting of the material among the devices and for allowing the material to be turned from a unprocessed blank into a processed and formed blank through the forging and pressing process of the forging device 930. The hot melt device 920 heats up the blank of the input material, wherein the control system 910 sets up the heating-up time, heating temperature, and heating mode of the hot melt device 920 according to the type of the material and the processing requirements and demands. The delivering device 940 transports the blank heated by the hot melt device 920 and transports the blank to the forging device 930 so that the blank can be forged and pressed by the forging device 930 and be processed into an end product.

The waste material elimination device 950 eliminates unqualified heated blanks, which are waste materials or scrap materials, such as blanks of unqualified temperatures, inappropriate sizes, inappropriate shapes, inappropriate weights, inappropriate positions, during the delivering process of the delivering device 940. It is understandable that, according to the preferred embodiment of the present invention, the waste material or scrap material is the blank that is not suitable to be processed in the forging device 930. The waste material elimination device 950 eliminates the waste materials that are not suitable for the forging device to process, so as to avoid the delivering device 940 from delivering the waste materials to the forging device 930 for the next forging and pressing step, which prevents the waste materials from damaging the forging device 930. The waste materials are eliminated from the processing process, so that the working efficiency and product yield of the forging and pressing production system are enhanced.

The forging and pressing production system further comprises at least a detecting device 960, wherein the detecting device 960 detects at least one of the characteristics of the blank, wherein the characteristics comprises shape characteristic, size characteristic, temperature characteristic, weight characteristic, material characteristic, position characteristic, and etc. The control system 910 determines if the blank is suitable for being processed in the forging device 930 based on the characteristic information detected by the detecting device 960. If the control system 910 determines that the blank meets the conditions for being forged and pressed based on the information detected by the detecting device 960, the blank will be forged by the forging device 930. On the contrary, if the control system determines that the blank does not meet the conditions for being forged and pressed based on the information detected by the detecting device 960, then the waste materials will be eliminated by the waste material elimination device 950, which avoids the waste material from being delivered to the forging device 930 and damaging the forging device 930.

The delivering device 940 delivers the blank to the hot melt device 920, wherein the hot melt device 920 is adapted for heating up the blank to the temperature suitable for the forging and pressing processing according to the time and the heating temperature set by the control system 910. Correspondingly, the delivering device 940 comprises at least a material inputting tool 944, wherein the material inputting tool 944 adds the blank into the hot melt device 920, so as for utilizing the hot melt device 920 to heat the blank. It is worth mentioning that what is the same to the above first preferred embodiment is that the hot melt device 920 comprises a heating chamber 921 and a heater 922, wherein the material inputting tool 944 adds the blank into the heating chamber 921, so as to utilize the heater 922 to heat the blank in the heating chamber 921 into the processing temperature set up by the control system 910 or to heat the blank based on the set heating-up time. It is worth mentioning that, according to the present invention, the heater 922 is arranged adjacent to the heating chamber 921 or the heater 922 is arranged inside of the heating chamber 921, so as for heating up the blank placed in the heating chamber 921. It is understandable that the heating mode of the heater 922 of the hot melt device 922 can be conducted through fuel burning or electrical heating, so as to heat up the heating chamber 921. It is worth mentioning that, according to the preferred embodiment of the present invention, the heating mode of the heater 922 is only for providing an example rather than a limit to the present invention. Hence, the heating mode of the heater 922 may also be embodied as other means, such as microwave heating and etc.

Figure 13A:
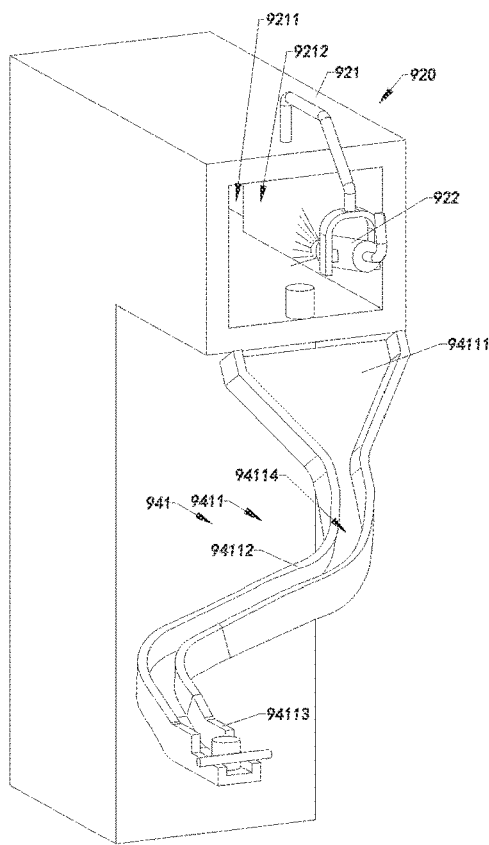
FIG. 13A is a perspective view of a hot melt device of the forging and pressing production system according to the above third preferred embodiment of the present invention.

Referring to FIG. 13A, the heating chamber 921 of the hot melt device 920 has at least a feed port 9211 and at least a discharge port 9212, wherein the material inputting tool 944 adds the unprocessed blank into the heating chamber 921 of the hot melt device 920 via the feed port 9211. The heated blank is taken out or delivered from the discharge port 9212 of the heating chamber 921. Preferably, the heater 922 is arranged close to the discharge port 9212 of the heating chamber 921, wherein the heater 922 heats from the outside of the discharge port 9212 toward the inside of the heating chamber 921. More preferably, the heater 922 heats the blank placed in the heating chamber 921 from the discharge port 9212 inwards and through fuel burning. It is understandable that the blank was input into the heating chamber 921 through the material inputting port 9211 of the heating chamber 921, wherein in the heating chamber 921, the temperature of the material inputting port 9211 is lower than the temperature of the discharge port 9212. Hence, the blank in the heating chamber 921 can be gradually heated from the low temperature material inputting port 9211 to the high temperature discharge port 9212. It is understandable that such heating mode helps to evenly heat the blank and provides a good heating performance. Besides, the blank can still maintain a relatively high temperature when it is heated and delivered from the discharge port 9212 to the outside.

Figure 11:
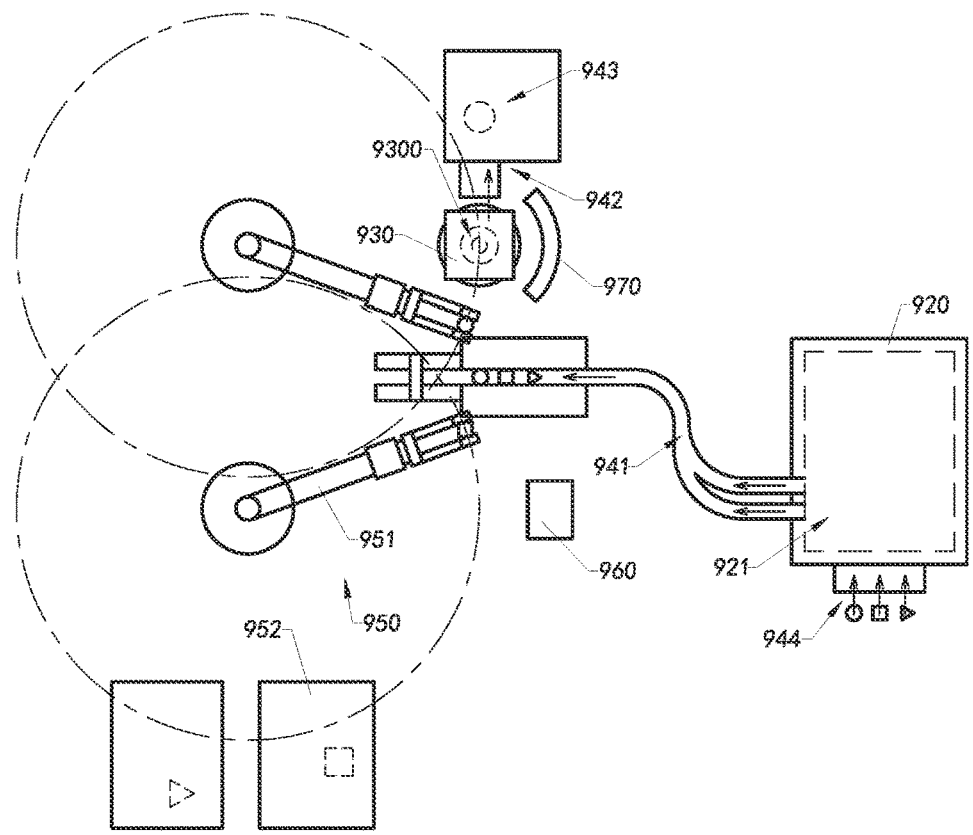
FIG. 11 is an overall perspective view of a forging and pressing production system according to a third preferred embodiment of the present invention.
Figure 12:
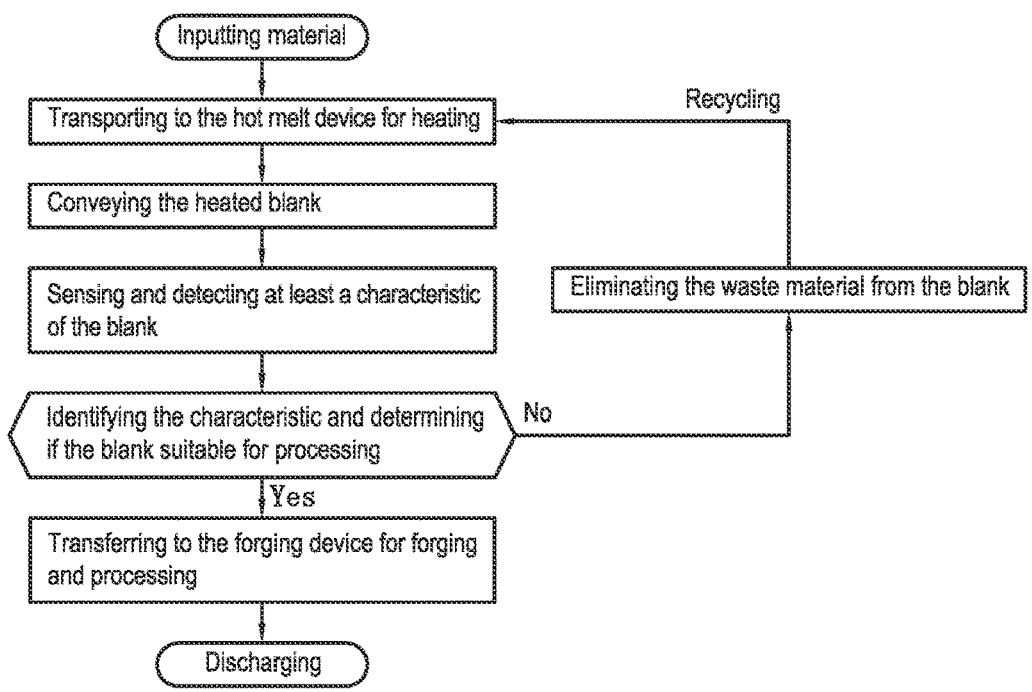
FIG. 12 is a production flow diagram of the forging and pressing production system according to the above third preferred embodiment of the present invention.

Referring to FIG. 11, the delivering device 940 further comprises at least a discharging tool 943, wherein the discharging tool 943 brings the processed material or formed blank from the forging and pressing production system. It is understandable that the discharging tool 943 is a device arranged at a tail end of the forging and pressing production system. The delivering device 940 further comprises at least a feeding tool 941 and at least a conveying tool 942, wherein the feeding tool 941 conveys the material from the hot melt device 920 to the forging device 930, wherein the conveying tool 942 delivers the material from the forging device 930 to the discharging tool 943. In other words, after the blank is heated, the feeding tool 941 will convey the blank to the forging device 930. Then the forged and formed blank will be delivered by the conveying tool 942 to the discharging tool 930, so that the forged and formed blank can be taken over by the discharging tool 943.

Correspondingly, the feeding tool 941 of the delivering device 940 further comprises a slide rail mechanism 9411 and a transport mechanism 9412, wherein the slide rail mechanism 9411 is connected with the heating chamber 921, so as to allow the blank left the heating chamber 921 fall down to the slide rail mechanism 9411, wherein the transport mechanism 9412 transports the blank from the slide rail mechanism 9411 to the forging device 940. It is worth mentioning that the slide rail mechanism 9411 of the feeding tool 941 is a sliding rail that receives and transports the blank. The slide rail mechanism 9411 further comprises at least a collection end 94111, a sliding channel 94112, and a providing end 94113. The collection end 94111 acquires the heated material 9100 from the heating chamber 921 and the material 9100 eventually reaches the providing end 94113 through the sliding channel 94112. Preferably, the blank moves from the collection end 94111 along the sliding channel 94112 to the providing end 94113. When a plurality of the blanks are taken from the hot melt device 920, the blanks are arranged successively along the sliding channel 94112 to the providing end 94113.

Figure 13B:
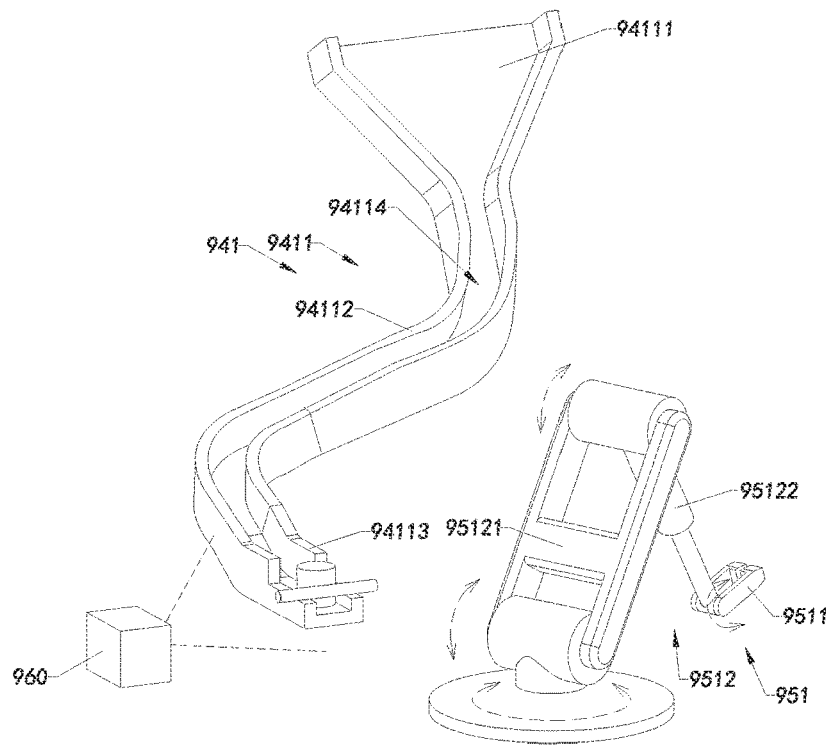
FIG. 13B is a perspective view illustrating the detection of a detecting device of the forging and pressing production system according to the above third preferred embodiment of the present invention.
Figure 13C:
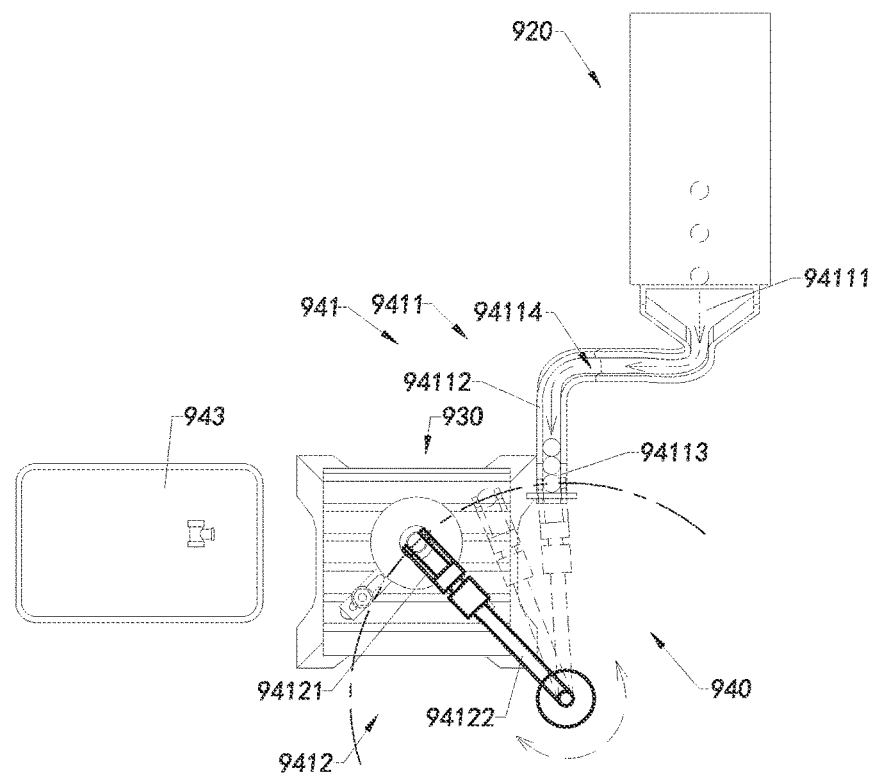
FIG. 13C is a perspective view illustrating the transportation of the material of the forging and pressing production system according to the above third preferred embodiment of the present invention.
Figure 14:
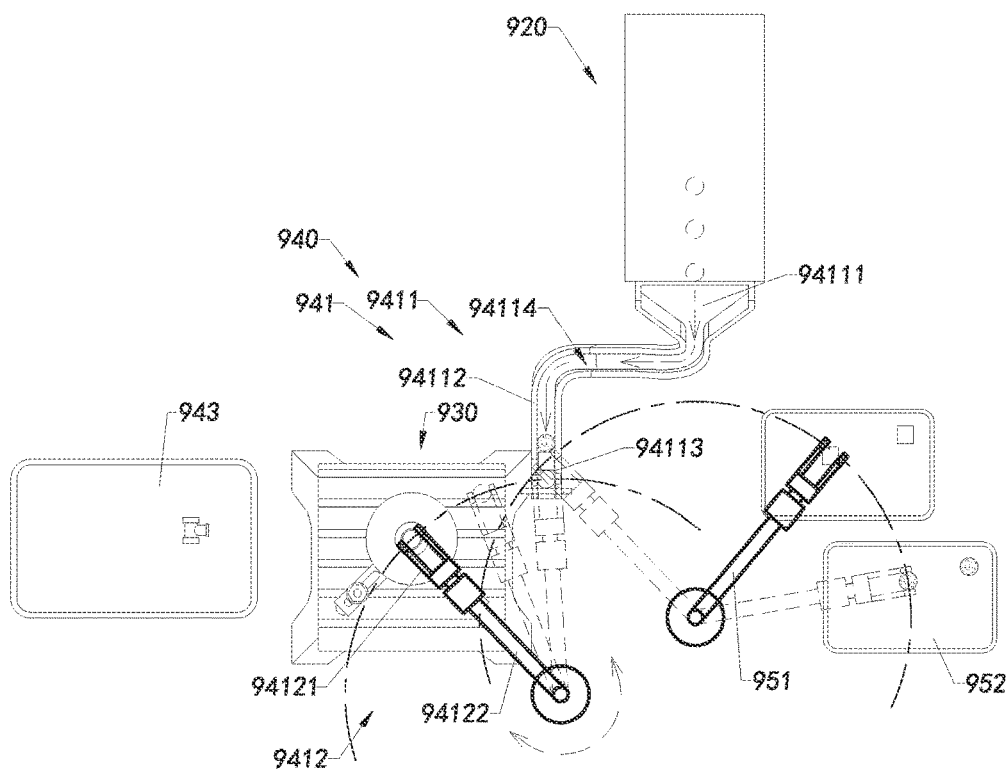
FIG. 14 is a perspective view illustrating the waste material elimination of the waste material elimination device of the forging and pressing production system according to the above third preferred embodiment of the present invention.
Figure 15:
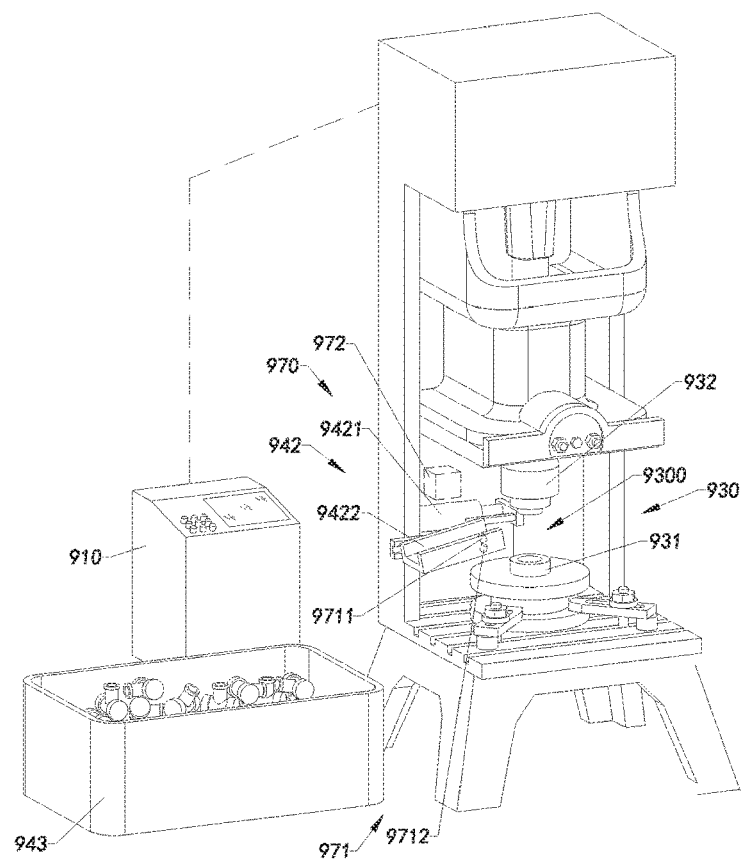
FIG. 15 is a perspective view of the forging device of the forging and pressing production system according to the above third preferred embodiment of the present invention.

Referring to FIGS. 11 and 13C, the collection end 94111 of the slide rail mechanism 9411 is arranged to be connected with the discharge port 9212 of the heating chamber 921 of the hot melt device 920 so as to receive the heated blank from the discharge port 9212. The slide rail mechanism 9411 further has at least a loading groove, wherein the loading groove 94114 is provided on the upper side of the slide rail mechanism 9411, wherein after the blank is heated in the heating chamber 921, it can slide along the loading groove 94114 of the slide rail mechanism 9411 from the collection end 94111 to the providing end 94113. Preferably, the loading groove 94114 of the slide rail mechanism 9411 rectifies the carriage and placing way of the blank during the conveying of the blank. In other words, the slide rail mechanism 9411 rectifies the carriage and orientation of the blank during the transportation to the providing end 94113 after it receives the blank from the collection end 94111, which facilitates the subsequent operations. It is understandable that the loading groove 94114 of the slide rail mechanism 9411 is suitable for the size and shape of the blank and in a slope form.

Referring to FIG. 13B, the detecting device 960 detects at least one characteristic of the blank, wherein the control system 910 determines if the blank is a waste material or scrap material based on the characteristic of the blank detected by the detecting device 960. When the control system 910 discovers that the characteristic of the blank indicates that the blank is a waste material or scrap material, it will control the waste material elimination device 950 to eliminate the waste material or scrap material from the slide rail mechanism 9411, so as to avoid the waste material from affecting the production processes as well as preventing the waste material from entering the forging and pressing production and damaging the forging device 930. The detecting device 960 is arranged on the feeding tool 941 of the delivering device 940 so as for detecting the characteristics of the blank loaded on the feeding tool 941. In other words, the detecting device 960 detects the characteristics of the blank on the slide rail mechanism 9411, so as for determining if the characteristics of the blank meet the forging and pressing processing requirements before it enters the forging device 930. For instance, the detecting device 960 detects at least one characteristic of the shape characteristic, weight characteristic, position characteristic, temperature characteristic, material characteristic, and etc., of the blank. The control system 910 controls the act of the waste material elimination device 950 and controls the transporting of the transport mechanism 9412 based on the characteristic.

It is further worth mentioning that, according to the present invention, the waste material elimination device 950 is arranged at the front end of the transport mechanism 9412, so that when the slide rail mechanism 9411 conveys the blank to the providing end 94113 of the slide rail mechanism 9411, the waste material elimination device 950 can first eliminates the waste materials that are not suitable for being processed.

Correspondingly, the detecting device 960 is embodied as a sensing device or an assembly of two or more sensors arranged on the slide rail mechanism 9411, wherein the detecting device 960 utilizes photograph detecting, infrared sensing and detecting, graphic detecting, weight detecting, and etc. to detect the characteristics of the blank in the slide rail mechanism 9411. It is understandable that the detecting device 960 is communicatively connected with the control system 910, wherein the control system 910 analyzes and derives that if the characteristic(s) of the blank are suitable for the requirements of the forging and pressing based on the one or more information detected by the detecting device 960.

The waste material elimination device 950 eliminates the blank loaded in the slide rail mechanism 9411. The waste material elimination device 950 further comprises at least a waste elimination mechanism 951 and a waste collecting device 952, wherein the waste elimination mechanism 951 eliminates the unqualified blanks from the slide rail mechanism 9411 to the waste collecting device 952, so as to collect the blank through the waste collecting device 952. It is understandable that the blank collected by the waste collecting device 952 may be added into the hot melt device 920 again, so as to be heated up again to become suitable for being forged and pressed.

Preferably, according to a second preferred embodiment of the present invention, the waste elimination mechanism 951 eliminates the waste material from the slide rail mechanism 9411 into the waste collecting device 952 through clamping or rejecting. More preferably, the waste elimination mechanism 951 is embodied as a robot arm device. The waste elimination mechanism 951 picks up the blank in the slide rail mechanism 9411 through clamping and transfers it to the waste collecting device 952.

Referring to FIG. 13B, the waste elimination mechanism 951 comprises at least a clamping device 9511 and an operating arm 9512 supporting the operation of the clamping device 9511, wherein the clamping device 9511 is arranged at an end of the operating arm 9512 so as to utilize the operating arm 9512 to support the clamping device 9511 to clamp the identified waste material. The clamping device 9511 is operatably arranged at an end of the operating arm 9512, wherein the operating arm 9512 operates the clamping device 9511 so as to clamp the waste materials and to eliminate the waste material from the forging and pressing production processes. The clamping device 9511 is rotatably arranged at an end of the operating arm 9512, wherein the operating arm 9512 rotatably operates the clamping device 9511 so as to clamp the waste materials at various positions.

Correspondingly, the clamping device 9511 clamps the waste material and eliminates the waste material to the waste collecting device 952 under the operation and control of the operating arm 9512. The clamping device 9511 can be operationally opened and clamped through the operating arm 9512 so as for clamping and placing the waste material appear in the processing. Preferably, the clamping device 9511 of the waste elimination mechanism 951 is a robot arm grabbing device. The clamping device 9511 can be operated to adjust the grabbing angle, grabbing force, grabbing orientation, and etc. through the operation of the operating arm 9512.

The operating arm 9512 operates the clamping device 9511 to grab and place the waste material. The operating arm 9512 further comprises at least a first operating rod 95121 and at least a second operating rod 95122. The second operating rod 95122 is rotatably connected the clamping device 9511 with the first operating rod 95121. The second operating rod 95122 is drivably and rotatably connected with the first operating rod 95121. The second operating rod 95122 is rotated by the first operating rod 95121 to control the grabbing and placing position of the clamping device 9511.

It is worth mentioning that the first operating rod 95121 is rotatable in the circumferential directions so as to drive the second operating rod 95122 and the clamping device 9511 to the proper grabbing position. The first operating rod 95121 circumferentially parallel rotates the second operating rod 95122 to the position of the waste material, so as to utilize the second operating rod 95122 to operate the clamping device 9511 to grab the waste material. After the clamping device 9511 grabs, the first operating rod 95121 rotates the second operating rod 95122 reversely along the circumferential direction to the waste collecting device 952, so as to allow the clamping device 9511 to place the waste material in the waste collecting device 952.

The first operating rod 95121 axially rotates the second operating rod 95122 based on the position of the waste material and up and down drives the second operating rod 95122 and the clamping device 9511 to move, so as for clamping the waste material from the rail and arranging the grabbing distance. Correspondingly, an end of the second operating rod 95122 is rotatably connected with the first operating rod 95121 so as to allow the first operating rod 95121 to move the second operating rod 95122 and the clamping device 9511 up and down so as to remove the waste material grabbed by the clamping device 9511 from the rail. When the second operating rod 95122 is rotated outward by the first operating rod 95121 along the axial direction, the clamping device 9511 will be extended outward through the supporting of the second operating rod 95122 so as to grab the waste material in a distance. Correspondingly, when the second operating rod 95122 is rotated inward along the axial direction by the first operating rod 9511, it allows the clamping device 9511 to clamp the waste material in a short distance. In other words, the second operating rod 9512 can perform rotations of any angle along the central point and the central axial direction, so as to drive the clamping device 9511 to move left and right, forward and backward, and up and down, to clamp the waste material at any position and in any distance on the rail.

It is worth mentioning that the first operating rod 95121 and the second operating rod 95122 of the operating arm 9512 can rotate along the circumferential and axial directions so as for driving the clamping device 9511 to move in both the above-below direction and the left-right direction in order for performing the actions of clamping and eliminating. It is understandable that the operating arm 9512 rotates left-right, forward-backward, and up-down, so as for the clamping device 9511 to clamp the waste material on the rail.

The clamping device 9511 is arranged at the lower end of the second operating rod 95122 in a rotatably operatable manner, while the second operating rod 95122 rotatably operates the clamping device 9511 so as to clamp the waste material placed at a random position. For instance, the waste materials that are obliquely stacked, falling, damaged, stuck, and etc. The clamping device 9511 is rotatably operated along a circumferential direction by the second operating rod 95122, so as to be adapted for clamping the waste material of random deposit angle.

It is worth mentioning that, according to a second preferred embodiment of the present invention, the waste material elimination device 950 and the transport mechanism 9412 respectively complete different transporting acts, wherein the waste material elimination device 950 eliminates the waste material from the slide rail mechanism 9411 based on the control commands of the control system 910. The transport mechanism 9412 transports the blank suitable for being processed from the slide rail mechanism 9411 to the forging device 930 so as for the forging device 930 to process and form the blank.

The transport mechanism 9412 comprises a clamping end 94121 and a transfer arm 94122, wherein the clamping end 94121 obtains the material of the slide rail mechanism 9411 through clamping and the material is put into the forging device 930. The transfer arm 94122 operates the clamping act and the releasing act of the clamping end 94121 as well as controls the clamping position and releasing position of the clamping end 94121, so as to accurately select the forging device 930. The transfer arm 94122 rotates along different axial directions so as for controlling the position of the clamping end 94121 and conducting the position change for the blank through the transfer arm 94122.

Figure 16:
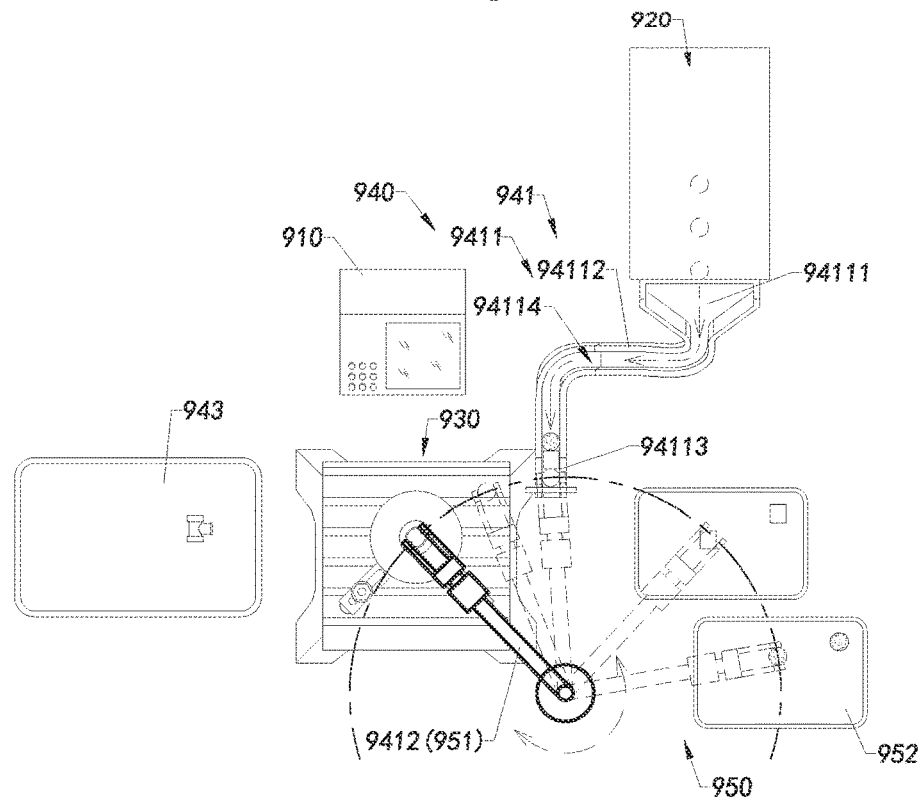
FIG. 16 is a perspective view illustrating an alternative mode of the waste material elimination mechanism of the forging and pressing production system according to the above third preferred embodiment of the present invention.

Referring to FIG. 16, the forging device 930 presses to form and shape the blank that has been heated, so as for forming the blank. The forging device 930 further provides a mold 931 and a pressing mechanism 932. The delivering device 940 inputs the blank into the mold, wherein the pressing mechanism 932 exerts pressure on the blank in the mold 931 so as to form and shape the blank. The forging device 930 further provides a forging space 9300, formed and defined between the mold 931 and the pressing mechanism 932. The blank is stamped and pressed by the pressing mechanism 932 in the forging space 9300, such that the blank under high temperature can be formed and shaped. It is understandable that the mold 931 of the forging device 930 is arranged to have the structure for processing the billet, wherein the mold 931 is correspondingly arranged at the test pressing mechanism 932 so as for forging and pressing the blank in the mold 931 into the forging and pressing product through the test pressing mechanism 932. In other words, the forging device 930 is customized correspondingly to the characteristics of the blank. Preferably, the mold 931 is corresponding to the external physical characteristic of the blank and the pressing mechanism is corresponding to the temperature characteristic, so as for different alloy blanks to receive suitable forging and pressing processes.

It should be noticed that the elimination and discharging here is different from it of the discharging tool. The elimination and discharging of the blank represents that the blank is eliminated and discharged from the forging and pressing production system to wait for further recycling. The discharging tool 943 is made for allowing the blank to be normally processed and produced to either become a product or wait for next process and leave the forging and pressing production system. In other words, the discharging tool 943 manipulates the billet, the formed blank, of the blank and eliminates and discharges the waste material of the blank.

Figure 17:
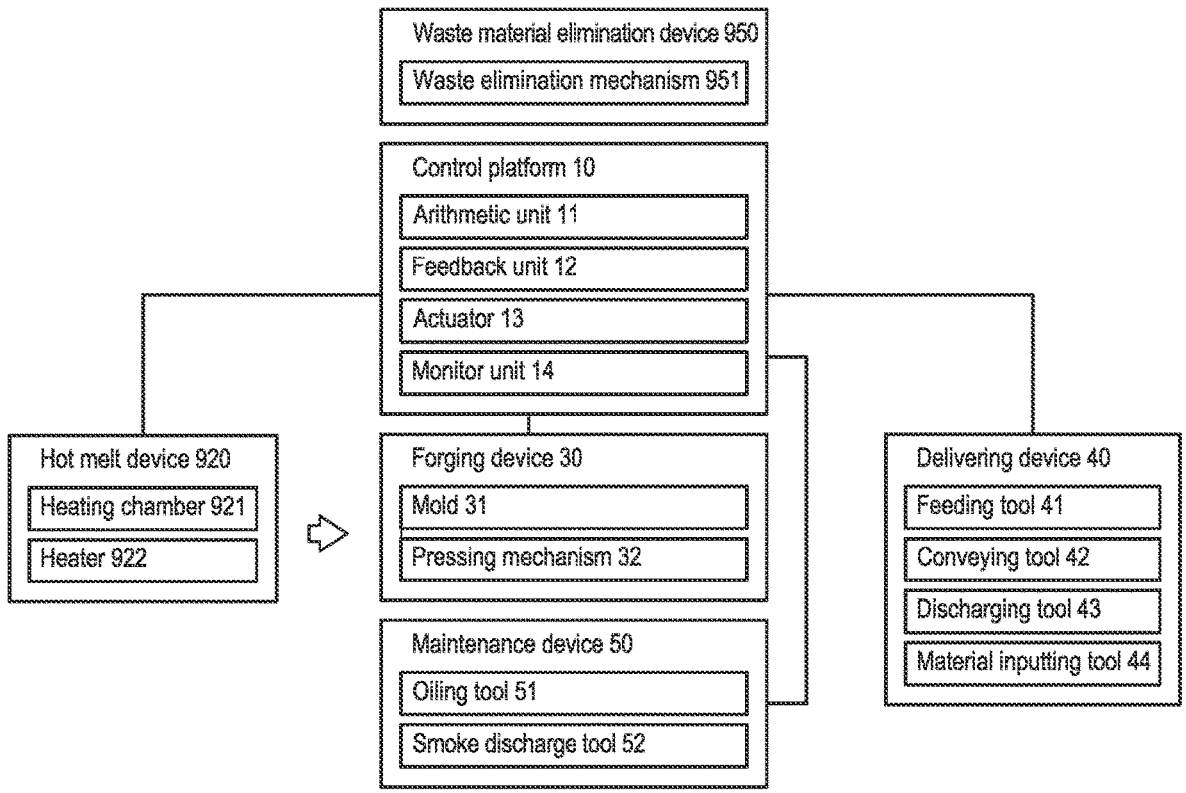
FIG. 17 is a block diagram illustrating the controlling of the forging and pressing production system according to the above third preferred embodiment of the present invention.

Referring to FIG. 17, the control system 910 further comprises an arithmetic unit 911, a feedback unit 912, an actuator 913, and a monitor unit 914. The arithmetic unit 911, the feedback unit 912, the actuator 913, and the monitor unit 914 are communicatively connected with one another. The arithmetic unit 911 calculates the feedback data obtained by the feedback unit 912 from the hot melt device 920 and the forging device 930 from controlling, so that the actuator 913 can control the heating chamber 921, the pressing mechanism 932, and the delivering device 940. The monitor unit 914 can load predetermined relative controlling parameters into the arithmetic unit 911 and display the feedback information of the feedback unit 912, so as to achieve interactive controlling.

The feedback unit 912 acquires the data of the characteristics detected by the detecting device 960. The arithmetic unit 911 extracts at least one characteristic of the blank corresponding to the data of the characteristics acquired by the detecting device 960. For example, the arithmetic unit 911 extracts at least one characteristic of the position characteristic, shape characteristic, material characteristic, temperature characteristic, weight characteristic, and etc. of the blank according to the data detected by the detecting device 960. In other words, the arithmetic unit 911 extracts the characteristic of the material corresponding to the characteristic information of the blank based on the data acquired by the feedback unit 912, so as to then determine if the blank is suitable for being utilized in the forging and pressing process. For example, the detecting device 960 acquires at least an image of the blank in the slide rail mechanism 9411 through photographing. Then the feedback unit 912 feedbacks the data detected by the detecting device 960 to the arithmetic unit 911. The arithmetic unit 911 identifies the information of the current placing position, shape, size, and etc., of the blank through image identification and the arithmetic unit 911 determines if the blank is suitable for being transported by the transport mechanism 9412 based on the identified information. If the placing position of the blank is improper, such as slant, tilt, wrong size, wrong shape, and etc., the arithmetic unit 911 derives that the blank is unsuitable for being transported by the transport mechanism 9412. Correspondingly, the actuator 913 controls the waste material elimination device 950 to execute the elimination operation based on the results of the arithmetic unit 911, so as to avoid the blank from occupying space and affecting the forging and pressing production progress. On the contrary, if the arithmetic unit 911 calculates and derives that the blank is suitable for being forged and pressed by the forging device 930, the actuator 913 will control the transport mechanism 9412 to execute the transportation operation to transport the blank to the mold 931 of the forging device 930 for the forging device 930 to process the blank through forging and pressing.

The forging and pressing production system further comprises a maintenance device 970. The maintenance device 970 is controlled by the control system 910 and further maintenance is conducted according to the needs of the hot melt device 920 or the forging device 930, so as to maintain the production capacity of the hot melt device 920 or the forging device 930 and to supply the overall efficiency of the forging and pressing production system. Furthermore, the maintenance device 970 further comprises an oiling tool 971 and a smoke discharge tool 972. The oiling tool 971 is arranged on the pressing mechanism 932 so as for oiling and maintaining the pressing mechanism 932 and the mold 931. The smoke discharge tool 972 is arranged on the oiling tool 952 so as for recycling the high temperature oil fume, which ensures the cleaning of the work environment of the pressing mechanism 932.

Preferably, the smoke discharge tool 972 is adjacently arranged above the forging device 930, wherein the smoke discharge tool 972 absorbs the oil fume produced when the forging device 930 is forging and pressing the blank and the oil fume produced when the oiling tool is oiling. The oiling tool 971 is arranged on the conveying tool 942, wherein the oiling tool 971 executes the oiling operation for the forging device 930 during the conveying process of the conveying tool 942.

In detail, the oiling tool 971 further comprises an upper oiling tool 9711 and a lower oiling tool 9712, wherein the upper oiling tool 9711 and the lower oiling tool 9712 are respectively arranged above and below the conveying tool 942. When the conveying tool 942 executes the conveying operation to receive the billet forged by the forging and pressing tool 930 and to transfer the billet to the discharging tool 943, so as to output and produce the formed blank through the discharging tool. The upper oiling tool 9711 sprays oil onto the upper portion of the mold 931 or the pressing mechanism 932 of the forging device 930 through spraying. The lower oiling tool 9712 sprays oil onto the lower portion of the mold 931 or the pressing mechanism 932 through oil spraying. It is understandable that the oiling tool 971, through oiling the forging device 930, reduces the surface temperature of the forging device 930 and lubricates the surfaces of the mold 931 and the pressing mechanism 932 to avoid dusts and sundries from bonding on the inner surface of the mold 931.

The conveying tool 942 movably expands to and contracts from the forging space 9300 of the forging device 930 to receive the billet forged and produced by the forging device 930. It is worth mentioning that the pressing mechanism 932 of the forging device 930 forges and presses the blank. When the blank is unpressed and demolded from the mold 931 of the forging device 930, the blank is brought from the mold 931 by the pressing mechanism 932. In other words, the pressing mechanism 932 of the forging device 930 brings the formed blank away from the mold 931 after the blank has been forged and pressed, so as to have the blank be demolded from the mold 931. When the blank is brought from the mold 931 by the pressing mechanism 932, the blank will then leave the pressing mechanism 932 and fall to the conveying tool 942 under the self-gravitation.

The conveying tool 942 further comprises an expansion mechanism 9421 and at least a receiving mechanism 9422, wherein the receiving mechanism 9422 is movably arranged on the expansion mechanism 9421 so as to allow the expansion mechanism 9421 to drive the receiving mechanism 9422 to expand and contract in the forging space 9300 of the forging device 930. The conveying tool 942 is communicatively connected with the control system 910, wherein the control system 910 controls the expand and contract movements of the conveying tool 942 so as for the receiving mechanism 9422 to receive the blank dropped from the pressing mechanism 932.

It is worth mentioning that the oiling tool 971 is arranged on the receiving mechanism 9422 of the conveying tool 942, wherein the upper oiling tool 9711 is arranged on the upper side of the receiving mechanism 9422, while the lower oiling tool 9712 is correspondingly arranged on the lower side of the receiving mechanism 9422. It is understandable that the expansion mechanism 9421 drives the receiving mechanism 9422 to expand and contract to the forging device 930, wherein after the receiving mechanism 9422 receives the dropped blank from the pressing mechanism 932, the oiling tool 971 oils the forging device upwards and downwards.

The blank is heated to a predetermined temperature in the heating chamber 921, so as to make the blank in a high temperature state. The blank is sent to the feeding tool 941. Because the temperature characteristic 9102 of the processed blank has been changed, it is necessary to examine the temperature characteristic 9102 of the blank so as to understand that if the blank is suitable for the process of the forging device 930. The product of suitable temperature will be for the feeding process 941. The unqualified blank will eventually be eliminated and discharged. Then, sensors are utilized to acquire the characteristics of the blank. According to the present preferred embodiment, the external physical characteristic 9101 and the temperature characteristic 9102 of the blank have been collected so as to obtain the data of the shape and surface temperature of the blank to determine the type of the blank. In other words, different blanks are input into the forging and pressing production system, the blanks are determined and processed based on the sensed blank types. Then, the vacancy and availability of the forging space 9300 is judged and determined. The feeding tool 941 will continue transporting the blank to the pressing mechanism 932 in dealing with the vacancy of the forging space 9300. It will wait when the forging space 9300 is unavailable. It should be noticed that the temperature of the blank in wait is examined as well, so as to ensure the high temperature condition of the blank. In other words, only when the temperature of the blank is suitable and the forging space 9300 is available, the feeding tool 941 of the delivering device 940 will deliver and transport the blank to the pressing mechanism 932. Then, the blank will be pressed and formed in the corresponding pressing mechanism 932. Eventually, it is sent out from the forging device 930 through the conveying tool 942. When the blank leaves the forging device 930, the oiling tool 971 of the maintenance device 970 starts to perform on the forging device 930. In other words, the pressing mechanism 932 has operation of the oiling tool 971 correspondingly each time. It should be noticed that the feeding tool 941 and the conveying tool 942 both help to deliver the blank of a high temperature state, so that the blank can keep its high temperature and be circulated and processed of itself.

Referring to FIG. 16, the forging and pressing production system according to another alternative mode of the above second preferred embodiment of the present invention will be illustrated below. The forging and pressing production system comprises a control system 910, a hot melt device 920, a forging device 930, a delivering device 940, at least a waste material elimination device 950, and at least a detecting device 960, wherein the control system 910 is communicatively coupled to the hot melt device 920, the forging device 930, the delivering device 940, and the waste material elimination device 950 so as for controlling the processing and transporting of the material among the devices and for allowing the material to be turned from a unprocessed blank into a processed and formed blank through the forging and pressing process of the forging device 930. It is worth mentioning that, according to the present alternative mode, the structures of the control system 910, the hot melt device 920, the forging device 930, and the delivering device 940 of the forging and pressing production system are the same with the above second preferred embodiment. The differences include that the waste material elimination device 950 is embodied to be the transport mechanism 9412 of the feeding tool 941 of the delivering device 940. In other words, the waste material elimination device 950 and the transport mechanism 9412 of the delivering device 940 are the same device, wherein the transport mechanism 9412 is capable of not only transporting the qualified blank in the slide rail mechanism 9411 to the forging device 930 to be forged, but also transporting the waste material in the slide rail mechanism 9411 to the waste collecting device 952.

The transport mechanism 9412 of the feeding tool 940 is controlled by the control system 910, so as to utilize the control system 910 to control the transport mechanism 9412 to perform the transportation or elimination based on the detected information of the detecting device 960.

Figure 18:
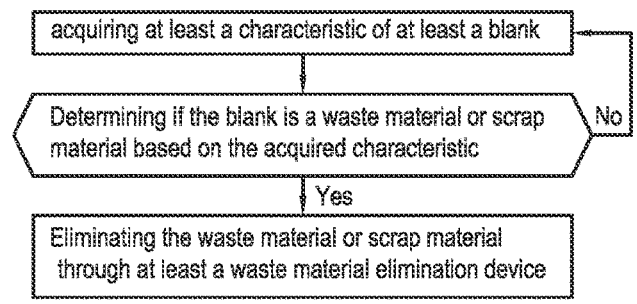
FIG. 18 is a flow diagram illustrating steps of the waste material elimination method of the forging and pressing production system of according to the above third preferred embodiment of the present invention.

FIG. 18 illustrated the forging and pressing production system according to the above second preferred embodiment of the present invention. The present invention further provides a waste material elimination method for the forging and pressing production system, wherein the waste material elimination method comprises the following steps:

(a) acquiring at least a characteristic of the blank;

(b) determining if the blank is a waste material or scrap material based on the acquired characteristic; and (c) if the blank is determined to be a waste material or scrap material, eliminating the waste material or scrap material through at least a waste material elimination device 950; if the blank is determined to be suitable for processing, returning to execute the step (a).

Further, in the step (a) of the above waste material elimination method, the detecting device 960 detects the information of the characteristics of the blank in the slide rail mechanism 9411. The detecting device 960 detects at least one of the characteristics of the position characteristic, the temperature characteristic, the shape characteristic, the weight characteristic, the material characteristic, the size characteristic, and the carriage characteristic of the blank through sensing and detecting of the detecting device.

In the step (b) of the above waste material elimination method, the characteristic of the blank detected by the detecting device 960 is transmitted to the control system 910, wherein the control system 910 determines whether the blank is a waste material or scrap material based on the information of the characteristics detected by the detecting device 960 and the forging data of the forging device 930. The feedback unit 912 of the control system 910 acquires the data of the characteristics detected by the detecting device 960 and transmits the data of the characteristics to the arithmetic unit 911 of the control system 910 so as to utilize the arithmetic unit to calculate the data of the characteristics to obtain the determination result of the blank.

The actuator 913 of the control system 910 executes the determination result calculated by the arithmetic unit 911 and controls the action and operation of the waste material elimination device 950 so as to eliminate the waste material or scrap material.

According to the step (c) of the waste material elimination method, the waste material elimination device 950 is controlled by the actuator 913 to execute the elimination of the waste material. The waste material elimination device 950 eliminates the waste material from the slide rail mechanism 9411 to the waste collecting device 952 through mechanical clamping, wherein the waste collecting device 952 collects the eliminated blank.

The above waste material elimination method further comprises a step (d): recycling the eliminated waste material to the hot melt device 920 so as for the hot melt device 920 to hot melt and process the blank.

Referring to FIGS. 19-22, a forging and pressing production system and the maintenance and delivering device thereof according to a third preferred embodiment of the present invention is disclosed and illustrated, wherein the forging and pressing production system is different from it of the above first preferred embodiment so as to make it a new embodiment.

Figure 19:
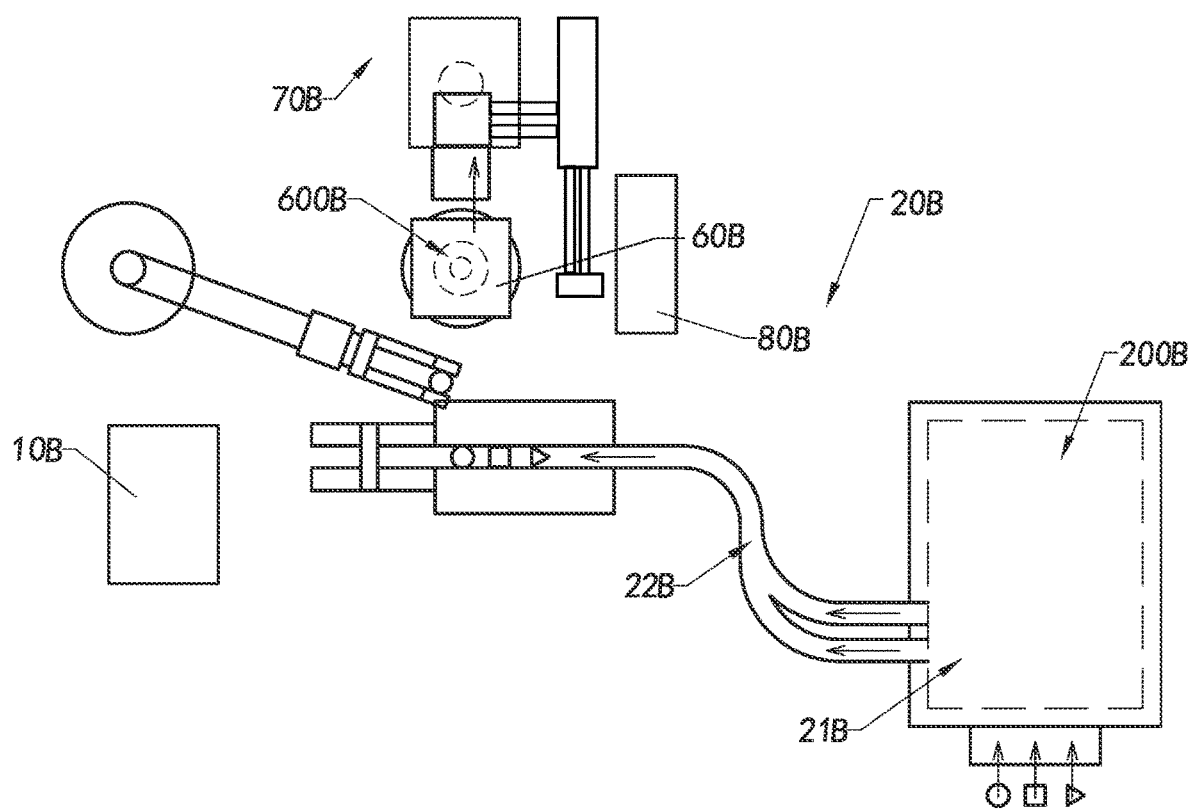
FIG. 19 is a perspective view of a forging and pressing production system according to a fourth preferred embodiment of the present invention.

Referring to FIG. 19, the forging and pressing production system further comprises a control platform 10B, a feeding device 50B, a forging device 60B, and a maintenance and delivering device 70B. The control platform 10B controls the feeding device 50B, the forging device 60B, and the maintenance and delivering device 70B. The feeding device 50B supplies the heated material 100B for the forging device 60B. The forging device 60B forges and presses the material 100B. The maintenance and delivering device 70B transports the material 100B that is forged and pressed by the forging device 60B and spraying oil and maintaining the forging device 60B. In other words, the maintenance and delivering device 70B automatically receives the material 100B that is forged and pressed by the forging device 60B, conveys it out, and automatically sprays oil in order to maintain the forging device 60B The quantity of the material 100B is one, as an example of the present invention.

The feeding device 50B comprises a hot melt device 51B and a choosing mechanism 52B. The hot melt device 51B heats the material 100B after receiving the material 100B, so as to allow the material 100B to be heated up to a certain temperature. The choosing mechanism 52B automatically conveys the heated material 100B, automatically sort the material 100B according to the conditions of the material 100B, and transports the suitable material 100B to the forging device 60B.

It is worth mentioning that the choosing mechanism 52B automatically conveys the material 100B to the forging device 60B.

Optionally, the choosing mechanism 52B can convey the materials 100B to different forging devices 60B according to the differences of the heated materials 100B, wherein the present invention shall not be limited here.

The forging device 60B forges and presses the material 100B under the control of the control platform 10B so as to have the material be formed through forging and pressing.

The maintenance and delivering device 70B is adaptively arranged on the forging device 60B. The maintenance and delivering device 70B automatically receives the forged and pressed material, sends it out, and then sprays oil to the forging device 60B during the reciprocating motion of the receiving process, so as for maintaining the forging device 60B.

It is worth mentioning that the forging and pressing device 30B brings the material 100B to move upward after pressing the material 100B. The maintenance and delivering device 70B automatically moves to the below of the material 100B for receiving the material 100B. Further, the maintenance and delivering device 70B is in the forging device 60B when receiving the material 100B and the maintenance and delivering device 70B spraying oil to the forging device 60B for maintenance. Then, the maintenance and delivering device 70B leaves the forging device 60B so that the maintenance and delivering device 70B can deliver the material 100B to a storage area.

The heated material 100B is through the pressing and stamping operation of the forging device 60B, so as to have the material 100B be formed and shaped. The forging device 60B further provides a mold 61B and a pressing mechanism 62B. The choosing mechanism 52B conveys the material 100B into the mold 61B. The material 100B placed in the mold 61B receives the pressure exerted by the pressing mechanism 62B, such that the material 100B can be formed and shaped.

It is worth mentioning that the pressing mechanism 62B is at a high place of the mold 61B, wherein the pressing mechanism 62B first forges and presses down on the material 100B and lifts. In the high temperature forging and pressing process, the material 100B is brought upward by the pressing mechanism 62B. The maintenance and delivering device 70B moves to the above of the mold 61B, catches the formed material 100B that is naturally dropped, and sprays oil onto the pressing mechanism 62B and the mold 61B. Next, the maintenance and delivering device 70B carries the formed material 100B to a side of the pressing mechanism 62B and sends it out.

The forging device 60B further provides a forging space 600B, formed and defined between the mold 61B and the pressing mechanism 62B. The material 100B is stamped and pressed by the pressing mechanism 62B in the forging space 600B, such that the material 100B under high temperature can be formed and shaped. Based on the sensing and acquiring result of the step 602B and the selection result of the step 603B, the material 100B will be transported by the delivering device 70B to the forging space 600B corresponding to the corresponding mold 61B.

It is worth mentioning that the forging space 600B is defined by the pressing mechanism 62B and the mold 61B. When the pressing mechanism 62B stamps toward the mold 61B, the forging space 600B will gradually become smaller to a spatial size of a fixed form so as to accommodate the material 100B that needs to be pressed.

Preferably, the maintenance and delivering device 70B is arranged in a side of the mold 61B and at the same high to the mold 61B so as to allow the maintenance and delivering device 70B to move its part to the forging space 600B to receive the forged and pressed material 100B.

It is worth mentioning that the material 100B that has been stamped by the pressing mechanism 62B will be adhered on the pressing mechanism 62B and moved up along with it. Further speaking, when the inertia of the material 100B and the gravity of the material 100B are greater than the bonding force between the material 100B and the pressing mechanism 62B and the friction force between the material 100B and the pressing mechanism 62B, the material 100B will fall.

Figure 21:
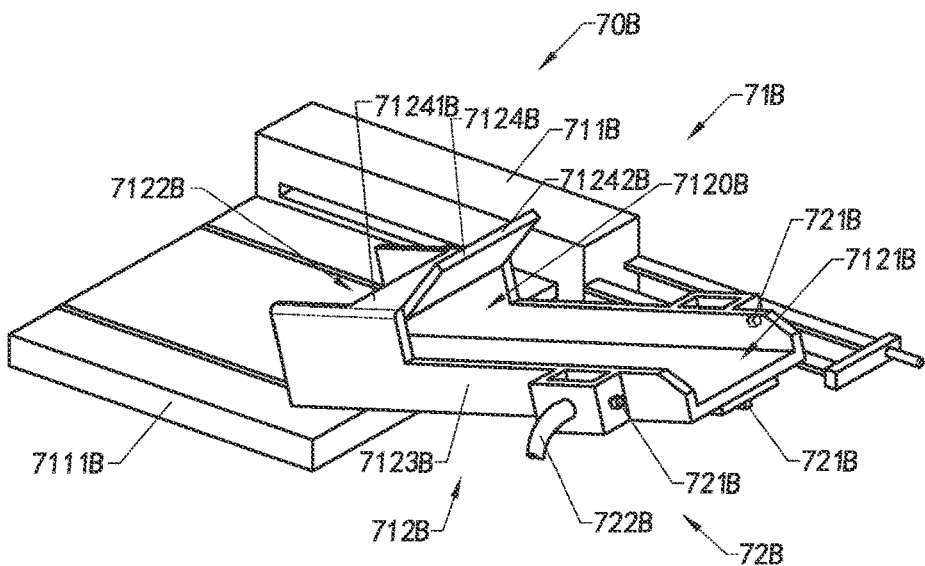
FIG. 21 is a perspective view of maintenance and delivering device of the forging and pressing production system according to the above fourth preferred embodiment of the present invention.

Referring to FIG. 21, the maintenance and delivering device 70B comprises a conveying mechanism 71B and a maintenance mechanism 72B, wherein the maintenance mechanism 72B is arranged on an end portion of the conveying mechanism 71B. The conveying mechanism 71B is capable of moving left and right. When the conveying mechanism 71B is moved to the below of the pressing mechanism 62B, the maintenance mechanism 72B sprays oil to the pressing mechanism 62B and the mold 61B.

The conveying mechanism 71B moves reciprocally between a starting position and a receiving position, so as to receive the material 100B falling from the pressing mechanism 62B and convey it out. Further speaking, the receiving position refers to that the conveying mechanism 71B moves to the forging space 600B and is located at the exact below of the center of the pressing mechanism 62B. The starting position refers to the initial point that conveying mechanism 71B has not moved. The starting position is at a side of the forging device 60B. The receiving position allow the conveying mechanism 71B to receive the material 100B that drops from the pressing mechanism 62B.

According to a third preferred embodiment of the present invention, the maintenance mechanism 72B comprises at least two nozzles 721B and an infusion body 722B. The infusion body 722B conveys machine oil to the nozzles 721B. The nozzles 721B spray machine oil to the forging space 600B under the control of the control platform 10B.

The nozzles 721B are arranged on the conveying mechanism 71B to spray oil to the pressing mechanism 62B and the mold 61B. At least one of the nozzles 721B is arranged in a side and above the conveying mechanism 71B.

Optionally, at least one of another of the nozzles 721B is arranged below the conveying mechanism 71B. In other words, at least two of the nozzles 721B are arranged respectively to face toward the pressing mechanism 62B and the mold 61B, so as to have at least two of the nozzles 721B spray oil toward the pressing mechanism 62B and the mold 61B of the two sides in order for maintaining the nozzles 721B and the mold 61B.

The conveying mechanism 71B comprises a driving portion 711B and a receiving portion 712B, wherein the driving portion 711B drives the receiving portion 712B move reciprocatingly, so as to drive the receiving portion 712B to conduct reciprocating motion between the starting position and the receiving position. Further speaking, the receiving position refers to the position below the pressing mechanism 62B where the receiving portion 712B moves to for receiving the forged and pressed material 100B.

Referring to a third preferred embodiment of the present invention, the receiving portion 712B slides on the driving portion 711B, so as to have the receiving portion 712B be hauled and driven by the driving portion 711B to move reciprocatingly.

The material 100B is fed to the forging space 600B. After the material 100B is forged and pressed by the forging device 60B, the receiving portion 712B receives the formed material 100B from the forging space 600B and conveys the material 100B from the forging space 600B, so as to clear the forging space 600B and to allow the forging space 600B be oiled, enabling another feeding for the forging space 600B and another forging and pressing of the forging and pressing device 60B to the material 100B.

The driving portion 711B comprises a slide rail 7111B and a drive assembly 7112B. The drive assembly 7112B drives the receiving portion 712B to move reciprocatingly. The receiving portion 712B is driven to conduct a reciprocating motion on the slide rail 7111B so as for delivering the material 100B to the storage area many times.

The receiving portion 712B extends from the driving portion 711B toward a predetermined direction, so as to allow the receiving portion 712B to receive the dropping material 100B when moving to the forging space 600B along the predetermined direction.

The receiving portion 712B has a feed channel 7120B communicating a feed port 7121B and a discharge port 7122B of the feed channel 7120B, wherein the feed port 7121B and the discharge port 7122B communicating the feed channel 7120B with external air.

The feed port 7121B is formed and provided in an upward manner, so as to allow the material 100B left the pressing mechanism 62B to fall from the feed port 7121B onto the receiving portion 712B and fall through the feed channel 7120B onto the storage area from the feed port 7121B.

The discharge port 7122B is formed behind the receiving portion 712B. When the receiving portion 712B receives the material 100B, it then moves back to the initial point to bring the material 100B to leave the conveying mechanism 71B from the discharge port 7122B along the feed channel 7120B.

When the receiving portion 712B moves back to the starting position of the slide rail 7111B, the receiving portion 712B conveys the material 100B through the discharge port 7122B to the storage area.

It is worth mentioning that the maintenance mechanism 72B is arranged on the side of the feed port 7121B of the conveying mechanism 71B. When the conveying mechanism 71B moves to the receiving position, the maintenance mechanism 72B spraying oil outward.

The feed port 7121B defined in the present invention is at the front end of the discharge port 7122B. The protection portion 7124B is arranged at the middle portion of the receiving main body 7123B and positioned above to the receiving main body 7123B.

The maintenance and delivering device 70B is arranged on one side of the forging device 60B, wherein the receiving portion 712B of the maintenance and delivering device 70B is driven to move reciprocatingly to the forging device 60B. The drive assembly 7112B is arranged behind the forging device 60B. The receiving portion 712B is drivably connected with the drive assembly 7112B, so as to allow the drive assembly 7112B to act and drive the receiving portion 712B arranged on a side thereof to reciprocatingly move along the slide rail 7111B, which allows the receiving portion 712B to be obliquely arranged between the pressing mechanism 62B and the mold 61B and to receive the material 100B leaving from the adhesion with the pressing mechanism 62B when the receiving portion 712B has moved to the forging space 600B. The receiving portion 712B is drawn to the starting position and allows the material 100B to fall from the discharge port 7122B onto the storage area.

The receiving portion 712B is arranged on a side of the forging device 60B.

Preferably, the receiving portion 712B horizontally moves to the receiving position. The receiving portion 712B is obliquely held in conducting reciprocating motion.

An end of the feed port 7121B of the receiving portion 712B is raised. The feed port 7121B is higher than the discharge port 7122B. In other words, the material 100B falling into the feed port 7121B can slide down along the feed channel 7120B and leave the receiving portion 712B from the discharge port 7122B. In other words, the receiving portion 712B can receives the material 100B lifted by the pressing mechanism 62B and deliver the material 100B back to the starting position to allow the material 100B to slide down along the feed channel 7120B and to leave the receiving portion 712B from the discharge port 7122B.

The receiving portion 712B is arranged on a side of the mold 61B. Because an end of the feed port 7121B of the receiving portion 712B is lifted, the receiving portion 712B becomes arranged in a relatively inclined manner. The receiving portion 712B moves toward the mold 61B and to the top of the mold 61B so as to receive the dropped material 100B.

The drive assembly 7112B is arranged on a side of the receiving portion 712B to drive the receiving portion 712B.

It is worth mentioning that the drive assembly 7112B is arranged on a side of the slide rail 7111B.

The receiving portion 712B comprises a receiving main body 7123B and a protection portion 7124B, wherein the protection portion 7124B is matchingly and coordinately arranged above the receiving main body 7123B. The receiving main body 7123B and the protection portion 7124B defines the feed port 7121B, the feed channel 7120B, and the discharge port 7122B. The receiving main body 7123B is embodied as a strip-shaped groove and the receiving main body is obliquely upwardly arranged by the rail. The receiving main body 7123B is extended from the protection portion 7124B toward the moving direction, so as to allow the receiving main body 7123B to be driven to move to the below of the pressing mechanism 62B and receive the falling material 100B when the driving portion 711B is driven to move toward the moving direction, so that the material 100B can successively move to the storage area through the receiving main body 7123B and the protection portion 7124B.

The receiving main body 7123B is obliquely arranged. The feed port 7121B is higher than the discharge port 7122B in reference to the ground. In other words, the receiving main body 7123B is obliquely upwardly held, so as to allow the receiving main body 7123B to receive the dropped material 100B and to allow the material 100B to slide down along the feed channel 7120B and leave from the discharge port 7122B.

The receiving main body 7123B is inclinedly arranged so that even when the receiving main body 7123B moves back, the falling material 100B can still move along the receiving main body 7123B and fall from the discharge port 7122B to the storage area.

It is worth mentioning that tilt angle of the receiving main body 7123B is predetermined, such that the receiving main body 7123B is capable of allowing the material 100B to freely fall without escaping from the channel of the receiving main body 7123B.

Preferably, the receiving main body 7123B is embodied as a track with an U-shaped cross section, so as to allow the receiving main body 7123B to catch the material 100B falling from above.

The protection portion 7124B is arranged above the receiving main body 7123B and form an opening with the receiving main body 7123B. In other words, the protection portion 7124B and the receiving main body 7123B define the feed port 7121B and the discharge port 7122B.

The protection portion 7124B comprises an extension board 71241B and a lid 71242B. The extension board 71241B obliquely upwardly extends from the lid 71242B so as to prevent the falling material 100B from falling outward and to reduce the machine oil from being sprayed to the back to render pollutions on the maintenance and delivering device 70B and in the external environment.

It is worth mentioning that the lid 71242B is arranged above the receiving main body 7123B and the lid 71242B is covered on the middle portion of the receiving main body 7123B so as to prevent the material 100B from moving out of the rail.

Preferably, the receiving portion 712B is arranged on an edge of a platform of the forging device 60B, wherein the material 100B may be dropped from the discharge port 7122B to the storage area.

Optionally, the conveying mechanism 71B comprises a sorting platform. The sorting platform receives and sorts the materials 100B falling from the discharge port 7122B, and transports them to various areas. It is worth mentioning that the sorting platform sorts waste products and qualified products and respectively conveys them to different storage areas.

Preferably, the quantity of the nozzles 721B is embodied as three, wherein two of the nozzles 721B are respectively arranged on the two sides of the receiving main body 7123B and in the vicinity of the feed port 7121B, while one of the nozzles 721B is arranged on the bottom of the receiving main body 7123B and in the vicinity of the feed port 7121B.

The timings for the receiving portion 712B to move forward and backward are both preset.

Figure 22A:
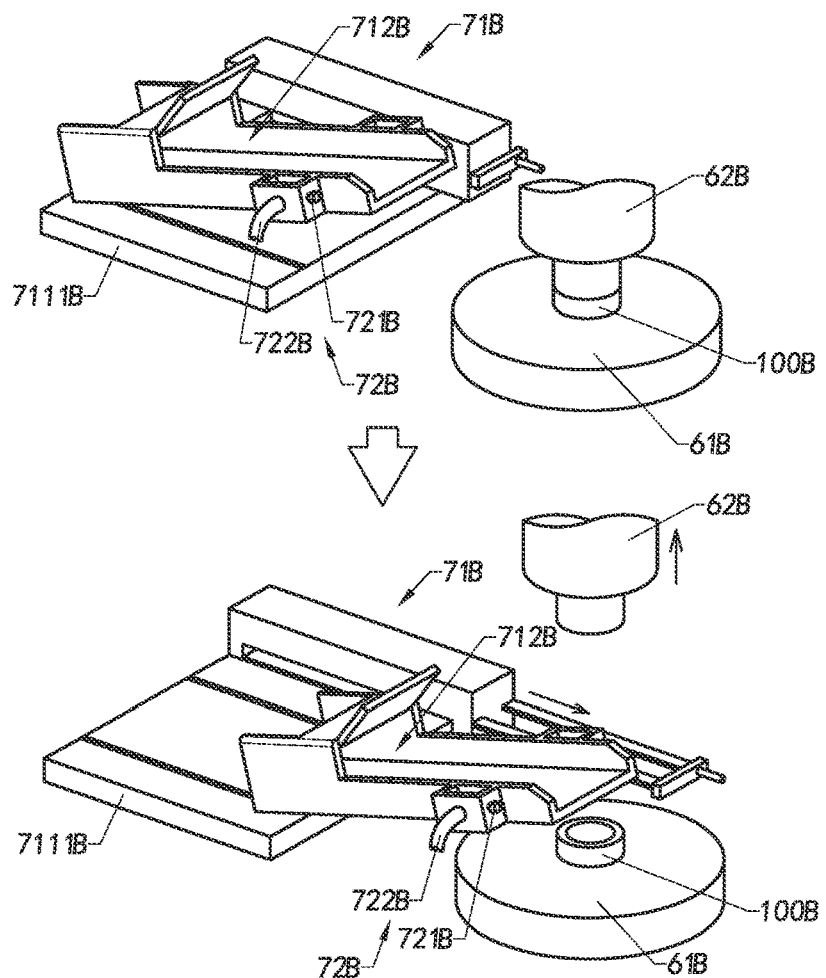
FIGS. 22A-22B are perspective views illustrating the operation of the maintenance and delivering device of the forging and pressing production system according to the above fourth preferred embodiment of the present invention.
Figure 22B:
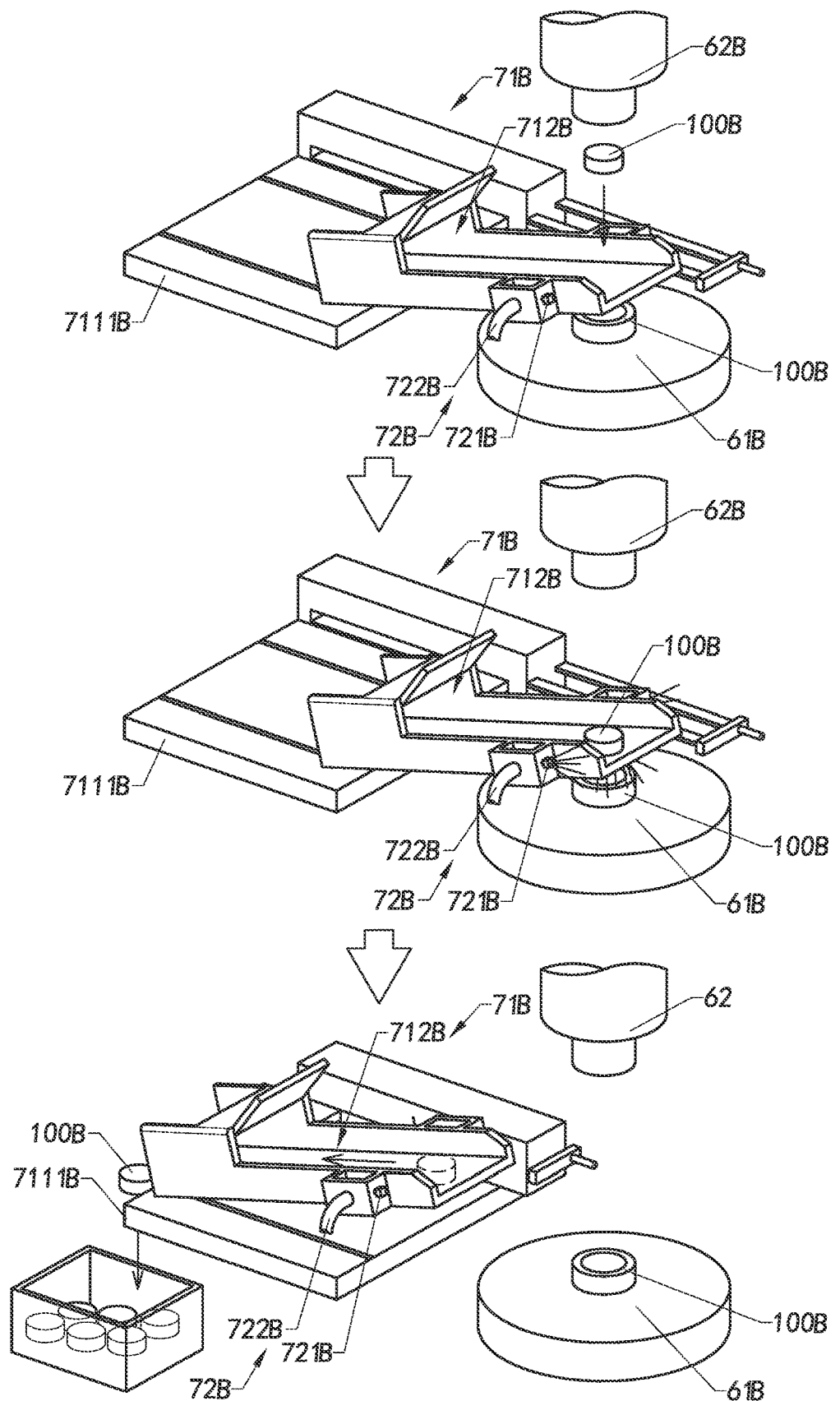

Referring to FIGS. 22A-22B, under the control of the control platform 10B, after the pressing mechanism 62B is lifted, the receiving portion 712B will move from the starting position to the receiving position.

The receiving portion 712B moves to the receiving position to receive the falling material 100B.

The maintenance mechanism 72B sprays oil under the control of the control platform 10B.

After the oil spraying of the maintenance mechanism 72B, the receiving portion 712B returns from the receiving position to the starting position and the material 100B is allowed to fall from the discharge port 7122B to the storage area.

The maintenance and delivering device 70B continuously transports the material 100B and sprays oil to the forging device 60B. Further speaking, the receiving portion 712B continuously conducts reciprocating motion, wherein when the receiving portion 712B is at the receiving position, the maintenance mechanism 72B sprays oil.

It is worth mentioning that the timing for the receiving portion 712B moves back from the receiving position to the starting position is preset. When the receiving portion 712B moves to the receiving position, the receiving portion 712B is controlled by the control platform 10B to return from the receiving position to the starting position after a certain time.

Preferably, the maintenance mechanism 72B sprays oil after the receiving portion 712B moves to the receiving position.

The timing of the oil spraying of the maintenance mechanism 72B is when the receiving portion 712B has received the material 10B. In other words, the maintenance mechanism 72B sprays oil after the receiving portion 712B starts moving from the starting position for a predetermined time.

Preferably, the maintenance mechanism 72B sprays oil after the receiving portion 712B moves to the receiving position.

Referring to a third preferred embodiment of the present invention, two of the nozzles 721B are arranged on the two sides of the receiving main body 7123B respectively and spraying oil toward the front, so as to have the machine oil sprayed from the nozzles 721B diffuse upward in the air in a mist manner to maintain the pressing mechanism 62B.

Because the nozzles 721B spray oil forward, the timing of the oil spraying of the nozzles 721B is at the time when the receiving main body 7123B is located under the pressing mechanism 62B and receives the material 100B. Then, the nozzles 721B spray oil outward.

Optionally, the timings for the nozzles to spray oil may be consistent or inconsistent.

According to the above third preferred embodiment of the present invention, the timings for the nozzles to spray oil are consistent.

Optionally, the maintenance mechanism 72B comprises a detection portion. When the detection portion detects that the receiving portion 712B has received the material 100B, the nozzles will spray oil.

Preferably, after the control platform 10B controls the receiving main body 7123B to move to the receiving position and after a predetermined time, the control platform 10B controls the nozzles to spray oil outward.

It is worth mentioning that the control platform 10B controls the maintenance mechanism 72B to sprays oil after the receiving portion 712B has moved to the receiving position.

Further, the nozzles 721B are predetermined. The oil sprayed outward from the nozzles 721B is in a mist form, so as for better lubricating the pressing mechanism 62B and the mold 61B of the forging and pressing device 30B.

Those skilled in the art should understand and know that the oil spraying effect of each of the nozzles 721B is closely related to the perforating position (electric discharge machining process) of the nozzle orifice, diameter size of the nozzle orifice, and K coefficient (combined EDM process and liquid extrusion grinding process) of the nozzle orifice, pressure at the nozzle orifice, and flow coefficient (liquid extrusion grinding process) of the nozzle orifice, so that the nozzles 721B continuously sprays a small amount of oil outwards and droplets sprayed into the forging space 600B are in a mist form, which allows spraying to the pressing mechanism 62B and the mold 61B in a larger range and scope. Therefore, the pressing mechanism 62B and the mold 61B can be cooled and lubricated in the oil spraying process, which helps to reduce mechanical damage for the forging and pressing device 23B in the next forging and pressing operation.

The maintenance mechanism 72B sprays oil to the forging space 600B, wherein the maintenance mechanism 721B sprays oil to the forging space 600B in all directions instead of a fixed direction. In other words, the maintenance mechanism 72B sprays oil on the forging and pressing device relatively evenly, so as to prevent lacking of oiling on some portion of the pressing mechanism 62B and/or the mold 61B.

Person skilled in the art should be able to understand and note that the pressing mechanism 62B can controllably adjust its pressing mode based on the production needs of the material 100B. According to a feasible implementation, the forging device 60B comprises at least two of the pressing mechanisms 62B, which pressing modes are different to each other. The materials 100B of different requirements are transported by the maintenance and delivering device 70B to different of the pressing mechanisms 62B, such that the materials 100B of different requirements can be processed or pressed differently. In other words, the forging device 60B is customized correspondingly to the characteristics of the material 100B.

The forging production system further comprises an oil mist absorber 80B, wherein the oil mist absorber 80B is arranged behind the forging device 60B. Preferably, relatively with the ground, the oil mist absorber 80B is at the highest point to the pressing mechanism 62B.

Figure 20:
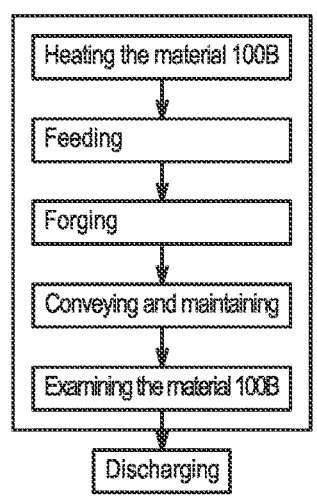
FIG. 20 is a block diagram of a forging and pressing production method according to the above fourth preferred embodiment of the present invention.

Referring to FIG. 20, a forging production method according to a fourth preferred embodiment is disclosed and illustrated in detail, wherein the forging production method comprising the steps of:
(a) heating the material 100B to a certain temperature and feeding the material to the forging space 600B;
(b) forging and processing the material 100B in the forging space 600B;
(c) delivering the material 100B in a reciprocating manner and, when in the forging space 600B, spraying oil to the forging space 600B; and
(d) inspecting and supplying the product.

The step (d) of the forging production method further comprises the steps of:
(d1B) inspecting the material 100B; and
(d2B) supplying the product.

The step (c) of the forging production method further comprises the steps of:
(c.1B) moving to the receiving position to receive the forged material 100B after the pressing mechanism 62B has moved up;
(c.2B) spraying oil up and down to the forging space 600B; and
(c.3B) conveying the material 100B to the storage area in the return trip.

It is worth mentioning that the step (c.2B) may be executed during the step (c.3B), wherein the timing of the return trip from the receiving position is predetermined. After the pressing mechanism 62B moves up and a predetermined time, the return trip starts.

The up and down oil spraying to the forging device 60B may be at the receiving position or during the return trip. Preferably, the step (c.3B) is executed after the step (c.2B) in the forging production method.

Figure 23:
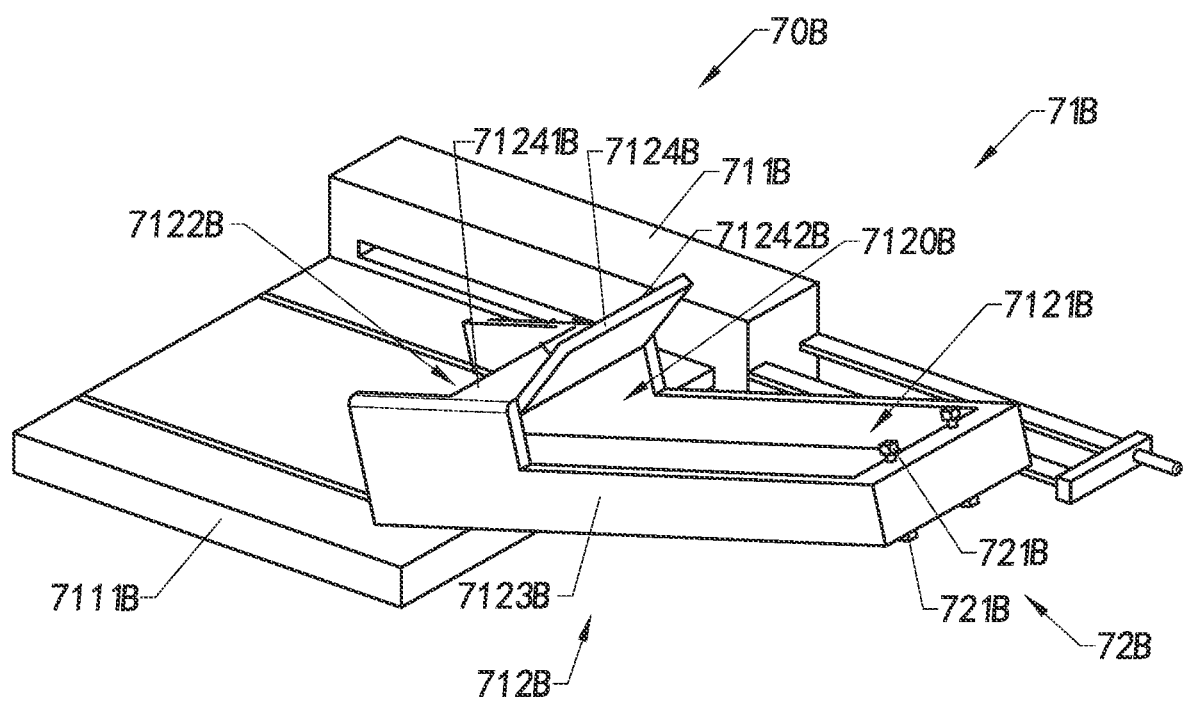
FIG. 23 is a perspective view of maintenance and delivering device of a forging and pressing production system according to a fifth preferred embodiment of the present invention.

Referring to FIG. 23, a forging production system according to a fifth preferred embodiment of the present invention is illustrated, which differs from it of the above fourth preferred embodiment in the position and quantity of the maintenance mechanism 72B arranged on the conveying mechanism 71B. According to the present embodiment, the quantity of the nozzles 721B is embodied as 4B and the nozzles 721B are arranged at the front end of the receiving portion 712B.

Preferably, two of the nozzles 721B are arranged on the upper portion of the front end of the receiving portion 712B, while the other two of the nozzles 721B are arranged on the lower portion of the front end of the receiving portion 712B, so as to allow a plurality of the nozzles 721B to fully and comprehensively spray oil to the forging space 600B and to allow a plurality of the nozzles 721B to jointly spray oil to the pressing mechanism 62B and the mold 61B.

The four nozzles 721B are respectively arranged in an up-and-down opposite manner and the four nozzles 721B are jointly arranged on the front end of the receiving portion 712B, so as to allow the two infusion bodies 722B to respectively infuse for two adjacent nozzles 721B, which reduces the size of the infusion bodies 722B. Further speaking, the infusion bodies 722B are respectively arranged on the two sides of the receiving portion 712B, such that when the receiving portion 712B is moved to the receiving position, the infusion bodies are at the sides of the forging device 60B, so as to reduce the impact of high temperature to the infusion bodies 722B.

Person skilled in the art should be able to understand that the nozzles 721B may spray out oil mist directly. Namely, the infusion body 722B conveys high temperature oil mist to at least one of the nozzles 721B so as to allow the nozzles 721B to directly spray oil mist up and down. Here, the present invention shall not be limited. In other words, the maintenance mechanism 72B is embodied as an oil mist generator and arranged at the lateral front of the forging device 60B. The maintenance mechanism 72B discontinuously sprays oil to the forging device 60B under the control of the control platform 10B.

Figure 24A:
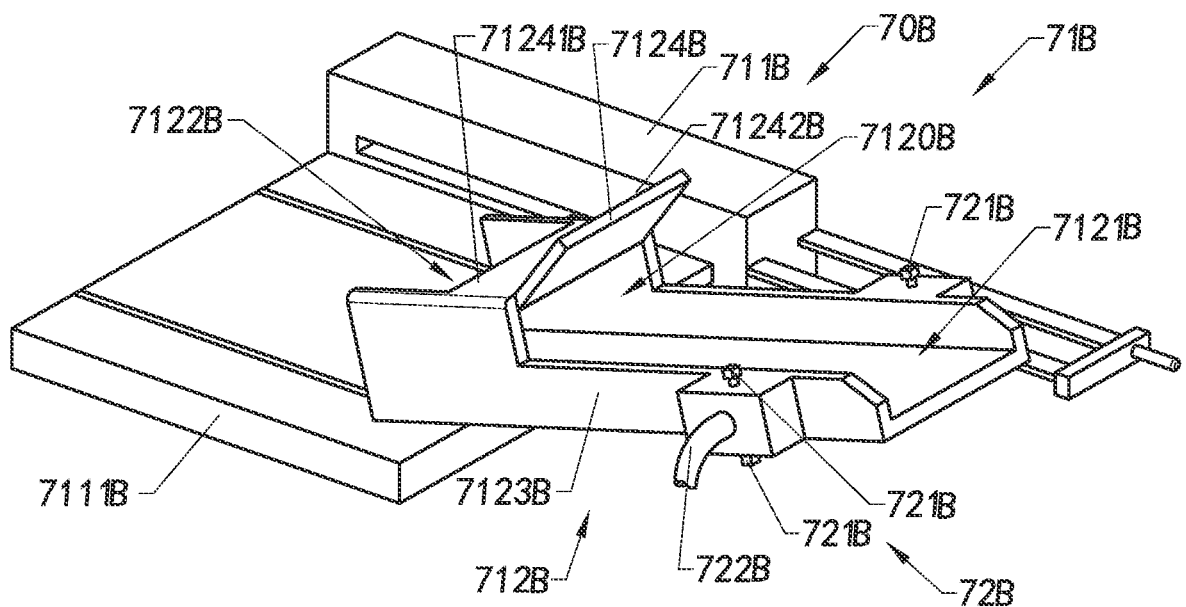
FIG. 24A is a perspective view of a maintenance and delivering device of a forging and pressing production system according to a sixth preferred embodiment of the present invention.
Figure 24B:
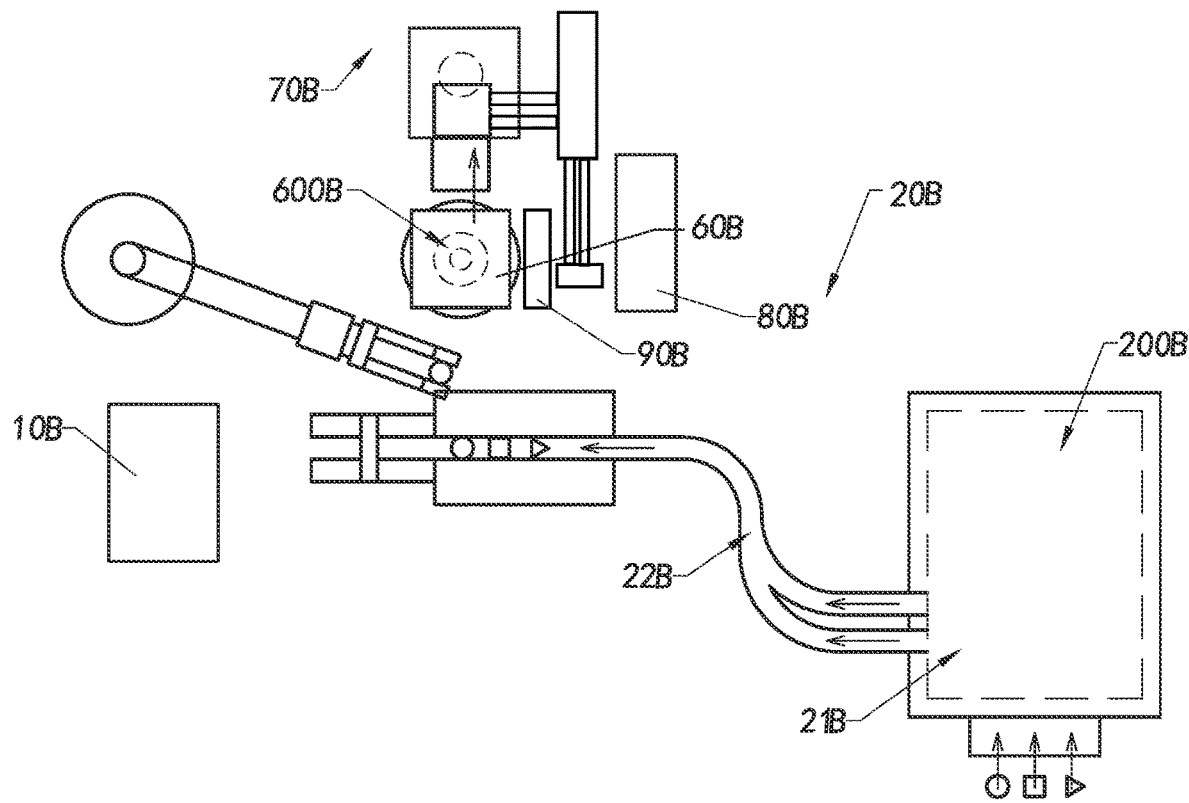
FIG. 24B is a perspective view of the forging and pressing production system according to the above sixth preferred embodiment of the present invention.

Referring to FIGS. 24A and 24B, a forging production system according to a sixth preferred embodiment of the present invention is illustrated, which differs from it of the above fourth preferred embodiment in the position and quantity of the maintenance mechanism 72B arranged on the conveying mechanism 71B. According to the present embodiment, the quantity of the nozzles 721B is embodied as 4B and the nozzles 721B are arranged at the side of the receiving portion 712B.

Further, two of the nozzles 721B are arranged in an up and down manner on one side of the receiving main body 7123B, while the other two of the nozzles 721B are arranged in an up and down manner on the other side of the receiving main body 7123B. The in an up and down manner arrangement refers to that the nozzles are respectively arranged toward the up direction and the down direction, so as to allow the nozzles 721B to spray oil to the pressing mechanism 62B and the mold at the same time, wherein the pressing mechanism 62B is arranged above the mold 61B and they jointly define the forging space 600B.

Further, two of the nozzles 721B spray oil to the pressing mechanism 62B, while the other two of the nozzles 721B spray oil to the mold 61B.

The maintenance mechanism 72B is arranged on the two sides of the receiving portion 712B, wherein the maintenance mechanism 72B is held in the front part or end part of the receiving portion 712B.

Preferably, the maintenance mechanism 72B is held in front of the receiving portion 712B.

Person skilled in the art should be able to understand the quantities of the nozzles 721B facing toward the two sides may not be the same. The maintenance mechanism 72B is arranged on the two sides of the conveying mechanism 71B, wherein one of the nozzles 721B sprays oil toward the mold 61B, while another two of the nozzles 721B sprays oil toward the pressing mechanism 62B.

The quantity of the nozzles 721B may also be embodied as three, five, six or more, which shall not be limited for the present invention. In addition, the oil spraying directions of the nozzles 721B are the up direction and the down direction. In other words, at least one of the nozzles 721B spraying oil upward to maintain the pressing mechanism 62B, while at least one of the nozzles 721B spraying oil downward to maintain the mold 61B. Preferably, two of the nozzles 721B are arranged on the upper sites of the two sides of the receiving portion 712B to allow the nozzles 721B to spray oil to the upper sites, while the other two of the nozzles 721B are arranged on the lower sites of the two sides of the receiving portion 712B to allow the nozzles 721B to spray oil to the lower sites, such that the four nozzles 721B can fully and comprehensively spray oil to the forging space 600B so as to guarantee that both the pressing mechanism 62B and the mold 61B can fully and comprehensively contact the machine oil to be cooled down and lubricated.

It is worth mentioning that two of the nozzles 721B are opposite arranged on one side of the receiving portion 712B, so as to allow the infusion body 722B to supply machine oil to the two nozzles 721B directly, which reduces the required size of the infusion body 722B of the maintenance mechanism 72B.

The other two of the nozzles 721B are opposite arranged on the other side of the receiving portion 712B.

Preferably, the four nozzles are arranged at the front of the receiving portion 712B.

The receiving portion 712B is moved to the receiving position so as for receiving the falling material 100B. Then the maintenance mechanism 72B sprays oil up and down.

Preferably, the oil mist absorber 80B is arranged behind the forging device 60B to continuously suck the oil mist so as to prevent the oil mist from staying around the forging device 60B and rendering pollution or even accident. Through utilizing the oil mist absorber 80B, the forging production system becomes more secure and durable.

The oil mist absorber 80B is arranged right behind the forging device 60B, such that the oil mist can be extracted directly. Further speaking, the oil mist absorber 80B suck up mist-formed oil mist, smoke, and etc. The absorption and suction scope of the oil mist absorber 80B is between the mold 61B and the pressing mechanism 62B. Further speaking, the absorption and suction scope of the oil mist absorber 80B is relatively higher than the mold 61B and lower than the highest point of the pressing mechanism 62B, so as for the nozzles 721B to respectively spraying oil up and down in the forging space 600B when the pressing mechanism 62B moves up. The oil mist absorber 80B is capable of taking out the diffused oil mist from the forging space 600B.

Figure 26:
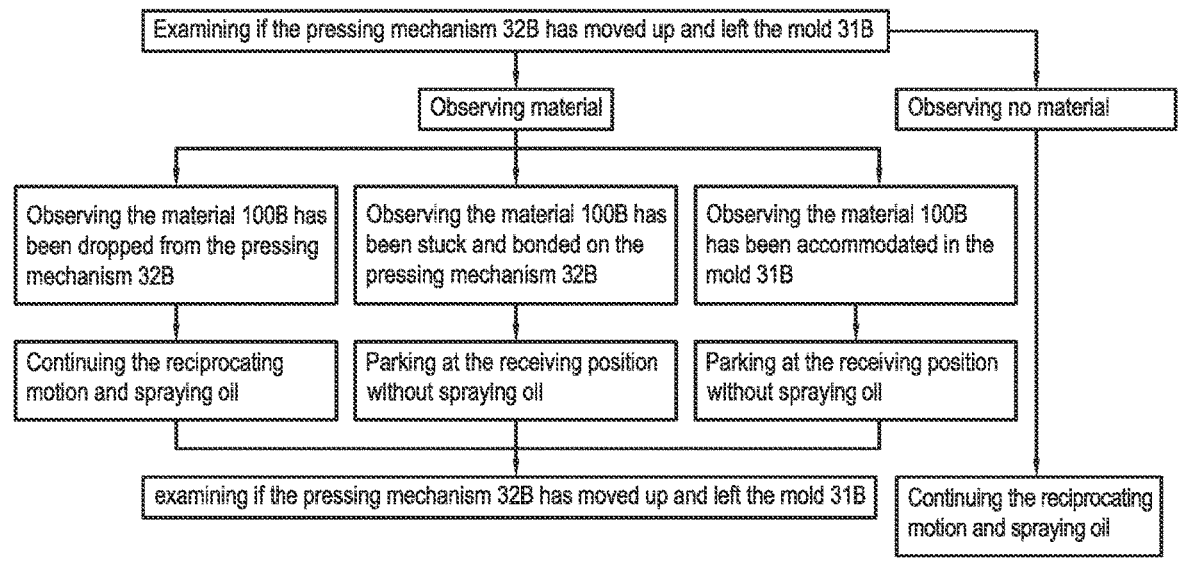
FIG. 26 is a flow diagram illustrating an examination and forging and pressing process of the forging and pressing production system according to the above sixth preferred embodiment of the present invention.

Referring to FIGS. 24 and 26, the forging production system comprises the checking device 90B, wherein the checking device 90B examines the conditions of the forging device 60B and the material 100B. When the checking device 90B detects position error of the forging device 60B and the material 100B, the checking device 90B will send a signal to the control platform 10B. The control platform 10B controls the maintenance and delivering device 70B to stop moving or operating as usual. When the checking device 90B detects that the conditions of the forging device 60B and the material 100B are normal, the checking device 90B will send a signal to the control platform 10B. The control platform 10B controls the maintenance and delivering device 70B to normally deliver the materials 100B and spray oil to maintain the forging device 60B.

It is worth mentioning that the checking device 90B real-time detects the conditions of the forging device 60B and the materials 100B. Therefore, through the protection of the checking device 90B, the forging production system becomes safer.

Preferably, the checking device 90B is capable of detecting the raising of the pressing mechanism 62B and the continuous moving of the material 100B along with the pressing mechanism 62B without falling off. The checking device 90B will send an adhesion error signal to the control platform 10B. Then, the control platform 10B controls the maintenance and delivering device 70B to stop at the receiving position without spraying oil. The control platform 10B controls the choosing mechanism 52B to stop feeding.

When the material 100B is taken out from the forging device 60B, the checking device 90B checks and recognizes the absence of the material 100B in the forging device 60B. The checking device 90B transmits a nothingness signal to the control platform 10B. Then, the control platform 10B controls the maintenance and delivering device 70B to spray oil and return from the end position to the starting position.

When the maintenance and delivering device 70B moves far away from the forging device 60B, the control platform 10B controls the choosing mechanism 52B to continue conveying the material 100B to the mold 61B.

The checking device 90B is capable of detecting the raising of the pressing mechanism 62B and the material 100B being left in the mold 61B without being brought up by the pressing mechanism 62B. The checking device 80B sends an error signal to the control platform 10B and then the control platform 10B controls the maintenance and delivering device 70B to stop at the receiving position without spraying oil.

When the maintenance and delivering device 70B stops operating, the control platform 10B controls the choosing mechanism 52B to stop feeding.

When the material 100B is taken away from the forging device 60B, the checking device 90B checks and recognizes the absence of the material 100B in the pressing mechanism 62B and the mold 61B and sends the nothingness signal to the control platform 10B. The control platform 10B controls the maintenance and delivering device 70B to spray oil outward and return to the starting position and continuously conduct the reciprocating motion and the oil spraying maintenance.

Then, the choosing mechanism 52B is controlled by the control platform 10B to stop feeding.

The checking device 90B is capable of detecting the raising of the pressing mechanism 62B and the absence of the material 100B in both of the pressing mechanism 62B and the mold 61B. The checking device 90B sends a nothingness signal of the receiving position and calls for oil spraying.

Then, the control platform 10B controls the choosing mechanism 52B to actively supply the material 100B to the mold 61B.

When the checking device 90B detects open flame on the forging device 60B, the checking device 90B will send an urgent process signal to the control platform 10B. The control platform 10B will control the maintenance and delivering device 70B to stop moving and stop spraying oil. Meanwhile, the control platform 10B will also stop the operation of the forging production system and give an alarm.

Person skilled in the art should be able to understand the forging production system is also capable of communicating with other forging production system for stopping operation and giving an alarm. The forging production system may also be communicated with other systems for preventing open flame of a single system from rendering danger of a wide range. Here, the present invention shall not be limited.

The checking device 90B is capable of detecting the positions of the material 100B and the pressing mechanism 62B of the forging device 60B. When the pressing mechanism 62B moves up and down, whether the material 100B is moving along with the pressing mechanism 62B or the material 100B is not moving along with the pressing mechanism 62B, the checking device 90B checks and recognizes incidents and sends corresponding signals to the control platform 10B. The control platform 10B controls the maintenance and delivering device 70B to execute the procedures for the incidents.

It is worth mentioning that the checking device 90B may also be capable of only detecting without a determining function, wherein the checking device 90B sends the detected information to the control platform 10B and relies on the control platform 10B to determine the situation of the forging device 60B and the material 100B and to control the operations of the maintenance and delivering device 70B as well as the operations of the entire forging production system.

It is more worth mentioning that the checking device 90B may also be embodied as the monitor unit 14B of the control platform 10B of the above first preferred embodiment, wherein the present invention shall not be limited here.

Figure 25:
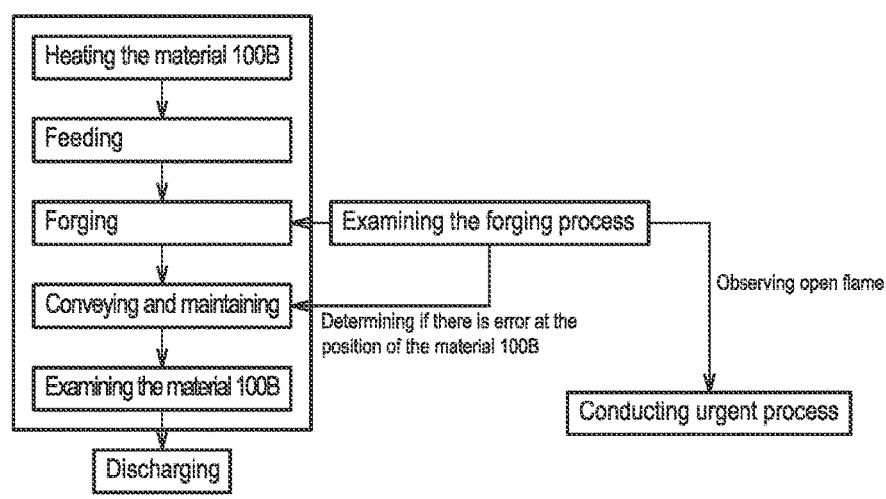
FIG. 25 is a block diagram of a forging and pressing production method according to the above sixth preferred embodiment of the present invention.

Referring to FIGS. 25 and 26, a forging production method according to another preferred embodiment is disclosed and illustrated in detail, wherein the forging production method comprising the steps of:

(a) heating the material 100B to a certain temperature and feeding the material to the forging space 600B;

(b) forging and processing the material 100B through the forging device 60B;

(c) receiving the forged and formed material 100B from the forging device 60B and conveying the material 100B to leave the forging device 60B, so as to clear the forging device 60B and allow the forging device 60B be oil sprayed for executing the step (a) again; and (d) inspecting and supplying the product.

The step (d) of the forging production method further comprises the steps of:

(d1B) inspecting the material 100B; and (d2B) supplying the product.

The forging production method further comprises the following steps between the step (b) and the step (c):

(e) checking the forging process and the position of the material 100B so as for determining if there is error.

The step (c) of the forging production method further comprises the steps of:

(c.1B) moving to the forging device 60B for receiving the dropping material 100B after the end of the pressing;

(c.2B) spraying oil up and down to the forging device 60B; and (c.3B) delivering the forged material 100B from the forging device 60B.

It is worth mentioning that in the forging production method the step (c.2B) may be executed during the step (c.3B).

The forging production method has the step (a) executed after the step (c.3B).

The forging production method further comprises the following steps after the step (c.1B):
(c.4B) stopping the reciprocating motion and spraying oil for maintenance.

The forging production method further comprises the following steps after the step (c.1B):
(c.5B) spraying oil up and down to the forging device 60B and continuing being away from the forging device 60B.

The step (e) of the forging production method further comprises the steps of:
(e.1B) after the examination, determining the adhesion position of the material 100B in the forging process is any position on the forging device 60B.

The step (4B) of the forging production method is executed after the step (c.e.1B).

The step (e.1B) of the forging production method further comprises the steps of:
(e.1B.1B) after the examination, determining the adhesion position of the material 100B in the forging process is selected from the group consisting of the pressing mechanism 62B, the mold 61B, and combination thereof.
(e.1B.1B) the step (c.4B) of the forging production method is executed after the step (e.1B 0.1B).

The step (e) of the forging production method further comprises the steps of:
(e.2B) examining and determining no material 100B in the forging process.

The forging production method executing the step (c.5B) after the step (e.2B).

The step (e.1B) of the forging production method further comprises the steps of:
(e.1B.3B) examining and determining open flame occurs in the forging process.

The forging production method further comprising the steps of:
(g) emergency stopping and warning.

The step (g) of the forging production method is executed after the step (e.3B).

The implementations of many embodiments may be freely combined that the present invention shall not be limited here.

Figure 27:
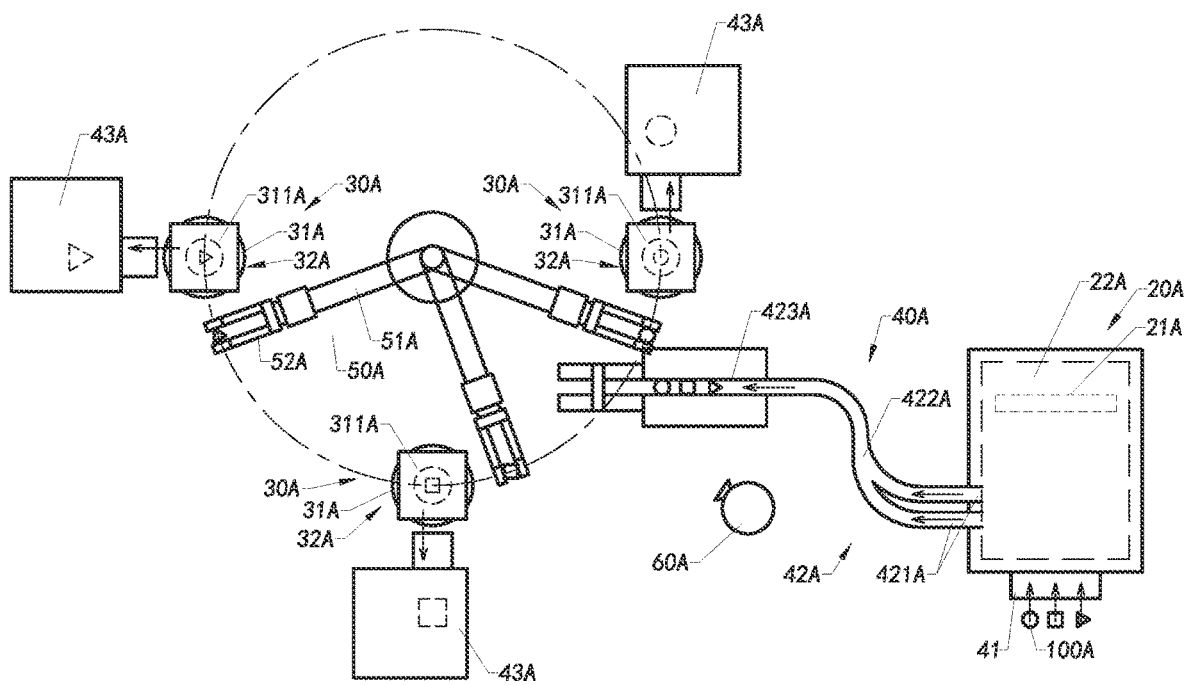
FIG. 27 is a perspective view of the forging and pressing production system according to the seventh preferred embodiment of the present invention.

Referring to FIGS. 27-20, a seventh preferred embodiment of the present invention will be disclosed and illustrated as follows. The forging and pressing production system forges and presses at least a material 100A so as for obtaining a formed product after the forging and pressing process.

Referring to FIG. 27, the forging and pressing production system comprises at least a hot melt device 20A and at least a forging device 30A. The material 100A enters the hot melt device 20A. The hot melt device 20A heats up the material 100A so as to heat the material 100A to a certain temperature. The material 100A is then input into the forging device 30A. The forging device 30A forges and presses the material 100A so as to turn the material 100A into a certain shape through forging and pressing. After the material 100A is processed and finished, it will be sent out from the forging and pressing production system.

The forging and pressing production system also comprises at least a delivering device 40A and at least a feeding device 50A. An end of the delivering device 40A is connected with the hot melt device 20A so as for receiving the material 100A heated by the hot melt device 20A. The material 100A moves to the forging device 30A along the delivering device 40A. The feeding device 50A clamps the material 100A and inputs it into the forging device 30A. Next, the forging device 30A forges and presses the material 100A.

The delivering device 40A comprises a material inputting tool 41A. The material inputting tool 41A is connected with the hot melt device 20A and sends the material 100A into the hot melt device 20A so as to be heated by the hot melt device 20A.

Figure 31:
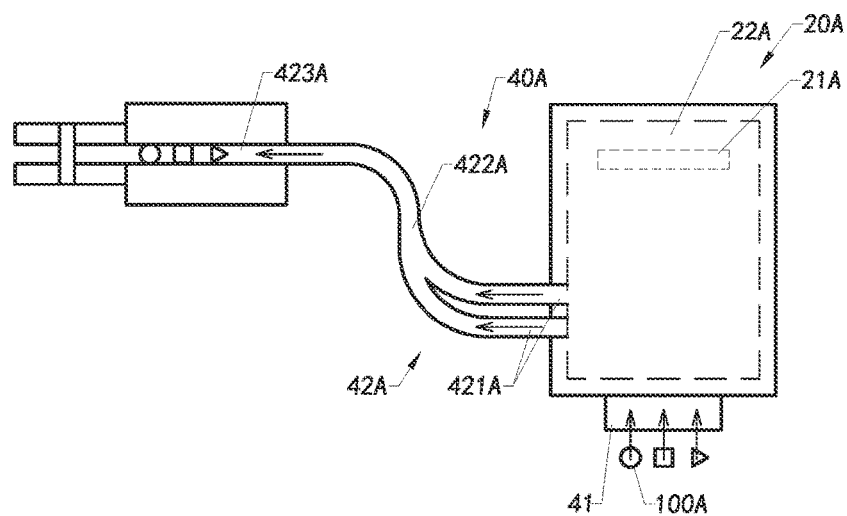
FIG. 31 is a perspective view of the hot melt device of the forging and pressing production system according to the above seventh preferred embodiment of the present invention.

Referring to FIG. 31, the hot melt device 20A comprises at least a heater 21A and at least a heating chamber 22A, wherein the heating chamber 22A has a heating space 200 formed and defined therein. The two ends of the heating chamber 22A are communicated with the outside. The material inputting tool 41A is connected with an end of the heating chamber 22A for inputting the material 100A into the heating space 200. The heater 21A is arranged at an end of the heating chamber 22A and faces toward the heating space 200. The heater 21A heats up the heating space 200.

The delivering device 40A also comprises at least a conveying tool 42A, wherein an end of the conveying tool 42A is connected with the hot melt device 20A. After the hot melt device 20A heats up the material 100A, the material 100A enters the conveying tool 42A and moves from an end to the other end of the conveying tool 42A.

Specifically, the conveying tool 42A comprises at least a material collecting end 421A, at least a guide rail 422A, and a discharging end 423A, wherein the material collecting end 421A is connected with an end of the hot melt device 20A. Further, the material collecting end 421A is communicated with an end of the heating chamber 22A. The material 100A leaves the heating chamber 22A and enters the material collecting end 421A after being heated in the heating space 200 in the heating chamber 22A. The material 100A continues to pass through the material collecting end 421A, move through the guide rail 422A, and reaches the discharging end 423A. The material collecting end 421A and the discharging end 423A are respectively provided at the two ends of the guide rail 422A. Preferably, the material collecting end 421A is at the high place, while the discharging end 423A is at the low place. The guide rail 422A connects the material collecting end 421A and the discharging end 423A. The guide rail 422A is extended from the material collecting end 421A of the high place to the discharging end 423A of the low place. The material 100A moving along the material collecting end 421A to the discharging end 423A of the guide rail 422A is actually moving from the high place to the low place. In other words, under the action of gravity, the material 100A is able to slide from the material collecting end 421A of the high place along the guide rail to the discharging end 423A.

Figure 32:
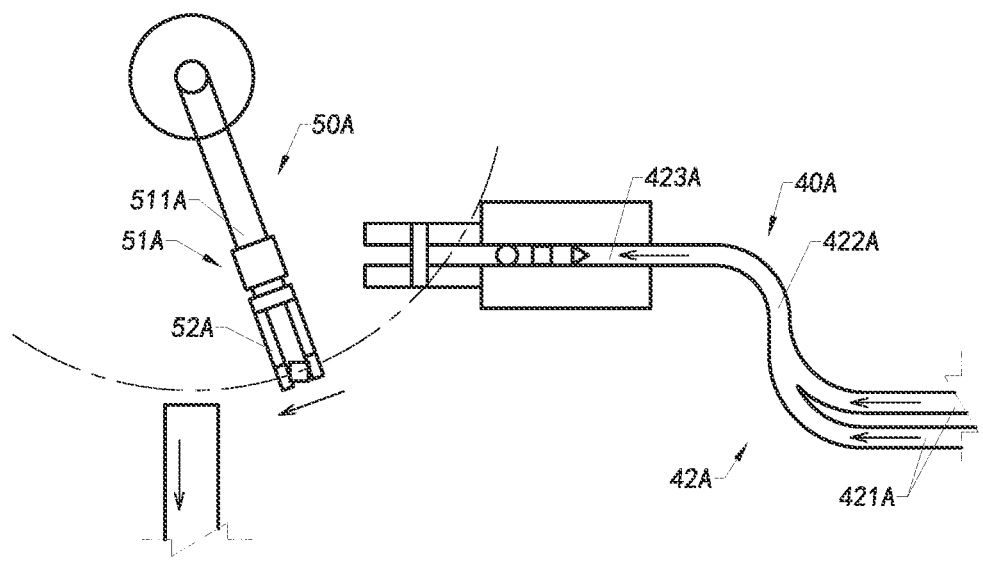
FIG. 32 is a perspective view of the feeding device of the forging and pressing production system according to the above seventh preferred embodiment of the present invention.

Referring to FIG. 32, the feeding device 50A is arranged nearby the delivering device 40A. The feeding device 50A is arranged to face toward the discharging end 423A of the conveying tool 42A. The feeding device 50A clamps the material 100A from the discharging end 423A and inputs the material 100A into the forging device 30A.

The feeding device 50A comprises at least a transfer arm 51A and at least a clamping tool 52A, wherein the clamp device 52 is arranged at an end of the transfer arm 51A and facing toward the delivering device 40A and the forging device 30A The transfer arm 51A moves within a certain scope. The clamping tool 52A moves along with the transfer ratio 52. In other words, the feeding device 50A also moves within a certain scope.

After the feeding device 50A clamps the material 100A from the discharging end 423A and move for a certain distance, it inputs the material into the forging device 30A.

Specifically, the transfer arm 51A moves within a certain scope to adjust the position of the clamping tool 52A. The material 100A moves from the material collecting end 421A along the guide rail 422A to the discharging end 423A. The clamping tool 52A clamps to take the material 100A from the discharging end 423A. The transfer arm 51A rotates toward the forging device 30A so as to bring the clamping tool 52A to move toward the forging device 30A. The clamping tool 52A inputs the material 100A into the forging device 30A after it is aligned with the forging device 30A.

Figure 33:
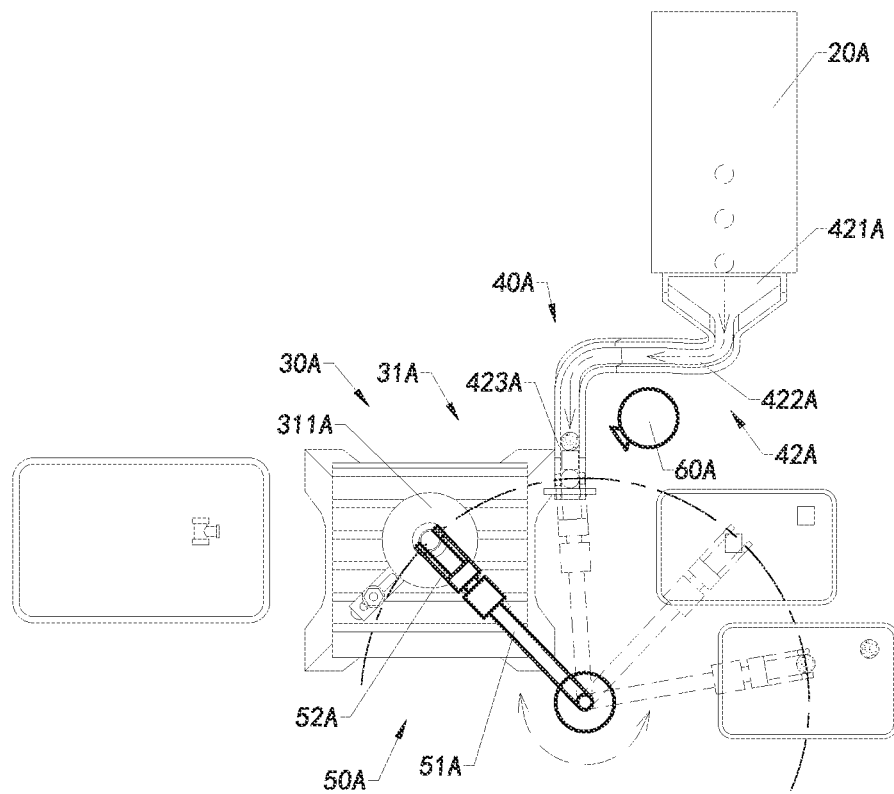
FIG. 33 is a perspective view of the forging and pressing production system according to the above seventh preferred embodiment of the present invention.

Referring to FIGS. 32 and 33, the transfer arm 51A comprises at least two adjusting arms 511A, wherein the ends and tails of the adjusting arms 511A are connected to each other, so as to respectively form and define a fixed end and a free end. The fixed end and the free end are respectively the two ends of the transfer arm 51A. The adjacent adjusting arms 511A create an included angle therebetween. The adjusting arms 511A can rotate relatively with each other so as to change and adjust the included angle. An end of one of the adjusting arms 511A is affixed on one side. The side may be the ground, a place at the forging and pressing production system or a place at another carrier. The free end has the clamping tool 52A mounted thereon. The adjusting arms 511A rotates based on the fixed end as the circle center so as for adjusting the direction and position thereof.

The adjusting arms 511A adjust the positions and orientations thereof so as to adjust the conveying carriage or posture of the transfer arm 51A to have the position and orientation of the clamping tool 52A be adjusted.

When the feeding device 50A has to clamp the material 100A from the discharging end 423A, the adjusting arms 511A rotates toward the position of the discharging end 423A, so as to have the clamping tool 52A be adjusted along with the adjusting arms 511A to the vicinity of the discharging end 423A.

The position of the clamping tool 52A is further adjusted. When the position of the clamping tool 52A is higher than the position of the discharging end 423A, the adjusting arm 511A forming the free end will protrude downward to the position of the discharging end 423A, rendering the height of the clamping tool 52A be adjusted to the suitable height to the discharging end 423A, so that the clamping tool 52A approaches the discharging end 423A from the higher position. Other of the adjusting arms 511A coordinates to the adjusting arm 511A that has to protrude downward and rotate with one another to adjust the positions so as to allow the adjusting arm 511A that has to protrude downward successfully protrude downward and have the height of the clamping tool 52A be adjusted.

When the distance between the clamping tool 52A and the discharging end 423A is too long, the adjusting arm 511A forming the free end will move a certain distance along the direction toward the discharging end 423, so as to approach the clamping tool 52A to the discharging end 423A. Other of the adjusting arms 511A relatively rotate the conveying carriage to coordinate with the adjusting arm 511A that has to move for the distance, so as to have the clamping tool 52A mounted on the free end approach the discharging end 423A.

The clamping tool 52A clamps the material 100A from the discharging end 423A. The transfer arm 51A adjusts the conveying carriage based on the subsequent processing mode determined according to the characteristic acquired by the examining device 60A, so as to have the clamping tool 52A place the material 100A to the correct position. When the material 100A is subsequently determined as unsuitable for forging, the adjusting arms 511A will adjust the direction and distance for the waste product area, so as to approach the clamping tool 52A to the waste product area. When the clamping tool 52A is adjusted to the waste product area through the adjusting arms 511A, the clamping tool 52A will open to drop the material 100A into the waste product area.

When the material 100A is determined suitable for forging and the forging device that the material 100A has to be put into is also determined, the adjusting arms 511A will turn to the forging device 30A and adjust the height, orientation, and position of the clamping tool 52A, so as to have the clamping tool 52A be adjust to the above of the forging device 30A of the forging device 30 that the material 100A has to be input into. The clamping tool 52A opens so as to have the material 100A be input into the forging device 30A. The forging device 30A forges and presses the material 100A.

It is worth mentioning that the examining device 60A examines the forging device 30A so as to allow the feeding device 50A to put in the material 100A at a proper time. When the examining device 60A detects that the forging device 30A has a material 100A input therein, if the feeding device 50A has clamped a new material 100A, the feeding device 50A has to wait until the examining device 60A detects that the forging device 30A has no material 100A therein. Then the feeding device 50 is allowed to input the material 100A into the forging device 30A.

In other words, the examining device 60A checks that if the forging device 30A is forging the material 100A or is there material 100A input to wait for forging, so as to allow the feeding device 50A to input the material 100A when the forging device 30A is available, which ensures the success and smooth of the forging of the forging device 30A and prevents interferences that render troubles.

Figure 35:
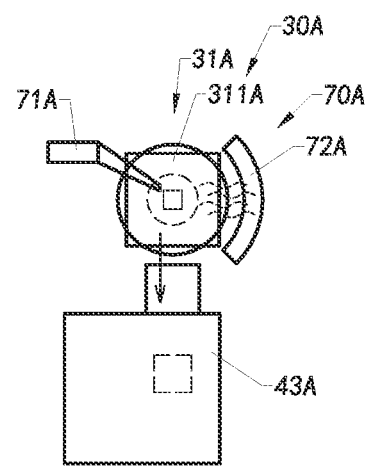
FIG. 35 is a perspective view of the forging device of the forging and pressing production system according to the above seventh preferred embodiment of the present invention.

Referring to FIG. 35, the forging device 30A comprises a forging bench 31A and a pressure device 32A. The forging bench 31A has a mold 311A arranged thereon. When the material 100A is input into the mold 311A, the pressure device 32A will press down, so as to stamp the material 100A into the shape of the mold 311A.

The feeding device 50A transfers the material 100A from the discharging end 423A to the forging bench 31A, wherein the clamping tool 52A clamps the material 100A, aims the mold 311A, and then puts the material 100A into the mold 311A. After the material 100A is put into the mold 311A, the pressure device 32A will stamp and press down, so as to forge and press the material 100A based on the mold 311A.

The material 100A has to leave the forging device 30A after being formed through forging and pressing. The pressure device 32A moves back upwardly after pressing the material 100A. Because the material 100A is heated and then forged and pressed, the material 100A will be adhered and brought up by the pressure device 32A.

The delivering device 40A also comprises a discharging tool 43A. The discharging tool 43A delivers the material 100A from the forging device 30A. After the pressure device 32A forges and presses the material 100A on the forging bench 31, the pressure device 32A brings the material 100A up and the discharging tool 43A protrudes from a side of the forging device 30A toward the forging device 30A. The discharging tool 43A moves to the below of the pressure device 32A. The material 100A leaves the pressure device 32A and falls into the discharging tool 43A. Then the discharging tool 43A moves out and brings the material 100A to leave the forging device 30A.

The discharging tool 43A has an inclined plane. The inclined plane is formed and provided through inclining outward and downward from the discharging tool 43A toward an end of the forging device 30A. When the material 100A leaves the pressure device 32A and falls into the discharging tool 43A, the material 100A falls and slides from the high end toward the low end of the discharging tool 43A. The material 100A leaves from the forging production device after forging.

The material 100A automatically enters the hot melt device 20A through the material inputting tool 41A of the delivering device 40A, so as to be heated. Next, the material 100A is pushed out from the hot melt device 20A to automatically enter the conveying tool 42A of the delivering device 40A. The material 100A automatically moves from the material collecting end of the high end to the low end along the conveying tool 42A. The feeding device 50A automatically transports the material 100A from the material inputting tool 41A to the forging device 30A. The feeding device 30 inputs the material 100A into the forging device 30A. Next, the forging device 30A forges and presses the material 100A to form and shape the material 100A through forging and pressing. The discharging tool 43A receives the forged material 100A and then the material 100A leaves the forging and pressing production system. The forging and pressing production processes of the forging and pressing production system to the material 100A does not require labor involvement, which reduces labor costs and ensures production safety.

The forging production device also comprises a maintenance device 70A. The maintenance device 70A maintains the forging production device, so as to ensure the normal operation of the forging production device.

The maintenance device 70A comprises at least an oil spraying device 71A. The oil spraying device 71A is arranged at a high end of the discharging tool 43A. When the discharging tool 43A moves from the outer side to the forging device 30A for receiving the material 100A, the oil spraying device 71A sprays oil toward the pressure device 32A of the upper side and the forging bench 31A of the lower side, so as to maintain the pressure device 32A and the forging bench 31A. The oil spraying device 71A sprays oil to the forging device 30A to lubricate the forging device 30A and to maintain the forging device 30A.

The maintenance device 70A also comprises at least a smoke discharge device 72A. The smoke discharge device 72A eliminates the smoke generated by the forging device 30A.

The material 100A has at least a characteristic. The material 100A needs to be processed differently based on the difference of the characteristic. The materials 100A made of various materials and ingredients have to be heated to different temperatures. Proper temperatures that the materials 100A attain will affect the success of the subsequent forging thereof as well as whether the demands and requirements of the end product can be met. The characteristic of the material 100A is acquired for analyzing the processing mode for the material 100A.

The forging production device further comprises at least an examining device 60A, wherein the examining device 60A examines the material 100A through acquiring at least a characteristic of the material 100A. The examining device 60A further analyzes the processing mode of the material 100A according to the characteristics of the material 100A. The examining device 60A examines the material 100A through acquiring a material characteristic 101A of the material 100A. The examining device 100 analyze the production methods and modes corresponding to the materials 100A based on the material characteristics 101A of the material 100A. For instance, the required temperature for the material 100A to be heated to and the forging device 30A that is required for the material 100A to be input into.

It is worth mentioning that the forging production device may include a plurality of the forging devices 30A. The forging devices may forge the materials 100A of the same ingredient or the materials 100A of different ingredients. Different forging devices may have different molds 311A arranged therein. The materials 100A, based on the demands of different end products, will be respectively input into the forging devices with corresponding mold 311A arranged therein so as to be forged into corresponding end products. The material 100A can be input into the corresponding forging device 30A based on the characteristic acquired by the examining device 60A.

When the materials 100A made of ingredient or material A, B, and C are input into the forging production device, the forging devices 30A respectively forge the material 100A or various materials or ingredients. The examining device 60A examines the material 100A, acquires a material characteristic of the material 100A, and analyzes and discovers the ingredients of the materials 100A as A, B, and C. The examining device 60A further analyzes the corresponding temperature that the material 100A has to be heated to based on the material characteristic of the material 100A.

The material 100A enters the hot melt device 20A through the material inputting tool 41A. The hot melt device 20A heats up the material 100A based on the material characteristic 101A of the material 100A. The material 100A leaves the hot melt device 20A after being heated and is transported to the discharging end 423A through the conveying tool 42A. The examining device 60A examines the material 100A, acquires a temperature characteristic 102A of the material 100A, and analyzes the temperature of the heated material 100A. The examining device 60A further analyzes the required temperature that the material 100A has to be heated to based on the temperature characteristic 102A of the material 100A.

The feeding device 50A executes either feeding or removing for the material 100A based on the analytical result of the examining device 60A. When the examining device 60A analyzes and discovers that the material 100A is heated to the required temperature, the feeding device 50A will transport the material 100A from the discharging end 423A to the forging device 30A and input the material into the forging device 30A for forging through the forging device 30A. Here, the feeding device 50A determines if the material 100A has to be input into the forging device 30A based on the material characteristic 101A acquired by the examining device 60A. The feeding device 50A inputs the material 100A into the forging device 30A that is for forging the corresponding material. Specifically, the transfer arm 51A faces the discharging end 423A and protrudes a certain distance toward the discharging end 423A, so as to have the clamping tool 52A be closer to the material 100A of the discharging end 423A. The clamping tool 52A clamps the material 100A from the discharging end 423. The transfer arm 51A turns toward the direction of the forging device 30A that the material 100A has to be input thereinto, so as to move the clamping tool 52A close to the forging device 30A The transfer arm 51A protrudes for a certain distance toward the forging device 30A so as to move the clamping tool 52A to the above of the forging bench 31A. The material 100A is aligned with the mold 311A and the clamping tool 52A is opened, so that the material 100A can be input from the clamping tool 52A into the mold 311A.

The examining device 60A examines if the forging device 30A has the material 100A input therein. The examining device 30 further examines if the mold 311A has the material 100A input therein. When the examining device 60A detects the input of the mold into the forging device 30A, the pressure device 32A stamps and presses down on the mold 311A, so that the material 100A can be forged and pressed to be formed and shaped based on the shape of the mold 311A.

After the pressure device 32A has forged and pressed the material 100A, it brings the material 100A to lift. Then the discharging tool 43A will move to the below of the pressure device 32A. The material 100A leaves the pressure device 32A will fall into the discharging tool 43A. Next, the discharging tool 43A move outward to leave the below of the pressure device 32A, so that the material 100A can be taken out from the discharging tool 43A and moved to the end product area. The material 100A is forged and pressed.

When the examining device 60A analyzes and discovers that the material 100A has not been heated to the corresponding temperature based on the acquired temperature characteristic 102A, the material 100A will be scrapped. Then the feeding device 50A will put the material 100A into the waste product area. Specifically, the transfer arm 51A protrudes toward the discharging end 423A and the clamping tool 52A approaches the discharging end 423A to clamp the material 100A from the discharging end 423A. Then the transfer arm 51A rotates to the direction of the waste product area and the clamping tool 52A approaches the waste product area. Next, the clamping tool 52A opens and the material 100A will be dropped from the clamping tool 52A and put into the waste product area.

The examining device 60A detects an external physical characteristic 103A of the material 100A input into the forging production device. The examining device 60A analyzes the subsequent processing mode for the material 100A according to the acquired external physical characteristic 103A thereof.

According to an embodiment of the present invention, an end of the clamping device 52A is affixed at the free end of the transfer arm 51A. The included angle between the clamping device 52A and the transfer arm 51A stays unchanged. After the clamping device 52A clamps the material 100A from the discharging end 423A, the conveying carriage and positions thereof are adjusted through the transfer arm 51A. The clamping device 52A transfers the material.

Figure 34:
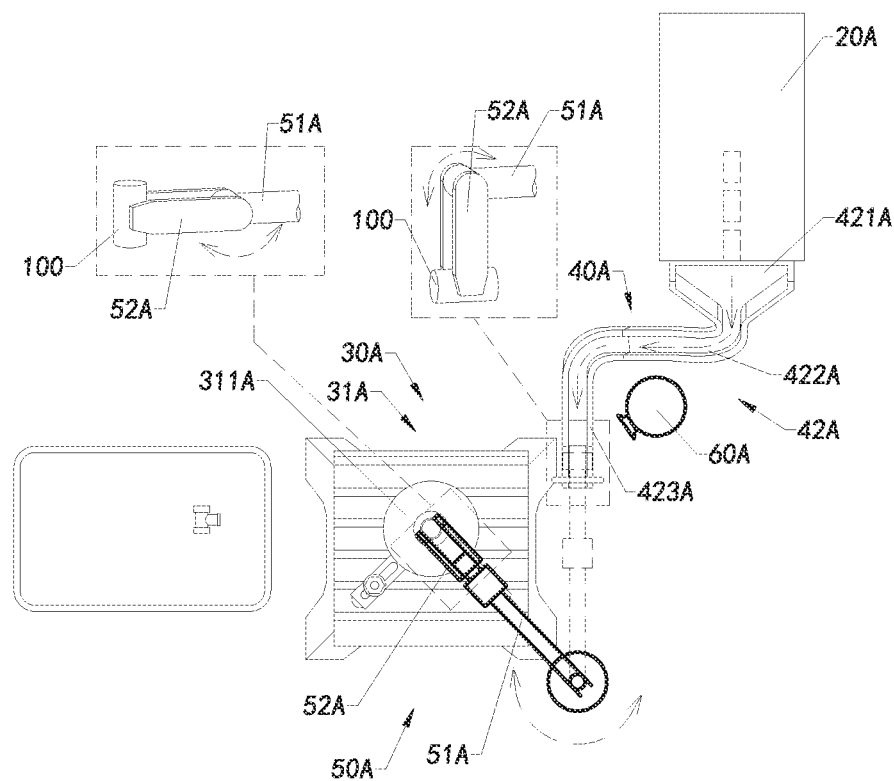
FIG. 34 is a perspective view of the forging and pressing production system according to an alternative mode of the above seventh preferred embodiment of the present invention.

According to another embodiment of the present invention, referring to FIG. 34, the included angle between the clamping tool 52A and the transfer arm 51A is changeable. In other words, the clamping tool 52A is able to rotate relatively with the transfer arm 51A. The clamping tool 52A rotates to adjust a delivery carriage of the clamped material 100A.

For example, the examining device 60A detects the material 100A put into the forging production device and acquires a strip shape external physical characteristic 103A of the material 100A. The material 100A in a strip shape has to be erected and then put into the forging device 30A for the forging and pressing.

After the material 100A is put into the forging production device, it first passes through the material inputting tool 41A to enter the hot melt device 20A to be heated. The material 100A leaves the hot melt device 20A and enters the conveying tool 42A after being heated. Preferably, the material 100A enters the conveying tool 42A in a horizontally lying carriage. The material 100A perpendicularly moves from the material collecting end 421A of the conveying tool 42A along the guide rail 422A to the discharging end 423A.

The examining device 60A examines the material 100A at the discharging end 423A to acquire the external physical characteristic 103A of the material. The examining device 60A also acquires the temperature characteristic 102A of the material 100A. When the examining device 60A acquires and senses the external physical characteristic 103A of the material 100A that it is horizontally lying at the discharging end 423A and the temperature characteristic 102A reflects that the temperature of the heated material 100A meets the requirement, the feeding device 50A will transfer the material 100A from the conveying tool 42A to the forging device 30A.

Specifically, the transfer arm 51A protrudes a certain distance toward the discharging end 423A and the clamping tool 52A approaches the discharging end 423A and clamps the material 100A from the discharging end 423A. The clamping tool 52A clamps the horizontally lying material from the two sides of the material 100A, so as to clamp the material 100A up in the horizontally lying manner. The clamping tool 52A clamps the material 100A and moves toward the forging device 30A through the rotation of the transfer arm 51A. The transfer arm 51A protrudes for a certain distance toward the forging device 30A so as to move the clamping tool 52A to the above of the forging bench 31A. The clamping tool 52A rotates for a certain angle, so as to make the clamped material 100A into a perpendicular manner. The clamping tool 52A aims the material 100A at the mold 311A and opens, so that the material 100A can be disengaged from the clamping tool 52A and be perpendicularly input into the mold 311A of the forging bench 31A The pressure device 32A exerts pressure on the material 100A for forging and pressing.

In other words, the clamping tool 52A adjusts the delivery carriage of the material 100A before the material 100A is input into the forging device 30A to be forged and pressed. The delivery carriage of the material 100A is turned from horizontally lying into perpendicular, so as for the material 100A to be perpendicularly input into the forging device 30A and be forged and pressed in a perpendicular condition subsequently.

The timing for the clamping tool 52A to adjust the delivery carriage of the material 100A may be during the period after the material 100A is clamped from the conveying tool 42A and before the material 100A is put into the forging device 30A. The clamping tool 52A clamps the material 100A from the discharging end 423A and then starts to adjust the delivery carriage of the material 100A. As long as the delivery carriage of the material 100A is completely adjusted before the material 100A is put into the forging device 30A, the material 100A can enter the forging device 30A with a correct delivery carriage.

According to another embodiment of the present invention, the external physical characteristic 103A of the material 100A as a flat cylindrical body is acquired by the examining device 60A. The material 100A perpendicularly moves from the material collecting end 421A along the guide rail 422A to the discharging end 423A in the manner that the bottom side thereof contacting the conveying tool 42A The examining device 60A acquires the external physical characteristic 103A of the material 100A at the discharging end 423A. The external physical characteristic 103A of the material 100A as a perpendicular carriage is acquired. The feeding device 50A transports the material 100A from the discharging end 423A to the forging device 30A.

Here, the transfer arm 51A protrudes toward the discharging end 423A for a certain distance. The clamping tool 52A approaches the discharging end 423A and clamps the material 100A from a side of the material 100A. Then the transfer arm 51A moves toward the forging device 30A to have the clamping tool 52A approach the forging device 30A until reaching the above of the forging bench 31A. The material 100A is moved to the above of the forging bench 31A in a manner of a perpendicular delivery carriage.

The clamping tool 52A opens. The material 100A is disengaged from the clamping tool 52A and is input into the mold 311A in a perpendicular delivery carriage. Then the pressure device 31 forges and presses the material 100A.

The external physical characteristic 103A of the material 100A affects the subsequent processing mode of the material 100A. The conveying tool 50 determines and confirms the carriage of the material being transported and the delivery carriage of the material 100A being input onto the forging bench 31A based on the external physical characteristic 103A of the material 100A.

The subsequent processing modes that are corresponding to the external physical characteristics 103A of the material 100A can be preloaded and preset on the feeding device 50A. The selections of the processing modes of the feeding device 50A based on different external physical characteristics 103A of the material 100A may be the same, such as to adjusting the delivery carriage of the material 100A.

Figure 28:
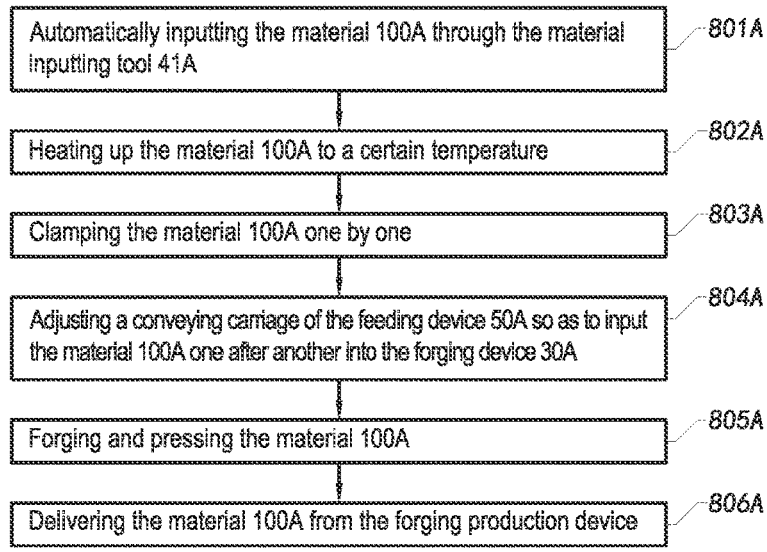
FIG. 28 is a block diagram of a forging and pressing production method according to the above seventh preferred embodiment of the present invention.
Figure 29:
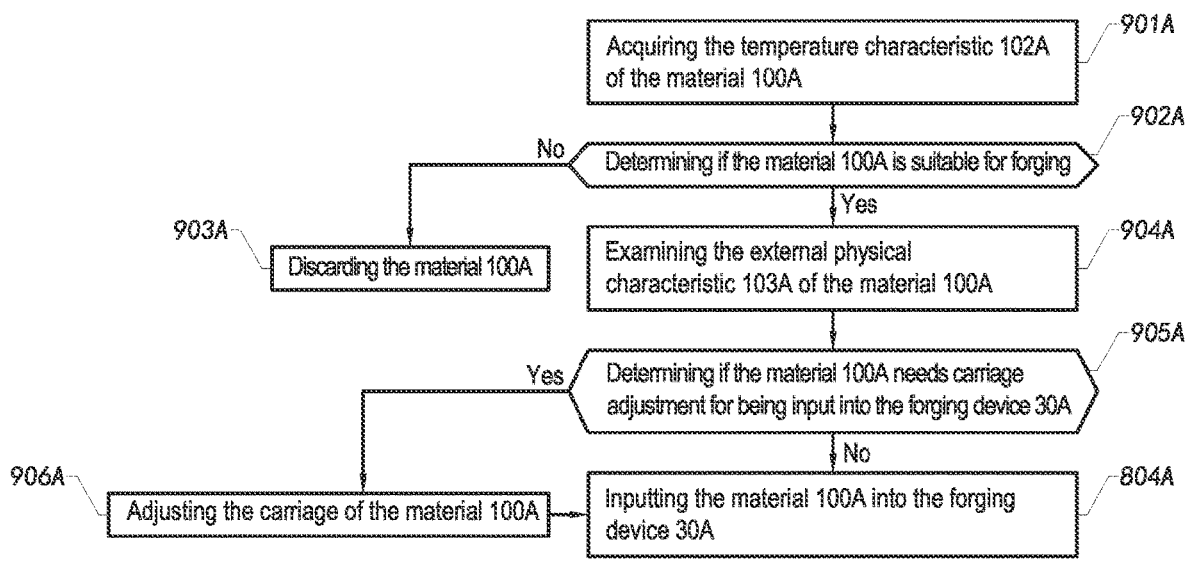
FIG. 29 is a block diagram of the forging and pressing production method according to the above seventh preferred embodiment of the present invention.
Figure 30:
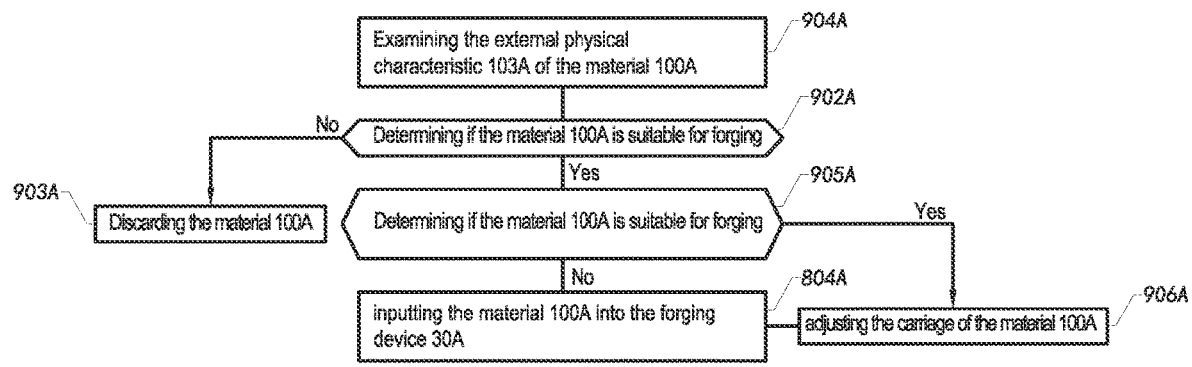
FIG. 30 is a block diagram of the forging and pressing production method according to the above seventh preferred embodiment of the present invention.

FIGS. 28-30 illustrated a forging and pressing production method executed through the forging process device for forging and producing of the material 100A. The forging production method comprising the steps of:

801A: automatically inputting the material 100A through the material inputting tool 41A;

802A: heating up the material 100A to a certain temperature;

803A: clamping the material 100A one by one;

804A: adjusting a conveying carriage of the feeding device 50A so as to input the material 100A one after another into the forging device 30A;

805A: forging and pressing the material 100A;

806A: delivering the material 100A from the forging production device.

In the step 801A, the material 100A is input into the hot melt device 20A by the material inputting tool 41A of the delivering device 40A. The hot melt device 20A heats the material 100A, which is to execute the step 802A.

In the step 803A, the conveying tool 42A of the delivering device 40A conveys the material 100A to leave the hot melt device 20A and conveys the material 100A to the forging device 30A. The material collecting end 421A catches the material 100A that has been heated and left the hot melt device 20A. Then the material 100A moves along the guide rail 422A to the discharging end 423A.

In the step 803A, the feeding device 50A inputs the material 100A into the forging device 30A. The transfer arm 51A faces toward the discharging end 423A and protrudes toward the discharging end 423A. Then the clamping tool 52A clamps the material 100A from the discharging end 423A.

In the step 804A, after the clamping tool 52A clamps the material 100A, the transfer arm 51A adjusts its direction and distance to the forging device 30A, adjusts the conveying carriage, and moves the clamping tool 52A to the above of the forging bench 31A to aim the material 100A to the mold 311A of the forging bench 31A. Then the clamping tool 52A opens, so that the material 100A is input into the mold 311A of the forging bench 31A.

In the step 805A, the pressure device 32A above the forging bench 31A stamps and presses down after the material 100A has input onto the forging bench 31A, so as to forged and pressed the material 100A based on the shape of the mold 311A. After the forging and pressing, the pressure device 32A moves up.

In the step 806A, when the pressure device 32A is moving up, the material 100A is brought by the pressure device 32A to move up as well and the discharging tool 43A in a side moves to the underneath of the pressure device 32A. The material 100A is disengaged from the pressure device 32A and dropped onto the discharging tool 43A in the below. Then the discharging tool 43A moves to the outer side to bring the material 100A to leave the forging device 30A. The material 100A moves from the high end to the low end of the discharging tool 43A and further moves to the end product area through the discharging tool 43A.

It further comprises the following step before the step 804A.

901A: acquiring the temperature characteristic 102A of the material 100A;

902A: determining if the material 100A is suitable for forging.

The examining device 60 acquires the temperature characteristic of the material 100A that reaches the discharging end 423A through the conveying tool 42A, and selects the subsequent processing mode for the material 100A based on this temperature characteristic 102A. The step 902A is executed that the temperature characteristic 102A of the material 100A is analyzed and the result indicates a disqualified temperature of the heated material 100A, determining the material 100A unsuitable for being forged.

It further comprises the following step after the step 902A:

903A: discarding the material 100A.

The step 903A is executed to determine that the material 100A is not suitable for being forged and put the material 100A into the waste product area. Specifically, the feeding device 50A clamps and picks up the material 100A from the discharging end 423A and turns to the waste product area to put the material 100A into the waste product area. Here the transfer arm 51A aims the clamping tool 52A to the discharging end 423A and moves to the discharging end 423A until the clamping tool 52A be close to the discharging end 523. Then the clamping tool 52A3 opens and contacts the material 100A from the two side of the material 100A. The clamping tool 423 clamps the material 100A. The transfer arm 51A adjusts the direction and moves toward the waste product area, while the clamping tool 52A aims at the waste product area. The clamping tool 52A opens and the material 100A is detached from the clamping tool 52A. The material 100A is put into the waste product area.

The step 902A is executed to determine that the material 100A has achieved the temperature requirement, so the step 804A will be executed to utilize the feeding device 50A to input the material 100A into the forging device 30A.

It further comprises the following step before the step 804A.

904A: examining the external physical characteristic 103A of the material 100A; and

902A: determining if the material 100A is suitable for forging.

The step 904A is executed, which has the examining device 60 acquire the external physical characteristic 103A of the material 100A at the discharging end 423A. The step 902A is executed that whether the material 100A is suitable for being forged and the subsequent processing mode of the material 100A are determined based on the external physical characteristic 103A of the material 100A. When the material 100A is determined unsuitable for being forged, the step 903A will be executed to input the material 100A into the waste product area. When the material 100A is suitable for being forged, the step 804A will be executed to input the material 100A into the forging device 30A.

According to an embodiment of the present invention, the method further comprises a step 905A after the step 902A: adjusting the delivery carriage of the material 100A. The step 902A is executed that the material 100A is determined suitable for forging and the delivery carriage of the material 100A for inputting into the forging device 30A is noted based on the external physical characteristic 103A thereof. Then the step 905A will be executed to utilize the feeding device 50A to adjust the delivery carriage of the material 100A. The step 804A is executed to input the material 100A in the adjusted delivery carriage into the forging device 30A.

For example, when the examining device 60 acquires the external physical characteristic 103A of the material 100A at the discharging end 423A indicating that the material 100A in a strip shape is horizontally lying at the discharging end 423A, the step 902A will be executed to determine if the material 100A is suitable for being forged. The step 905A will be continued executing to utilize the clamping tool 52A to clamp the material and have the transfer arm 51A adjust the direction and distance toward the forging device 30A. The clamping tool 52A also adjusts the delivery carriage of the material 100A during the moving of the transfer arm 51A. Specifically, the clamping tool 52A utilizes the transfer arm 51A as an axle center to rotate for a certain angle, so as to have the material 100A turn from a horizontally lying when being clamped into a perpendicular delivery carriage. The step 804A is executed that when the clamping tool 52A has moved to the above of the forging bench 31A, the clamping tool 52A will put the material 100A in a perpendicular delivery carriage onto the forging bench 31A. The step 805A and the step 806A will be continued executing, so as to have the material 100A be forged and pressed and moved to the end product area to complete the forging and pressing production of the material 100A.

It is worth mentioning that both the temperature characteristic 102A and the external physical characteristic 103A of the material 100A have to meet the requirements that allow the material 100A to be forged subsequently, so as to allow the material 100A to be continued processing in the forging and pressing production. In other words, it has to go through the step 901A and the step 904A to acquire the temperature characteristic 102A and the external physical characteristic 103A of the material 100A first, so as for executing the step 902A to determine if the material 100A can be forged.

In the forging production system, whether the material 100A is suitable for being forged and the processing mode for forging the material 100A are determined based on the acquired characteristic of the material 100A. The subsequent production method for the material 100A is automatically selected based on the characteristics of the material 100A.

Figure 36:
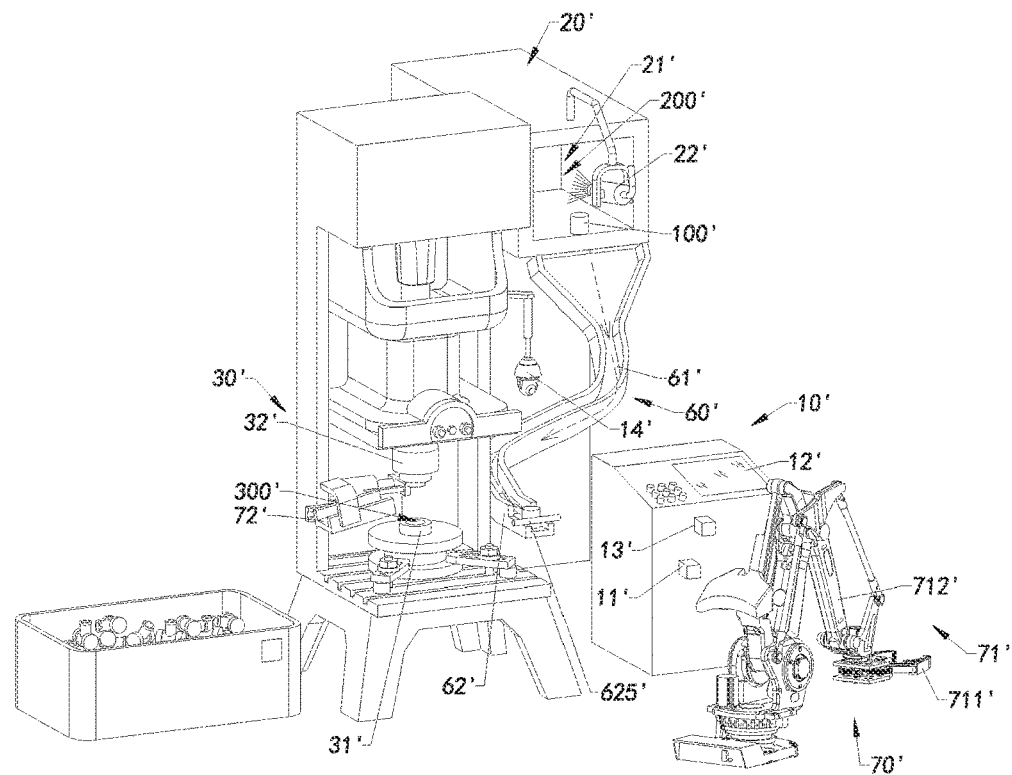
FIG. 36 is an overall perspective view of a forging and pressing production system and management method therefor according to an eighth preferred embodiment of the present invention.
Figure 37:
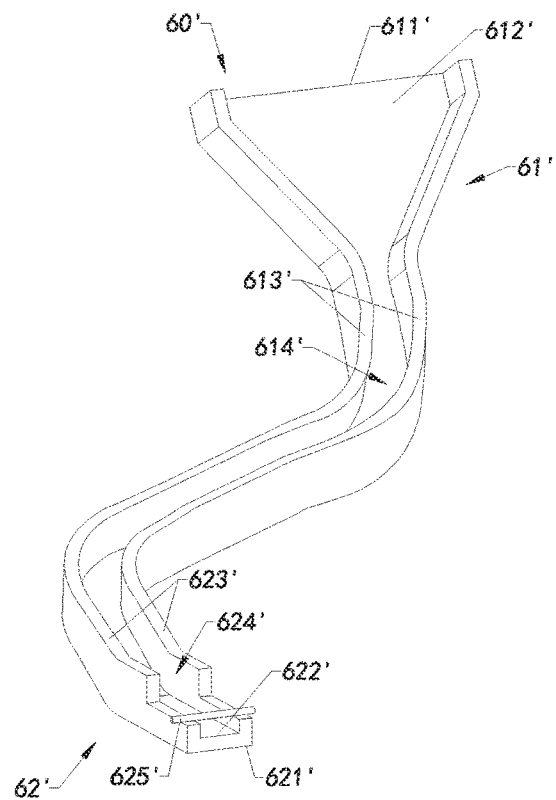
FIG. 37 is an overall perspective view of the guide rail device according to the above eighth preferred embodiment of the present invention.

Referring to FIGS. 36-37, a forging and pressing production system and management method therefor according to an eighth preferred embodiment of the present invention will be disclosed and illustrated as follows, wherein the forging and pressing production device comprises a hot melt device 20', a forging device 30', a guide rail 60', and an operation device 70'. At least a material 100' is input into the hot melt device 20'. The material 100' is heated in the inside of the hot melt device 20' to a predetermined temperature. The predetermined temperature is manually set and can be adjusted in the subsequent procedure. Then the materials 100' can be successively sent from the hot melt device 20' to the front end of the guide rail 60'. The guide rail 60' conveys the materials 100'. When the material 100' arrives at the tail end of the guide rail 60', it will be clamped by the operation device 70' to send to the forging device 30' for being further formed through forging and pressing.

It is worth noticing that the guide rail 60' transports the material 100' from the hot melt device 20' to the forging and pressing device 30'. The guide rail 60' transports the material 100' from the hot melt device 20' to the forging and pressing device 30'. The material 100' exits from the hot melt device 20' will be transferred to the forging and pressing device 30' by the guide rail 60'. The guide rail 60' serves the function to avoid the material 100' from contacting the personnel during the above mentioned transportation, so as to prevent the material 100' of high temperature condition from rendering accident to the labor or damaging the material 100' when the labor contacts the material 100' (e.g. dropping the material 100' on the floor). The guide rail 60' of the present embodiment may also be interpreted as the slide rail mechanism 411' of the above embodiment.

During the subsequent procedures, the operation device 70' further conducts actions, such as grabbing, transferring, and etc., to the material 100', which reduces labor costs and enhances the security of the production processes.

After all the working procedures are completed, the material 100' becomes a blank, be output from the forging and pressing production device by the operation device 70', and be collected. The modes for the materials 100' to enter the hot melt device 20' may vary. The material 100' can be, but not limited to, be put into the hot melt device 20' through a material inputting tool or be manually input into the hot melt device 20' to be heated, wherein the present invention shall not be limited here. The hot melt device 20' comprises a heating chamber 21' and a heater 22'. The hot melt device 20' has a heating space 200'. The heating space 200' is arranged inside of the heating chamber 21'. The heating chamber 21' defines the heating space 200'. The heating chamber 21' is heated by the heater 22'. In the specific implementation, the heater 22' heats up the heating space 200' of the heating chamber 21'. The heating space 200' is for heating the material 100' to a predetermined temperature. The predetermined temperature is controlled by the user. The user is able to change the predetermined temperature based on the acquired information, so as for better achieving the heating of the material 100'. The materials 100' are input into the inside of the heating space 200' of the heating chamber 21' to be heated and then the materials 100' are successively sent out from the heating space 200' to the guide rail 60'. Next, the guide rail 60' and the operation device 70' deliver the material 100' to circulate in the forging and pressing production device, so as to have the material 100' pass through various working procedures until it is output from the forging and pressing production device. The hot melt device 20' can be, but not limited to, stove and etc. After the materials 100' are heated in the inside of the hot melt device 20', they are successively sent out from the hot melt device 20'.

After the material 100' is input into the hot melt device 20', it is mainly heated in the inside of the heating space 200' of the heating chamber 21'. It is worth mentioning that the heating temperature of the heating chamber 21' is controllably set. According to the needs of the material 100', the heating chamber 21' is correspondingly heated by the heater 22' so as also to heat the material 100' in the heating space 200' to the predetermined temperature for subsequent processing.

The material 100' at least has a characteristic that person skilled in the art should be able to understand that the material 100' has at least a characteristic defining the material 100' from a different perspective. According to the present embodiment, the characteristics of the material 100' comprises a external physical characteristic 101', a temperature characteristic 102', and a position characteristic 103'. The external physical characteristic 101' represents the numeric value of the shape of the material 100', wherein the shape of the material 100' can be identified through the external physical characteristic 101'. In the specific implementation, the shape information of the material 100' can be obtained through the coordination between the distance sensor, the weight sensor or multiple sensors. The temperature characteristic 102' represents the numeric value of the temperature of the material 100', wherein the surface temperature of the material 100' can be identified through the temperature characteristic 102'. In the specific implementation, the information of the surface temperature of the material 100' is obtained through the coordination between the temperature sensor, the infrared sensor or multiple sensors. The position characteristic 103' represents the numeric value of the relative position of the material 100', wherein the physical location of the material 100' may be identified through the position characteristic 103'. In the specific implementation, the information of the relative position of the material 100' is obtained through the coordination between the infrared sensors or multiple sensors. The external physical characteristic 101', the temperature characteristic 102', and the position characteristic 103' are utilized for understanding the actual conditions of the material 100' so as for deciding if the material 100' will be sent to the next device or be eliminated and discharged from the production process of the forging and pressing production device.

The forging device 30' presses to form and shape the material 100' that has been heated, so as for forming the material 100' through forging and pressing. The forging device 30' comprises a mold 31' and a pressing mechanism 32'. The material 100' is conveyed by the guide rail 60' and input into the mold 31' by the operation device 70'. The pressing mechanism 32' exerts pressure to the material 100' placed inside of the mold 31' so as to have the material 100' inside of the mold 31' be pressed and formed. The speed, dynamics, frequency of the pressing mechanism 32' are all adjustable. The shape and size of the mold 31' are both adjustable. During the process of forging and pressing the material 100', the settings of the mold 31' and the pressing mechanism 32' can be adjusted based on the conditions of the material 100' as well as the user's needs.

The forging device 30' has a forging space 300'. The forging space 300' is defined by the mold 31'. The forging space 300' is formed in the mold 31'. The material 100' is pressed and stamped by the pressing mechanism 32' in the forging space 300' of the mold 31' so as to have the material 100' be formed and shaped through forging and pressing under a high temperature and turned into the blank.

The operation device 70' comprises a transport tool 71' and a discharging tool 72'. The transport tool 71' can, but not limited to, be arranged independently. The transport tool 71' is capable of transferring the material 100' from the guide rail 60' to the mold 31'. According to the present embodiment, the transport tool 71' can be arranged independently. Nevertheless, according to another alternative mode of the present invention, the transport tool 71' may also be arranged on the base of the forging device 30'. The transport tool 71' of the present embodiment here may be interpreted as the transport mechanism 412 of the above embodiment, while the discharging tool 72' here may be interpreted as the discharging tool 43 of the above embodiment.

In the specific implementation, the transport tool 71' transports the material 100' from the guide rail 60' to the mold 31' of the forging device 30'. The material 100' in the forging space 300' inside of the mold 31' receives the forging and pressing of the pressing mechanism 32' and the material 100' will be then briefly adhered on the pressing mechanism 32'. Then, the discharging tool 72' protrudes to catch and receive the material 100' falling from the pressing mechanism 32'. The materials 100' will be conveyed one after another from the heating space 200' of the hot melt device 20' to the guide rail 60' and be transported one after another to the mold 31' by the transport tool 71' so as to be forged and pressed by the pressing mechanism 32'.

It is worth noticing that the material 100' is capable of not only being transported by the guide rail 60', but also temporarily staying at the end portion of the guide rail 60' to wait for being clamping by the transport tool 71'. The guide rail 60' not only connects the productions of the hot melt device 20' and the forging device 30', but also provides accommodations for the materials 100' in the process between leaving the hot melt device 20' and entering the forging device 30'. The materials 100' can wait on the guide rail 60' for being clamped later.

The transport tool 71' comprises a clamping end 711' and a transfer arm 712'. The clamping end 711' is arranged on the transfer arm 712'. The clamping end 711' clamps the material 100' conveyed by the guide rail 60'. The clamping end 711' is controllably connected with the transfer arm 712'. The clamping end 711' is movable on the transfer arm 712'. The clamping end 711' has a preset operational track so as to ensure that the clamping end 711' can smoothly and successfully clamp the material 100' conveyed by the guide rail 60'. The transfer arm 712' controls the clamping end 711' to clamp the material 100'. The guide rail 60' transports and accommodate the material 100' for the clamping end 711' of the transport tool 71' to pick up. The clamping end 711' clamps the material 100' and moves it to the forging space 300' in the mold 31' of the forging device 30'.

The pressing mechanism 32' forms and shapes the material 100' through forging and pressing. Then, the discharging tool 72' transfers the material 100' to an external collection box so as to complete the manufacturing of the material 100' It is worth noticing that the clamping end 711' here may also be interpreted as the clamping end 4121 of the above embodiment, while the transfer arm 712' here may also be interpreted as the transfer arm 4122 of the above embodiment.

The discharging tool 72' is capable of conveying the material 100' from the forging and pressing production device. The discharging tool 72' is arranged on the base of the forging device 30'. The discharging tool 72' extends after the pressing mechanism 32' forges and presses the mold 31'. The discharging tool 72' receives the material 100' being dropped from the pressing mechanism 32' and the material 100' slides along the discharging tool 72' from the forging and pressing production device. The structure of the discharging tool 72' can be, but not limited to, a sliding groove allowing the material 100' to pass through. The discharging tool 72' allows the material 100' to fall off to an external collection box. The discharging tool 72' ensures that the material 100' can reach the external collection box from the forging device 30'. More specifically, starting from the hot melt device 20', the material 100' starts to be processed by the forging and pressing production device. Then the discharging tool 72' brings the material 100' from the forging and pressing production device, so as to end the processing of the material 100' in the forging and pressing production device.

The material 100' is transported by the guide rail 60'. The guide rail 60' transports the material 100' from the hot melt device 20' to the forging device 30' to wait. The transport tool 71' transports the material 100' to the forging space 300' corresponding to the mold 31'. The pressing mechanism 32' can controllably adjust its pressing mode based on the production needs of the material 100'. In the specific implementation, the pressure or the pressing angle exerted by the pressing mechanism 32' can be adjusted.

The guide rail 60' comprises a sliding guide rail 61' and a conveying guide rail 62'. The material 100' is sequentially transferred from the heating space 200' of the heating chamber 21' of the hot melt device 20' to the sliding guide rail 61'. The material 100' slides from the sliding guide rail 61' to the conveying guide rail 62'. The sliding guide rail 61' and the conveying guide rail 62' are integrated, and the conveying guide rail 62' is seamlessly connected to the sliding guide rail 61'.

Specifically, during the sliding process of the material 100', the sliding guide rail 61' and the conveying guide rail 62' are integrally formed, and the sliding guide rail 61' and the conveying guide rail 62' jointly form the guide rail 60', so that the material 100' can easily slide from the sliding guide rail 61' to the conveying guide rail 62'.

The shape of the sliding guide rail 61' is preferably from top to bottom, so that the material 100' can slide from one end to the other end of the sliding guide rail 61', and it also facilitates the sliding guide rail 61' to be extended to the heating chamber 21' of the hot melt device 20'. The coordination mode of the sliding guide rail 61' and the heating chamber 21' can be connection or a coordination without direct contact and with a drop. For example, an end of the sliding guide rail 61' can be extended to the below of the heating chamber 21' so as to receive the delivered material 100' therefrom. No matter which of the above-mentioned coordination modes, it will not affect the material 100' successively transferred from the heating chamber 21' to be received by the sliding guide rail 61'. More specifically, an end of the sliding guide rail 61' is extended to the hot melt device 20', and the sliding guide rail 61' is for the material 100' to slide from the heating space 200' of the heating chamber 21' of the hot melt device 20' to the conveying guide rail 62'. The material 100' is sequentially transferred from the hot melt device 20' to the sliding guide rail 61', and the material 100' sequentially slides from the sliding guide rail 61' to the conveying guide rail 62'. Then the material 100' stays on the conveying guide rail 62' for a short time, waiting to be picked up by the clamping end 711' of the transport tool 71' of the operation device 70'.

The sliding guide rail 61' has a collection end 611', a sliding surface 612', and a sliding channel 614'. The collection end 611' is arranged at the front end of the sliding guide rail 61' for collecting the material 100' processed by the hot melt device 20'. The collection end 611' comes together in the heating chamber 21' of the hot melt device 20'. The term "comes together" here refers to being drawn together and received in a coordinating manner. The collection end 611' can receive the materials 100' transferred from the inside of the heating chamber 21'. The coordination between the collection end 611' and the hot melt device 20' can be engagement and connection, or a misaligned coordination without direct contact and with a certain drop. Regardless of the coordination mode, the collection end 611' is capable of smoothly receiving the materials 100' delivered from the heating chamber 21'.

The material 100' is collected by the collection end 611' and enters the sliding channel 614'. The material 100' slides on the sliding surface 612' inside of the sliding channel 614'. It is worth noticing that the collection end 611' here may also be interpreted as the collection end 4111 of the above embodiment, while the sliding channel 614' here may also be interpreted as the sliding channel 4112 of the above embodiment. The sliding guide rail 61' comprises two sliding side walls 613', wherein each of the sliding side walls 613' respectively extends upward from the two sides of the sliding surface 612'. The sliding channel 614' is formed between the sliding side walls 613'. The sliding side walls 613' and the sliding surface 612' jointly define the sliding channel 614'. The collection end 611' is connected to each of the sliding side walls 613'. The sliding channel 614' extends to the collection end 611', so that the material 100' can enter the sliding channel 614' through the collection end 611', and the material 100' entering the sliding channel 614' is allowed to slide from the top downward. The sliding side walls 613' serve as obstructions in the two sides, so that the material 100' sliding on the sliding channel 614' will not fall off. The sliding surface 612' can be, but not limited to, a smooth surface, so as to reduce the resistance encountered when the material 100' slides thereon, so that the material 100' slides very smoothly on the sliding surface 612', which prevents bumps from delaying the transportation time of the material 100', and avoids wearing of the material 100', which reduces the consumption of the material 100' during the transportation.

The conveying guide rail 62' has a providing end 621', a conveying channel 624', and a conveying surface 622'. The providing end 621' is arranged on the conveying guide rail 62' so as for the material 100' to successively reach. The providing end 621' is at an end of the conveying guide rail 62'. The material 100' successively slides to the conveying surface 622', stays, and waits for being clamped by the clamping end 711'. The conveying surface 622' and the sliding surface 612' are integrated. The conveying channel 624' is connected to the sliding channel 614' and the material 100' can slide from the sliding surface 612' to the conveying surface 622'. In addition, the conveying channel 624' is extended to the providing end 621'. The material 100' reaches the providing end 621' via the conveying channel 624' and stays at the providing end 621' for waiting for being clamped by the clamping end 711'.

More specifically, the materials 100' successively reach the providing end 621' of the conveying guide rail 62' and the clamping end 711' of the transport tool 71' extends to the providing end 621' to clamp the materials 100'. It is worth noticing that the providing end 621' here may also be interpreted as the providing end 4113 of the above embodiment. The conveying guide rail 62' comprises two conveying side walls 623', wherein each of the conveying side walls 623' extends upward from both sides of the conveying surface 622', and the conveying channel 624' is located between the conveying side walls 623'. The conveying surface 622' and the conveying side walls 623' jointly define the conveying channel 624'. The conveying side wall 623' and the sliding side wall 613' are preferably integrally formed. The conveying side walls 622' and the sliding surface 612' are integrated. The conveying channel 624' is connected to the sliding channel 614'. The material 100' can slide from the sliding channel 614' to the conveying channel 624'. The material 100' is conveyed inside the conveying channel 624'. The material 100' continues to slide on the conveying surface 622' and each conveying side wall 623' ensures that the material 100' glides on the conveying channel 624' without falling off. The conveying surface 622' can be, but not limited to, a smooth surface to reduce the resistance encountered during the sliding of the material 100', so that the material 100' can slide on the conveying surface 622' very smoothly. Therefore, the transportation time of the material 100' will not be delayed due to bumping. Besides, the material 100' will not be worn and teared, which reduces consumption of the material 100' in the transportation process.

Specifically, the conveying channel 624' communicates with the sliding channel 614' so that the material 100' can smoothly slide from the sliding channel 614' to the conveying channel 624', and the conveying channel 624' is connected To the providing end 621', so that the material 100' can be transported from the conveying channel 624' to the providing end 621'. The material 100' stays at the providing end 621' and is then clamped by the clamping end 711' of the transport tool 71'. The providing end 621' is for the material 100' to stay, and the conveying side walls 623' ensure that the material 100' will not fall off when being conveyed by the conveying channel 624'. It is worth noting that when the material 100' slides from the sliding channel 614' to the conveying channel 624', the material 100' can continue sliding to the providing end 621' connected by the conveying channel 624' due to the inertial force or due to the pushing force of the next material 100'.

The conveying guide rail 62' further comprises an intercepting member 625', wherein the intercepting member 625' has at least one end portion. The end portion is arranged on any of the conveying side walls 623' and extended to the other of the conveying side walls 623'. When the quantity of the end portion is two, each of the end portions is provided on each of the conveying side walls 623', and the intercepting member 625' is provided on the providing end 621' of the conveying rails 62'. The intercepting member 625' intercepts the material 100' at the providing end 621', so that the material 100' is exactly limited to a fixed portion at the providing end 621' so as for the clamping end 711' to smoothly grip and clamp the material 100' from the fixed position. Therefore, the position characteristic 103' of the material 100' is ensured, which helps the transfer arm 712' to drive the clamping end 711' to clamps the material 100' easily and smoothly.

It is worth noting that the opening of the collection end 611' should be larger than the actual size of the material 100', so that the collection end 611' can easily accommodate the transferred material 100'. The material 100' transferred from the heating chamber 21' is received and accommodated by the collection end 611'. The sliding channel 614' is designed to gradually narrow to allow the material 100' to enter and then be sent to the conveying channel 624' of the conveying guide rail 62'. The sliding channel 614' is preferably gradually narrowed so that the position of the material 100' when passing through can be adjusted so as to ensure that when the material 100' reaches the conveying channel 624' of the conveying guide rail 62', the transferring position will not deviate, such that the position characteristic 103' of the material 100' can be ensured. In the specific implementation, a plurality of the materials 100' are sequentially collected by the collection end 611', and then slide through the sliding channel 614' in turn with their position characteristics 103' being corrected, so that the materials 100' are at accurate positions when arriving the providing end 621' of the docking rail 42'. In the specific implementation, the gradually narrowing design of the sliding channel 614' can be, but not limited to, achieved through having the two sliding side walls 613' gradually approaching to each other, wherein it is not a limit here. The forging and pressing production device further comprises a control platform 10', wherein the control platform 10' controls the temperature and speed of processing the material 100' of the hot melt device 20', and the forging device 30' is also controlled by the control platform 10' to adjust the speed and frequency of forging and pressing the material 100'. The control platform 10' receives various feedback information and signals, such as the external physical characteristic 101', the temperature characteristic 102', and the position characteristic 103', so as for adjusting the processing of the material 100'.

The control platform 10' comprises an arithmetic unit 11', a feedback unit 12', an actuator 13', and a monitor unit 14'. The arithmetic unit 11', the feedback unit 12', the actuator 13', and the monitor unit 14' are communicatively connected with one another. The arithmetic unit 11' calculates the feedback data obtained by the feedback unit 12' from the hot melt device 20' and the forging device 30', so that the actuator 13' can utilize this computed result in controlling the heating chamber 21', the pressing mechanism 32', and the operation device 70'. The operating device 70' receives the control of the actuator 13' so as to have the clamping end 711' grips any one of the materials 100' or eliminates and discharges any one of the materials 100'. Any temperature characteristic 102' and the position characteristic 103' of the material 100' can be submitted as feedback data. The monitor unit 14' can preset the relevant control parameters of the arithmetic unit 11', and display the feedback information of the feedback unit 12' so as to achieve interactive controlling. In the specific implementation, the monitor unit 14' may be, but not limited to, temperature sensor(s), infrared sensor(s) or multiple sensors. In addition, the control platform 10' instructs the clamping end 711' to identify the qualified materials 100' to be clamped from the providing end 621' of the guide rail 60' to the next process, while the unqualified materials 100' will be eliminated.

It is worth noting that according to another alternative mode of the present invention, only the differences from this embodiment will be stated as follows. The manner of the material 100' entering the conveying guide rail 62' from the sliding guide rail 61' can be implemented through a conveyor belt. The conveyor belt is arranged at the bottom of the conveying guide rail 62'. When the material 100' enters the conveying guide rail 62' from the sliding guide rail 61', it is conveyed by the conveyor belt. The conveyer belt is driven to operate through two wheels and a motor. The motor provides power, and each of the wheels drives the transmission belt to run. It should be noted that the reason why only the differences from this embodiment are illustrated is for clarity and conciseness, which shall not limit the present alternative mode in any means.

According to another alternative mode of the present invention, the sliding guide rail 61' has at least one bent portion and the sliding guide rail 61' can present a meandering shape. The meandering shape of the sliding guide rail 61' makes it easier to fit in when assembled to the hot melt device 20' and shortens the path for the material 100' traveling from the hot melt device 20' to the forging device 30'. The assembling of the guide rail 60' with the hot melt device 20' and the forging device 30' becomes more flexible and saves more space.

According to another alternative mode of the present invention, the forging device comprises at least two of the pressing mechanisms 32', which pressing modes are different to each other. The materials 100 of different requirements are transported by the guide rail 60' respectively to different pressing mechanisms 32', such that the materials 100' of different requirements can be pressed in different pressures or angles. In the specific implementation, the forging device 30' can be customizedly designed and arranged for corresponding to the characteristics of the material 100'. The mold 31' is corresponding to the external physical characteristic 101' of the material 100' and the pressing mechanism is' corresponding to the temperature characteristic 102', so as for different the material 100' to receive corresponding forging and pressing processes. It is worth noticing that, according to the present alternative mode, the heating space 200' and the forging space 300' may be in a saturated state. When the heating space 200' and the forging space 300' are saturated, which means that there is no hot melt device 20' and the forging device 30' for the subsequent material 100', the guide rail 60' will have the material 100 wait or adjust the transportation to the unsaturated heating space 200' and forging space 300'. Hence, due to the limits of the heating space 200' and the forging space 300', the guide rail 60' will adjust the mode of transporting the material 100' so as to ensure the circulation efficiency of the material 100' before, between, and after the hot melt device 20' and the forging device 30'. After the processing is completed, the external physical characteristic 101' of the material 100' is changed, which means it has become the billet. Then the external physical characteristic 101' of the material 100' is examined, so as to understand if the material 100' is a qualified product. For the qualified product, the forging and pressing production process will ended and the material 100 will be output and produced. The unqualified material 100' will be returned to the start to be further processed or finally eliminated depending on the condition of the material 100'.

Figure 38:
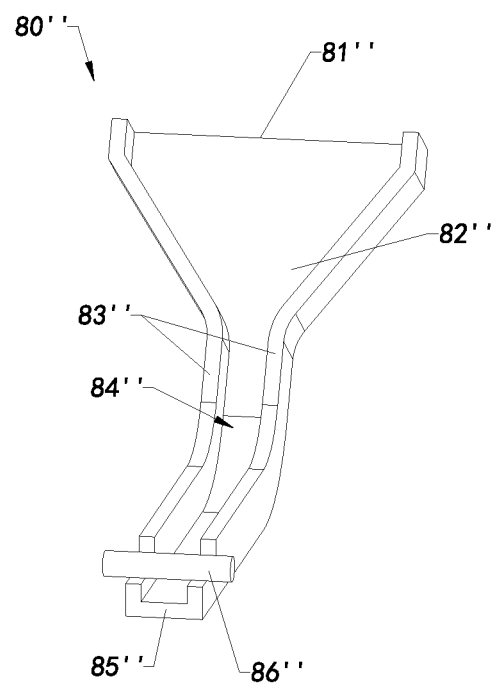
FIG. 38 is an overall perspective view of a guide rail device according to a ninth preferred embodiment of the present invention.

Referring to FIG. 38, a guide rail device according to another preferred embodiment of the present invention is disclosed and illustrated in the following description. The following describes only the differences from the above-mentioned embodiment. It is worth noting that the explanation of the differences is based on the concise description and for ease of understanding, and is not a limitation of the present invention. The guide rail device is a guide rail 80", and the guide rail 80" is arranged and provided between the hot melt device 20" and the forging device 30" for the material 100" to transit from the hot melt device 20" to the forging device 30". The material 100" is heated at high temperature from the hot melt device 20" and is transported to the forging device 30" through the guide rail 80". The material 100" is transported through the guide rail 80" so as to avoid consumption during transportation as much as possible, and to improve safety and avoid contact with other objects or worker.

The guide rail 80" comprises a collection end 81" and a providing end 85" and has a sliding channel 84". The sliding channel 84" is extended to the collection end 81" and the providing end 85", wherein the collection end 81" is extended to the hot melting device 20" to collect the material 100" successively transferred by the hot melting device 20", wherein the material 100" enters the sliding channel 84" through the collection end 81". The material 100" slides from top to bottom in the sliding channel 84", and reaches the providing end 85" to wait to be clamped by the clamping end 711". The collection end 81" is folded in the hot melt device 20", and the folding mentioned here refers to folding and fitting. The way of the folding and fitting of the collection end 81" with the hot melt device 20" is not limited. It can be a cohesive fitting means or a non-direct contact fitting means with a drop. For example, the collection end 81" may be placed under the heating chamber 21" of the hot melt device 20" to receive the material 100" that comes out. Regardless of the folding and fitting means and modifications thereof, the collection of the material 100" by the collection end 81" will not be affected.

The shape of the guide rail 80" is preferably inclined from top to bottom. Similarly, the shape of the sliding channel 84" is preferably inclined from top to bottom to facilitate the sliding of the material 100". The material 100 slides from the collection end 81" through the sliding channel 84" to the providing end 85" and waits to be clamped.

The guide rail 80" further includes a sliding surface 82" and two sliding side walls 83". Each of the sliding side walls 83" respectively extends upward from both sides of the sliding surface 82". The sliding surface 82" and the sliding side walls 83" collectively define the sliding channel 84". The sliding channel 84" is located between the sliding side walls 83". The material 100" is kept by the sliding side walls 83" from dropping off when sliding in the sliding channel 84". The sliding surface 82" can be, but not limited to, a smooth surface, so as to reduce the resistance encountered when the material 100" slides thereon, so that the material 100" slides very smoothly on the sliding surface 82", which prevents bumps from delaying the transportation time of the material 100", and avoids wearing of the material 100", which reduces the consumption of the material 100" during the transportation.

The guide rail 80" further includes an intercepting member 86", wherein the intercepting member 86" is arranged at the providing end 85", and both ends of the intercepting member 86" are respectively fixed to each of the sliding side walls 83". The intercepting member 86" passes through the sliding channel 83", and the distance between the intercepting member 86" and the sliding surface 82" is less than the height of the material 100" so that the material 100" sliding on the sliding channel 84" can be intercepted by the intercepting member 86". The intercepting member 86" intercepts the material 100" sliding along the sliding channel 83" to the providing end 85". The material 100" is limited at the providing end 85" by means of the intercepting member 86" to wait to be clamped.

It is worth noting that according to the present embodiment, the top-down inclined design of the guide rail 80" enables the material 100" to slide smoothly on the sliding channel 84". The guide rail 80" is connected to the hot melt device 20" and the forging device 30" in a manner to respectively keep a predetermined distance therefrom when having the collection end 81" extended to the heating chamber 21" and having the providing end 85" extended to the forging device 30". These predetermined distances prevent direct contact, but allows relatively close distances. It can be understood that the providing end 85" is extended to the vicinity of the forging device 30" in order to shorten the path for the clamping end 711" to clamp the material 100" from the providing end 85 to the inside of the mold 31".

According to another alternative modes of the invention, the guide rail 80" has at least a bent portion so as for better coordination with the installation of the hot melt device 20" and the forging device 30". In the specific implementation, the bent portion allows the guide rail 80" to be inclined from top to bottom while achieving a meandering or serpentine form. The meandering form facilitates the assembling and placing of the hot melt device 20" and the forging device 30" and saves more space. The meandering shape of the guide rail 80" allows the hot melt device 20" and the forging device 30″ to be compactly placed next to each other, thereby saving space. It is worth noting that when the guide rail 80″ extends from the hot melt device 20″ to the forging device 30″, it is only bent into a meandering shape when needed, and will not affect the sliding of the material 100″.

For another alternative mode of the present invention only the differences from the above-mentioned embodiment will be described. It is worth noting that the reason only the differences from the above-mentioned embodiment are described is for the sake of concise description and ease of understanding, which shall not be considered as any limit to the present invention. Here, the guide rail 80″ can be extended in a horizontal direction and the collection end 81″ and the providing end 85″ are arranged correspondingly in the horizontal direction respectively. A conveyer belt is utilized to complete transferring of the material 100″ from the collection end 81″ to the providing end 85″. More specifically, the conveyer belt extends from the collection end 81″ to the providing end 85″. The conveyer belt is preferably driven by two wheels and a motor. The motor provides driving force, and the wheel drives the conveyer belt to run, so that the material 100″ can be conveyed from the collection end 81″ by the conveyer belt to the providing end 85″.

One skilled in the art will understand that the embodiment of the present invention as shown in the drawings and described above is exemplary only and not intended to be limiting. It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A forging and pressing production device, adapted for forging and pressing at least a material, comprising:
   a hot melt device, adapted for receiving the material and heating the material to a predetermined temperature;
   a forging device, adapted for forging and pressing the heated material;
   a guide rail, arranged between said hot melt device and said forging device, wherein said guide rail is extended from said hot melt device to said forging device, so as to allow said guide rail to receive the material from said hot melt device and convey the material to said forging device therethrough; and
   an operation device, adapted for clamping the material conveyed by said guide rail and putting the material into said forging device for forging and pressing;
   wherein said guide rail further comprises two sliding side walls and a sliding surface, wherein a sliding channel is located between said sliding side walls, such that said sliding side walls keep the material sliding in said sliding channel from falling off because of gravity, wherein said sliding side walls are respectively extended upward from the two sides of said sliding surface, wherein said sliding surface and said sliding side walls jointly define said sliding channel, wherein said guide rail has at least one bent portion along a length of said sliding channel, wherein said sliding side walls gradually close up to reduce a width of said sliding channel, so as to restrict and gradually narrow said sliding channel.

2. The forging and pressing production device, as recited in claim 1, wherein said guide rail comprises a collection end, extended to said hot melt device for receiving the material from said hot melt device, and a providing end, extended to said forging device and maintained a predetermined distance from said forging device, wherein said collection end is located at the front end of said guide rail, wherein each of the materials is conveyed to said providing end to wait for being clamped by said operation device.

3. The forging and pressing production device, as recited in claim 2, wherein said guide rail further comprises an intercepting member arranged at said providing end, wherein said intercepting member holds the material at a fixed position, when the material reaches said providing end so as for being successfully clamped.

4. The forging and pressing production device, as recited in claim 3, wherein said guide rail further comprises a conveying surface, wherein said conveying surface is connected to said sliding surface, wherein said sliding side walls are extended to the two sides of said conveying surface, wherein said conveying surface, said sliding surface, and said sliding side walls jointly define said sliding channel, wherein said providing end is arranged on said conveying surface.

5. The forging and pressing production device, as recited in claim 1, further comprising a control platform, adapted for acquiring at least one characteristic of the material and controlling said hot melt device, said forging device, and said operation device.

\* \* \* \* \*